324-77

CROSS REFERENCE

SEARCH ROOM

Sept. 1, 1970 O. J. M. SMITH 3,526,761

METHOD, APPARATUS AND SYSTEM FOR THE IDENTIFICATION OF THE RELATIONSHIP BETWEEN TWO SIGNALS

Original Filed June 9, 1964 14 Sheets-Sheet 1

INVENTOR.

Otto J. M. Smith

BY Flehr & Swain

Attorneys

INVENTOR.
Otto J. M. Smith
BY
[signature]
Attorneys

INVENTOR.
Otto J. M. Smith
BY [signature]
Attorneys

INVENTOR.
Otto J. M. Smith
BY Flehr and Swain
Attorneys

INVENTOR.
Otto J. M. Smith
BY [signature]
Attorneys

INVENTOR.
Otto J. M. Smith
BY Flehr & Swain
Attorneys

Sept. 1, 1970 O. J. M. SMITH 3,526,761

METHOD, APPARATUS AND SYSTEM FOR THE IDENTIFICATION OF THE RELATIONSHIP BETWEEN TWO SIGNALS

Original Filed June 9, 1964 14 Sheets-Sheet 7

INVENTOR.

Otto J. M. Smith

BY Fehr and Swain

Attorneys

INVENTOR.
Otto J. M. Smith
BY
Attorneys

INVENTOR.
Otto J. M. Smith
BY
Flehr and Swain
Attorneys

INVENTOR.
Otto J. M. Smith
BY Flehr and Swain
Attorneys

INVENTOR.
Otto J. M. Smith
BY [signature]
Attorneys

INVENTOR.
Otto J. M. Smith
BY
Attorneys

INVENTOR.
Otto J. M. Smith
BY Flehr and Swain
Attorneys

INVENTOR.
Otto J. M. Smith
BY Flehr & Swain
Attorneys

United States Patent Office 3,526,761
Patented Sept. 1, 1970

3,526,761
METHOD, APPARATUS AND SYSTEM FOR THE IDENTIFICATION OF THE RELATIONSHIP BETWEEN TWO SIGNALS

Otto J. M. Smith, 612 Euclid Ave., Berkeley, Calif. 94708

Continuation of application Ser. No. 373,650, June 9, 1964. This application May 15, 1969, Ser. No. 826,085
Int. Cl. G06g 7/19, 7/34, 7/38
U.S. Cl. 235—181 41 Claims

ABSTRACT OF THE DISCLOSURE

Method, apparatus and system for the measurement of impedance and admittance functions, gain and phase, transfer functions of a process, Fourier transforms of time domain functions and power spectra using separate models of the numerator and denominator polynomials and minimizing the error in fitting the models to the process.

This application is a continuation of application Ser. No. 373,650, filed June 9, 1964, now abandoned.

This invention relates to a method, apparatus and system for the identification of the relationship between two signals, and more particularly to a method, apparatus and system for the measurement of impedance and admittance functions, gain and phase, transfer functions, Fourier transforms of time domain functions, and power spectra.

Considerable difficulty has been experienced in identifying the relationship between two signals. For example, one method for the measurement of an impedance function has been to provide an electrical bridge with accurately calibrated components in several of the bridge arms, two terminals to which an unknown two-terminal network can be connected, an oscillator to provide a single frequency, and a null detector. When the bridge is balanced, the impedance of the unknown two-terminal network can be read from the bridge dials as one complex number. This measurement is adequate only if the unknown contains only one energy storage element. If the unknown has several capacitors and inductors, the measurements must be repeated at several frequencies. If as many measurements as unknowns are made, the solution for the unknowns can be solved from a difficult set of equations. However, such solutions give very poor accuracy. To increase the accuracy, many more measurements can be made at many different frequencies but these must be combined statistically in an expensive high-speed digital computer. Another example arises in the measurement of the characteristics of amplifiers, servo mechanisms, three and four terminal networks, transmission lines, transducers, pneumatic and hydraulic information and power transmission devices, transistors, process controls, regulators, feedback control systems, and multivariate systems. One method has been to excite the input to a system with a frequency of known amplitude and to measure the output amplitude and phase with respect to the input. This measurement is repeated at many frequencies. Plots of gain and phase versus frequency, or a plot of gain versus phase are descriptions of the unknown system, but to obtain the equation of this plot is difficult and has been done in the past by trial and error or by the fitting of templates. One method for measuring the characteristics of a network or system is to excite the system with an impulse or a step function and measure the impulse response or step response as a function of time. The analysis of such measured functions has been very difficult. Digital computers can be used to find a summation of exponentials that equals the measured time function or to find the Fourier transform of the measured time function. In the measuring of the characteristics of a random signal, it has been the practice to calculate the autocorrelation function of the signal. To utilize this function in system synthesis often required converting it into a power-density spectrum by taking the Fourier transform of the autocorrelation function. In general, the recorded autocorrelation has to be multiplied by a sine and cosine wave and integrated over the entire function. It has been necessary to repeat this process many times for all significant frequencies. The results obtained are tabular or graphical in form and do not provide an equation of the power spectrum. From the foregoing, it can be seen that there is a need for a new and improved method, apparatus and system for the identification of the relationship between two signals.

In general, it is an object of the present invention to provide a method, apparatus and system for identification of the relationship between two signals which overcomes the above named disadvantages.

Another object of the invention is to provide a method, apparatus and system of the above character which can be utilized for reading more than one complex number or more than two parameters of an unknown two-terminal network simultaneously.

Another object of the invention is to provide a method, apparatus and system of the above character in which more than one excitation frequency can be used simultaneously.

Another object of the invention is to provide a method, apparatus and system of the above character which can be utilized for determining impedance and admittance by reaching a null condition automatically.

Another object of the invention is to provide a method, apparatus and system of the above character which presents the parameters in the equation for impedance as a ratio of polynomials in powers of the frequency variable.

Another object of the invention is to provide a method, apparatus and system of the above character for determining the best linear approximation, using a differential equation of a specified order, for an unknown impedance function which has a differential equation of significantly higher order.

Another object of the invention is to provide a method, apparatus and system of the above character which can be utilized for determining the best linear approximation to the impedance function of an unknown non-linear impedance.

Another object of the invention is to provide a method, apparatus and system of the above character for obtaining the equation of complex gain versus frequency for a two port device with several excitation frequencies simultaneously.

Another object of the invention is to provide a method, apparatus and system of the above character for automatically measuring gain and phase by use of an oscillator which sweeps through the desired frequency band.

Another object of the invention is to provide a method, apparatus and system of the above character which can be utilized for obtaining the equation of complex gain versus frequency which is an optimum linear fit to a non-linear system passing random signals.

Another object of the invention is to provide a method, apparatus and system of the above character in which gain and phase can be automatically measured utilizing only the signals existing in an operating system and without the introduction of a signal into the system.

Another object of the invention is to provide a method, apparatus and system of the above character which can be utilized for analyzing a measured time function to obtain the equation of the Fourier transform.

Another object of the invention is to provide a method, apparatus and system of the above character which repetitively analyzes a measured time function to obtain its Laplace transform.

Another object of the invention is to provide a method, apparatus and system of the above character which can be utilized for calculating a power-density spectrum as a ratio of polynomials in powers of the frequency variable from the autocorrelation function.

Another object of the invention is to provide a method, apparatus and system of the above character for calculating the power spectrum from an autocorrelation function by comparing the responses of a set of networks to an impulse and to the autocorrelation function.

Another object of the invention is to provide a method, apparatus and system of the above character for calculating the power spectrum from an autocorrelation function by comparing responses of a set of networks to a step function and to the autocorrelation function.

Another object of the invention is to provide a method, apparatus and system of the above character for determining the coefficients in the differential equation describing an unknown process.

Another object of the invention is to provide a method, apparatus and system of the above character for determining the coefficients in the differential equation describing an unknown process even though the response signal from the process contains a component of additive noise which is not correlated with the input to the process.

Another object of the invention is to provide a method, apparatus and system for determining the transference of a process in Fourier transform notation even though the output of the process contains components due to different inputs which are not measurable.

Additional objects and features of the invention will appear from the following description in which the preferred embodiments are set forth in detail in conjunction with the accompanying drawings.

Referring to the drawings.

In general, the present invention for determining the relationship between two signals is characterized by the provision of novel means for generating state variables from the two signals which are functions of time and the provision of novel means for forming a trial differential equation relating the two signals. Means is provided for forming an error measure of the error between the trial differential equation and the actual differential equation, minimizing the error measure by summing the weighted state variables, and using parametric feedback to correct the trial differential equation until the sum of the weighted state variables is minimized.

More specifically, the apparatus and system utilized for identifying the relationship between two signals comprises means for generating a plurality of first derived signals linearly related to the first of the two signals and means for generating a plurality of second signals linearly related to the second of the two signals. Means is also provided for determining a plurality of coefficients and multiplying the same with the first and second derived signals. Means is provided for forming a sum of the products and amplifying the same. Means is provided for generating a signal containing a component related to the product of the amplified sum and one of the state variables. Means is also provided for adding the last named signal to the predetermined coefficient which was previously multipled as a factor times said one of the state variables.

Figure 1:
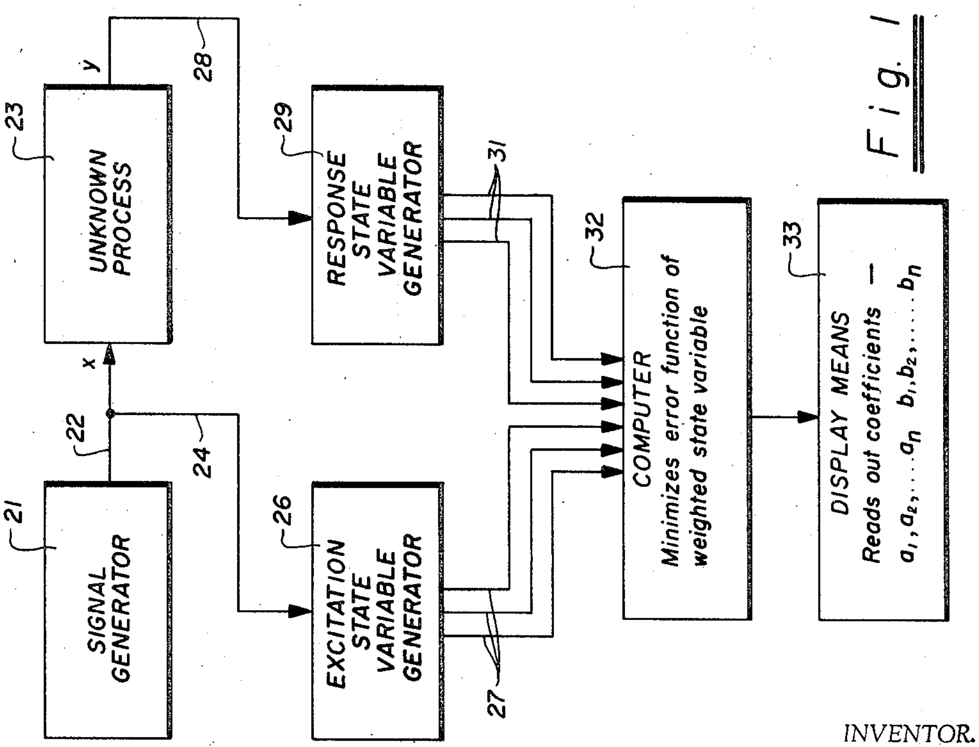
FIG. 1 is a block diagram of the system and apparatus for the identification of the relationship between two signals incorporating my invention.

More in particular, there is shown in FIG. 1 a system and apparatus for identifying the relationship between two signals. This apparatus may also be called an identification machine. This apparatus or machine consists of a signal generator 21 which delivers an excitation signal 22 to excite an unknown process 23. The output from the signal generator 21 is also supplied on a circuit 24 to an excitation state variable network 26 which produces a plurality of excitation state variables on a plurality of output circuits 27 which are linearly related to the excitation signal from the signal generator 21. The response of the unknown process 23 to the excitation signal from the signal generator 21 is supplied on an output circuit 28 to a response state variable network 29 which produces a plurality of response state variables on a plurality of output circuits 31 which are linearly related to the output signal from the unkown process 23.

In general, it can be stated that the excitation state variables on the circuits 27 are related to one another by the mathematical operation of either integration or differentation, and similarly the response state variables on the circuits 31 are related to one another by the mathematical operation of integration or differentation. The state variable networks 26 and 29, as hereinafter explained, can each consist of one network with a plurality of taps so that different voltages are available or can consist of a plurality of different networks, each one of which produces a separate voltage. The networks 26 and 29 can be of any suitable type so long as a linear relationship is created between the input to the network and the output of the network. Preferably, the relationship between the state variable and the excitation signal supplied to the network are such that the input signal has a denominator term in the transfer function which is the same as the denominator term in the transfer function for the relationship between each state variable and the input to the network or between each response state variable and the response signal.

As can be seen in FIG. 1, the excitation state variables on the circuits 27 and the response state variables on the circuits 31 are supplied to a computer 32. The purpose of the computer 32 is to form a trial differential equation. The differential equation consists of a constant times one of the state variables plus a different constant times a different one of the state variables, etc., so that a sum of all of the constants each times its respective state variable is equal to zero. If the constants are all of the proper values, the sum of the equation will be zero and the constants will properly represent the differential equation of the unknown process 23. However, if the constants are of the wrong values, then the sum of the products of each constant times its corresponding state variable will add up to provide an error function which is different than zero. The computer 32 analyzes the error function to bring it to zero by determining which constant is in error and in which direction it is in error. This analysis of the decomposition of the error function into its components due to the errors in the different constants is performed by multiplying the error function times one of the state variables. This product will have an average essentially equal to zero if the constant corresponding to that state variable is correct; and conversely, if the constant corresponding to the state variable is wrong, then this product will have a non-zero mean or an average value which has a magnitude proportional to the error in the constant and a polarity proportional to the polarity of the error in the constant. To correct the constant, then, the product of the state variable times the error function is integrated and the integral is added to the constant corresponding to that state variable. The polarity of the feedback loop is chosen to reduce the error to a minimum. With a feedback loop on all but one of the constants associated with the excitation and response state variables, and each feedback loop arranged to minimize the error due to the constant which it is controlling, the error function will be driven to an average of zero.

The useful information which this computer 32 derives is the set of constants which are changed until the sum of the products of these constants times the corresponding state variables is continuously equal to zero. This useful information is read out by a display means 33. For example, if the constants are obtained as the output voltages of a bank of integrators, then a meter can be switched to any one of the integrators to read its output voltage. The unknown process 23, as shown in FIG. 1, is intended to represent any unknown device which can receive an excitation and have a response which is related to the excitation by a linear differential equation. For example, the process could be an audio amplifier in which the excitation is the microphone input and the response is the loudspeaker output, or the process could be a dynamo electric amplifier in which the excitation is a field voltage and the response is an armature voltage, or the process could be a two-terminal filter in which the excitation is the voltage impressed across the two terminals and the response is the current which flows into one terminal and out of the other. Or, the process could be a hydraulic transmission system in which the excitation is the displacement of a hydraulic valve and the response is the force on a hydraulic cylinder.

The signal generator 21 in FIG. 1 should not be a fixed single frequency oscillator. Preferably, it is a random noise or signal generator such as a low frequency Gaussian noise generator manufactured by Automation Laboratories, Inc. of 179 Liberty Ave., Mineola, N.Y.; but it may be a square-wave generator, or a triangle wave generator, or a repetitive pulse generator, or a random pulse generator. The signal generator 21 in FIG. 1 may be a sweeping oscillator or an FM modulated oscillator whose rate of change of frequency is very large compared to the rate of convergence of the computer 32 in FIG. 1 to the values of the constants. The reason for this is that during the time of convergence, a large number of different frequencies should have passed through the process. The reason that the signal generator should vary its frequency rapidly is that it must deliver a wide variety of different frequencies for the excitation of the process during the time that the computer is changing the constants which it is evaluating.

The coefficients of the differential equation read out by the display means 33 can be designated as $a_0$, $a_1$, $a_2 \ldots a_k$ and $b_0$, $b_1$, $b_2 \ldots b_k$. Within the computer 32, there is provided means for forming the sum $e$ of the products of the state variables times the corresponding coefficients. The state variables on the circuits 27 can be designated as $X_0, X_1 \ldots X_k$. The state variables on the circuits 31 can be designated as $Y_0, Y_1 \ldots Y_k$. The equation for the sum $e$ can be written as follows:

$$e=\sum_{n=0}^{n=k}(a_nX_n+b_nY_n) \quad (1)$$

The computer 32 is also provided with means for forming the plurality of products of each state variable times the function of the sum $e$. If the function of the sum $e$ is designated $f(e)$, then this plurality of products is $$X_0f(e),\ X_1f(e)\ \ldots\ X_nf(e)\ \ldots\ X_kf(e),\ Y_0f(e),\ Y_1f(e)\ \ldots\ Y_nf(e)\ \ldots\ Y_kf(e)$$

The computer 32 is also provided with means for integrating each of the above products and changing each of the coefficients but one in response to a time integration of one of the products in the plurality of products above. Specifically, the time integrations are:

$$a_0=-K\int_{-\infty}^{0}X_0f(e)dt$$
$$a_n=-K\int_{-\infty}^{0}X_nf(e)dt \quad (2)$$
$$a_k=-K\int_{-\infty}^{0}X_kf(e)dt$$

$$b_0=-K=\int_{-\infty}^{0}Y_0f(e)dt$$
$$b_n=-K\int_{-\infty}^{0}Y_nf(e)dt \quad (3)$$
$$b_k=-K\int_{-\infty}^{0}Y_kf(e)dt$$

The meaning of the integral notation used above with time limits from minus infinity to zero is that the integration has been carried out from the time when the equipment was turned on until the present time. No initial value of the coefficient is shown in each equation above because in normal operation the integration is continued for an amount of time sufficient to destroy the initial values of the coefficients at the time that the equipment was turned on.

With the proper choice of the function $f(e)$, $e$ will be driven towards a minimum, and the coefficients $a_k$ and $b_k$ will change due to the action of the integrators until they reach final steady state values, which values will satisfy the following differential equation for the unknown process 23 giving the relationship between the excitation on circuit 22 called X and the response on circuit 28 called Y.

$$\sum_{n=0}^{k} (a_n T^n p^n X + b_n T^n p^n Y) = 0 \qquad (4)$$

The function $f(e)$ can be linearly proportional to $e$, such as would be obtained from an amplifier whose input is $e$. Alternatively, the function $f(e)$ can be the polarity of $e$ only, i.e., $e/|e|$. In this case, the function can be generated by the motion of the armature of a relay whose coil current is driven by the output of an amplifier whose input is $e$. The plurality of products above can then be obtained by connecting each state variable to reversing contacts mounted on the armature of the relay.

It should be appreciated that the present invention is not limited to the function $f(e)$ enumerated above. For example, the function $e|e|$ may be used, or the function $e^3$ may be used. As another example, for $m$ equal to 2 or greater, the function may be $$f(e) = (X_n^{1-/1m} + eX_n^{-1/m})^m - (X_n^{1-1/m} - eX_n^{-1/m})^m \qquad (5)$$

Figure 2:
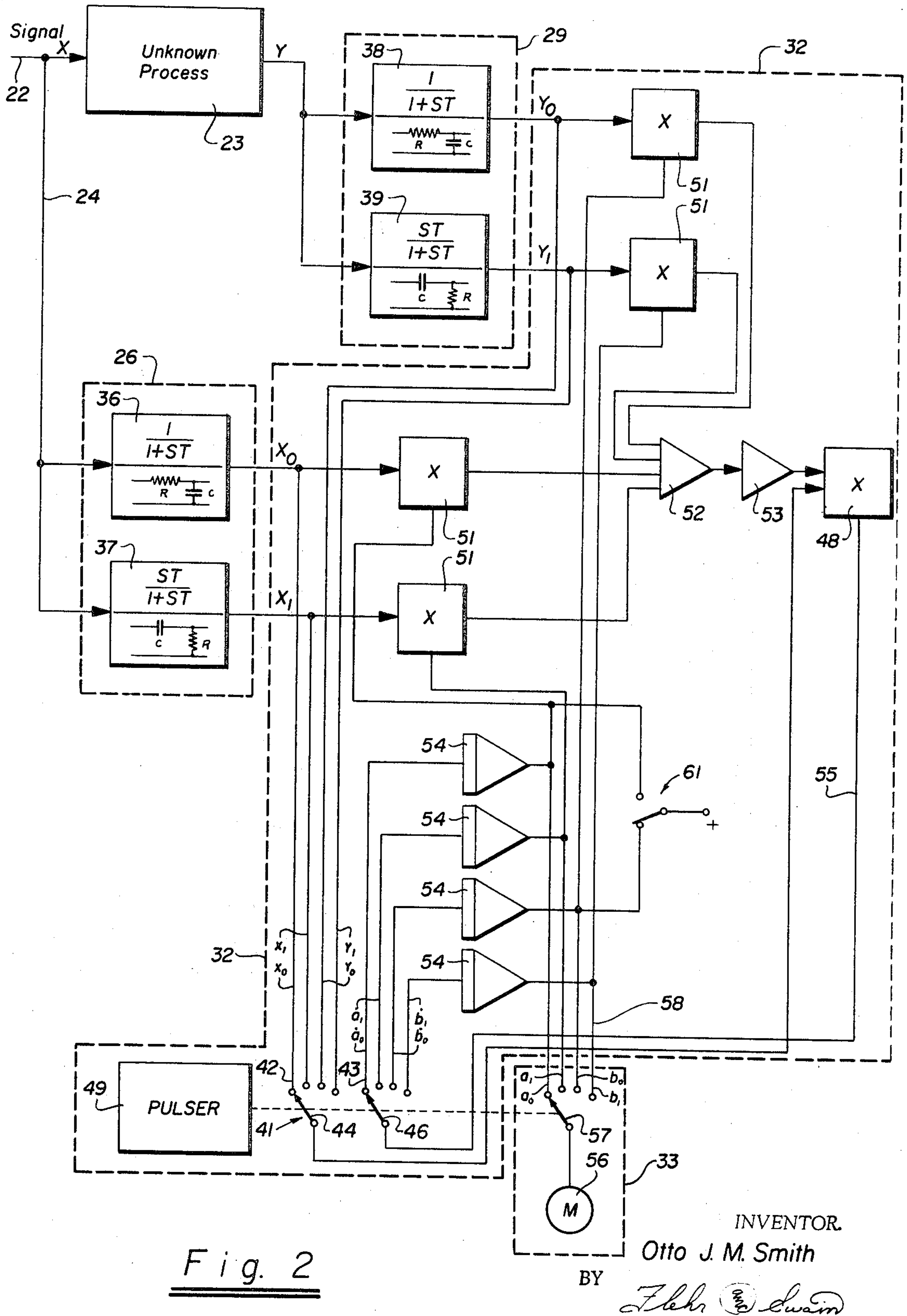
FIG. 2 is a circuit diagram, partially in block form, of one type of identification machine, apparatus or system incorporating my invention.

FIG. 2 shows a wiring diagram partially in block form of an identification apparatus or machine of the type shown in FIG. 1. Analog computer notation is used in FIG. 2 and analog computer terminology will be used in describing the operation of FIG. 2. The signal X to the unknown process 23 is derived from the signal generator 21 is explained in FIG. 1. The signal Y is the response from the unknown process 23. Signal X passes on circuit 24 through two different filter networks 36 and 37 which make up the state variable network 26 and generate two different voltages $X_0$ and $X_1$, respectively. The voltage $X_0$ is generated by the network 36 which is a lag filter formed by a series resistor R and a shunt capacitor C so that the output voltage is read across the capacitor and is related to the signal X by the transfer function $$\frac{1}{1+sT}$$

The signal $X_1$ is produced by the filter network 37 which consists of a series capacitor C and a shunt resistor R so that the voltage is read across the resistor R. The signal $X_1$ is related by the transfer function $$\frac{sT}{1+sT}$$

so that the signal $X_1$ is the pure derivative of the signal $X_0$ times the constant T. The signals $X_0$ and $X_1$ correspond to the excitation state variables appearing on the circuits 27 in FIG. 1.

In a similar manner, the output signal Y is supplied to a pair of filter networks 38 and 39 which form the response state variable network 29 to produce two different voltages $Y_0$ and $Y_1$ which correspond to the state variables appearing on the circuits 31 of FIG. 1. The signal $Y_0$ is produced by a lag filter network 38 which is formed in the same manner as filter network 36 so that the output signal $Y_0$ is related by the transfer function $$\frac{1}{1+sT}$$

to the input signal Y. Similarly, the output signal $Y_1$ is produced by a lead filter network 39 so that the output signal $Y_1$ is related by the transfer function $$\frac{sT}{1+sT}$$

to the input signal Y. More generally stated, the state variable networks 26 and 29 are preferably chosen so that the network producing the state variable $X_0$ is identical to the network producing the state variable $Y_0$. The same is true for $X_1$ and $Y_1$.

The state variables $X_0$, $X_1$, $Y_0$ and $Y_1$ are supplied to the computer 32 which, in the embodiment shown in FIG. 2, consists of a stepping switch 41 which is provided with two banks 42 and 43 of stationary contacts adapted to be engaged by a pair of movable contacts 44 and 46, respectively. The state variable signals are connected to the stationary contacts of bank 42 so that one of the state variables can be selected at a time, to be supplied to the input of a multiplier 48 which also can be identified as an analyser. The contacts of bank 42 are, therefore, identified as $X_0$, $X_1$, $Y_0$ and $Y_1$. The second bank of stationary contacts 43 of the stepping switch 41 are identified as $\dot{a}_0$, $\dot{a}_1$, $\dot{b}_0$ and $\dot{b}_1$ which are adapted to be contacted by the movable contact 46 and to be supplied with energy from the analyzer 48. The dot (·) over each of the coefficients indicates the derivative of the coefficient with respect to time. The movable contacts 44 and 46 are ganged together as shown and are driven by a pulser 49 which controls the amount of time that the stepping switch dwells on each set of contacts. As can be seen from FIG. 2 of the drawings, the arrangement of the stepping switch is such that when the signal $X_0$ is being contacted, the signal $\dot{a}_0$ is also being contacted and when the signal $Y_1$ is being contacted, the signal $\dot{b}_1$ is also being contacted.

The state variable $X_0$, $X_1$, $Y_0$ and $Y_1$ are also supplied to the input of four different multipliers 51. As can be seen in the drawings, the outputs of these four different multipliers 51 are added together in a summing amplifier 52. The output of the summing amplifier 52 is further amplified in another amplifier 53 and its output is applied to the analyzing multiplier 48. Two stages of amplification are provided for the summing amplifier in order to produce the proper polarity in the feedback loop which is adjusting the coefficients in the differential equation. Each of the four multipliers 51 receives a coefficient. Thus, the multiplier which receives the signal $X_0$ receives the coefficient $a_0$, and the multiplier 51 which receives the signal $Y_0$ receives the coefficient $b_0$. These coefficients are supplied from the contacts 43 through integrators 54 and the outputs of the integrators are connected to the corresponding multipliers 51. The four signals $a_0$, $a_1$, $b_0$ and $b_1$ supplied to the four multipliers 51 are the four coefficients in the differential equation describing the unknown process 23 and the four products which are formed by the multipliers 51 represent the differential equation. If these four constants are correct, then the signals into the summing amplifier 52 should be equal to zero. The output of the summing amplifier 52 is an error signal or an error function which has a large value when the coefficients $a_0$, $a_1$, $b_0$ and $b_1$ are wrong and has a zero average value when the coefficients are correct. The analyzer 48 adjusts the coefficient to minimize the error by performing a multiplication of the error function by a state variable and supplies the product obtained through a feedback loop 55 connected to movable contact 46 to adjust the corresponding coefficient.

By way of example, let it be assume that the stepping switch 44 takes the state variable $X_0$ and multiplies it by the error function on feedback loop 55 and delivers an input to the integrator 54 through the stepping switch contact 43 marked $\dot{a}_0$. The output of the integrator 54 connected to the contact $\dot{a}_0$ is the constant $a_0$ and this is supplied to the multiplier 51 connected to the $X_0$ signal. The outputs of the other integrators 54 are connected in a similar manner to their corresponding multipliers 51.

In the arrangement shown, the display means 33 is in the form of a meter 56 which is connected to a movable contact 57. The movable contact 57 can engage another bank 58 of stationary contacts of the stepping switch 41 and it can be driven by the same pulser 49. Alternatively, the movable contact 57 can be shifted manually to engage the stationary contacts of bank 58.

The feedback loop 55 shown in FIG. 2 when the contact 46 is in engagement with the $a_0$ contact will produce continuously a rate of change of $a_0$ in the correct direction until the error function entering the analyzer multiplier 48 is minimized. The normal operation of the apparatus shown in FIG. 2 is not to permit the constant $a_0$ to be adjusted for a sufficient length of time to minimize the error function but only to permit the constant to change a small amount and then the stepping switch steps to the next contact and receives the state variable $X_1$, analyzes the error function utilizing the state variable $X_1$ and uses this analysis to correct the constant $a_1$, and making only a small part of the total correction necessary in the constant $a_1$. Then, the stepping switch continues to step through the other contacts and when it has cycled through all positions, it returns to the position as shown in FIG. 2 and makes an additional correction in the constant $a_0$ and repeats this cycling in a periodic manner until the necessary correction is obtained for all of the constants.

In accordance with conventional analog computer notation, all of the multipliers and the summing amplifiers and the integrators in FIG. 2 are assumed to be of the inverting type such that the output is the negative of the operation on the input which the device is intended to perform.

A clamping switch 61 is provided which is connected to the parameter $b_0$ and holds it at the constant value of $+1$ irrespective of the output of the integrator connected to $b_0$. The clamping switch 61 is used because a differential equation utilizing two terms in the numerator and two terms in the denominator has four coefficients but only three of the coefficients are independent, that is, one can select any one coefficient and divide all the others by it and obtain a correct differential equation. Changing $b_0$ would simply have changed all the numerator terms and all the denominator terms up or down by some constant factor. In order to set the scale of these factors and have only as many converging operations in the identification machine as the number of independent variables, one can, therefore, solve for only three of the four coefficients. By setting the parameter $b_0$ equal to one, then the other three cofficients can be solved for. This is satisfactory if the unknown process contains either differentation or gain at zero frequency but this is not satisfactory if the unknown process contains pure integration. In that case, the parameter $b_0$ should be zero. With the clamping switch 61 in the position shown in FIG. 2, the parameter $b_0$ is held at unity and this will cause all the other parameters to tend to increase to very large numbers. For measuring an unknown process containing pure integration, the clamping switch 61 of FIG. 2 is thrown to the upper position shown in FIG. 2 in which the parameter $a_0$ is held at unity. Then, during the normal operation of the machine, the parameter $b_1$ will reach a finite number and the parameter $b_0$ will reach zero. Thus, when the clamping switch 61 is in the upper position, the machine is satisfactory for measuring unknown processses which have either unity D-C gain or infinite D-C gain due to one or more integrations.

The state variable networks shown in FIG. 2 are of a unique type. They are chosen such that the network producing the state variable $X_0$ is identical to the network producing the state variable $Y_0$. The reason for this is that the poles of this state variable network are, therefore, removed from the differential equation and permit a representation of the unknown process by a set of parameters closely related to the coefficients of the conventional differential equation. In a similar manner, the poles of the network to produce the state variable $X_1$ are the same as the poles of the network to produce the state variable $Y_1$. This also results in a simplification of the interpretation of the parameters which are obtained by the identification procedure and also result in a larger number of independent variables which can be evaluated by the identification machine for a given quantity of equipment. In addition, in FIG. 2, a further improvement has been made by setting the poles of the state variable network to produce the state variable $X_0$ also equal to the poles of the state variable network to produce the state variable $X_1$. In other words, not only do the state variable networks appear in pairs which are identical, i.e., the pair for $X_0$, $Y_0$ and the pair for $X_1$, $Y_1$ which is one important requirement, but, in addition, the poles of one pair are equal to the poles of the other pair. This, then causes these pole terms to completely cancel out of the relationship which is fulfilled by the identification machine so that the relationship which is fulfilled by the identification machine has the same parameters in it as the conventional differential equation, i.e., the parameters $a_0$, $a_1$, $b_0$ and $b_1$ are the coefficients of the first order differential equation representing the unknown process. If the unknown process contains second or third order terms, then the identification machine must contain additional state variable to analyze for these higher order terms. In general, the state variable machine will contain many of these state variable networks and many parameters like $a_1$ and $b_1$, but for the purposes of illustration, FIG. 2 has been shown sufficient to identify in the unknown process one numerator zero, one denominator pole and one gain term.

Previous investigators who have attempted to build identification machines of this type have tried to generate the state variable $X_1$ by the calculating the derivative of the signal X and have tried to generate corresponding state variable $X_2$ by generating the second derivative of the signal X. Now it is well known to those skilled in the art that pure first derivatives and pure second derivatives cannot in fact be calculated, and consequently, previous attempts to build identification machines have resulted in state variables with errors that are related to the dynamic mistakes made in attempting to generate state variables with unrealizable networks.

The unique networks used in FIG. 2 are realizable networks as hereinafter described such that the derivative is generated with its corresponding pole which cannot be eliminated and then the state variable $X_0$ is generated by using the pole alone. This produces a relationship between state variables which contain no error, that is, the state variable $X_1$ is the pure derivative of the state variable $X_0$ and nothing need be said about its relationship to the signal X. Or stated another way, the state variable $X_1$. It is the derivative of the signal X with a significant amount of filtering.

From the foregoing, it can be seen that the network 26 comprises means for generating a plurality of first derived signals which are linearly related to the first of two signals, that is, the input signal X. The network 29 consists of means for generating a plurality of second derived signals which are linearly related to the second of two signals, that is, the output signal Y, from the unknown process. The coefficients $a_1$, $a_0$, $b_1$, $b_0$ which are determined can be called weighting factors. These weighting factors are multiplied by multipliers 51 with the corresponding linearly derived signal. The products obtained are added in the summing amplifier 52 and a multiplier or analyzer 48 is utilized for generating a correction signal containing a term which is proportional to the product of the amplified sum and one of the derived signals. This correction term is added to the weighting factor corresponding to the derived signal.

Figure 3:
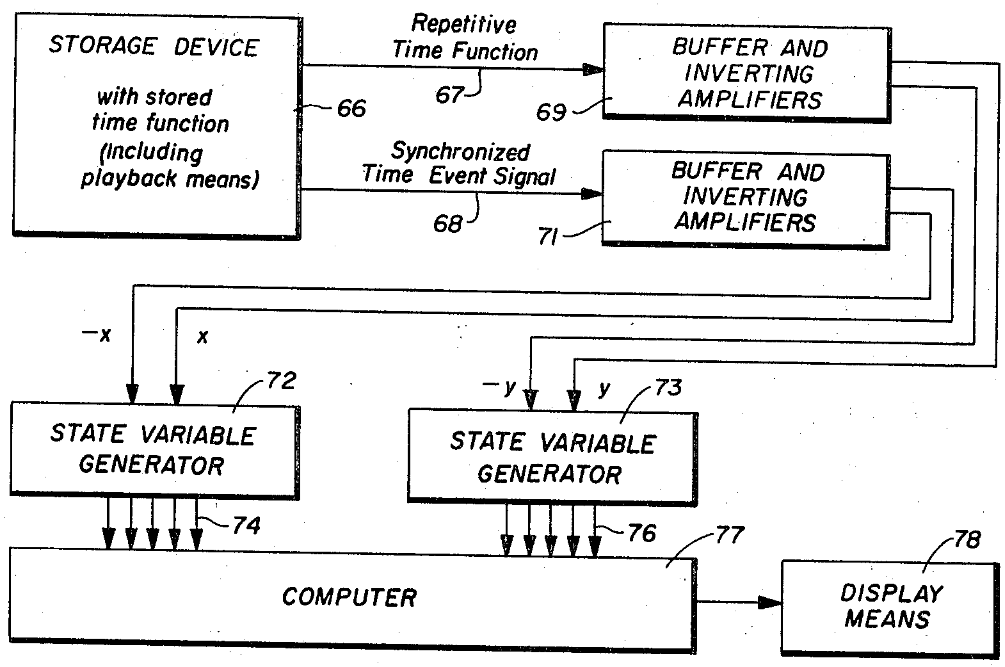
FIG. 3 is a block diagram of an identification machine, system or apparatus incorporating another embodiment of my invention used to calculate and display the equation giving the relationship between two time functions which are stored in a predetermined time relationship in a storage device.

In FIG. 3, there is shown a block diagram of an identification machine, system or apparatus incorporating another embodiment of my invention utilized to calculate and display the differential equation giving the relationship between two time functions which are stored in a time relationship one to another on a storage device. In other words, the machine or system as shown in FIG. 1 delivers the coefficients in the differential equation for the Fourier transform of a function of time. The machine, apparatus or system includes a storage device 66 which has stored therein the function of time to be analyzed with provision, i.e., playback means for reading out the time function sequentially in time, in either real time or time scaled in a linear proportional manner.

Thus, the storage device 66 may be a magnetic tape recorder with conventional motor drive and playback head. Alternatively, the storage device 66 may be a curve follower with the time function in the form of a marked curve so that the curve follower reads the amplitude coordinate while the time coordinate is linearly varied in the direction of positive time. The storage device 66 also may be a core memory and digital computer which is read out in increments of computing time which are proportional to the increments of real time which elapsed during the acquisition of the data. Also, the storage device 66 may be a stack of punched IBM computer cards in a card reader, which cards are read at intervals proportional to the intervals of real time during acquisition of the data.

In general, regardless of the form of the storage device 66, the time functions will be played back with a time scale chosen for convenience with respect to the state variable generating devices included as the part of the machine, apparatus or system and the computer convergence rate. The actual time scales or the time functions analyzed may vary from curves representing months or years of biological or weather data to pulses of one nanosecond or less in length.

The storage device 66 is provided with two information outputs or channels 67 and 68. The first information output on channel 67 is the stored time function repeated over and over again at some predetermined convenient repetition rate, and identified as a repetitive time function in FIG. 3. The second information output on channel 68 is a synchronized time event signal that may be a pulse timed to occur exactly at the instant that each time function starts on channel 67 and is identified in FIG. 3 as the "synchronized time event signal." If the time event signal occurs earlier than the start of the time function on the channel 67, then the delay will be included in the equation for the time function. The time event signal on channel 68 must be repeated for each repetition of the time function on channel 67.

The time event signal on the channel 68 may be a step function or any other known and well defined shape if suitable changes are made in the interpretation of the computer output. In particular, if the repetitive time function on channel 67 is a step response of a system and if it is desired for the computer to deliver the Fourier transform of the system impulse response, then it will do so automatically if the time event signal is a step function instead of an impulse.

As pointed out above, the two signals appearing on channels 67 and 68 can be considered as the excitation to an unknown process and the response from an unknown process as discussed in connection with FIGS. 1 and 2.

The channel 67 and 68 are connected to buffer and inverting amplifiers 69 and 71 with the buffer and inverting amplifiers 69 being provided with two output channels designated as —X and X, and the buffer and inverting amplifiers 71 having two outputs identified as —Y and Y. The buffer and inverting amplifiers are of conventional types and serve as buffers and provide inverted signals in a manner well known to those skilled in the art.

The —X and X signals from the amplifier 69 are delivered to state variable generator 72, and the —Y and Y signals from the amplifiers 71 are delivered to state variable generator 73. The state variable generator 72 produces a plurality of state variable outputs on output channels 74, and similarly the state variable generator 73 produces a plurality of state variable signals on channels 76. The channels 74 and 76 are connected to a computer 77 which is utilized for minimizing the sum of the weighted state variables. The output of the computer is supplied to display means 78. The state variable generators 72 and 73, computer 77 and display means 78 operate in a manner similar to that described in conjunction with FIGS. 1 and 2. The computation carried out by the computer 77 is much the same as hereinbefore described in conjunction with an identification machine in which excitation and response state variables are received by the computer in an on-line system being distributed by a signal generator such as the signal generator 21 as shown in FIG. 1. The computer 77 calculates the sum of the products of each state variable times the corresponding coefficient and sets this sum equal to zero by analyzing the value of the sum times each state variable to produce a rate of change of the corresponding coefficient. The set of coefficients obtained is a description of the differential equation of a device which, if it had received the synchronized time event signal, would have delivered the time function which was recorded. The set of coefficients is, therefore, the same set as one would have in the equation for the Laplace transform of the repetitive time function. This equation can be converted to the equation for the time function itself by taking the inverse Fourier transform through the use of conventional tables.

Stated in other words, the computer 77 calculates the Laplace transform of the repetitive time function as a ratio of polynomials in the Laplace variable $s$, and displays the values of the coefficients of the powers of $s$ in these polynomials in the display means 78.

Let it be assumed that the repetitive time function on the channel 67 is designated as $F(t)$, where $t=0$ at the instant that the time event signal occurs on information channel 68. Let it be assumed that the time event signal on channel 68 is an impulse whose duration is short compared to the time required for any significant changes in $F(t)$. The buffer and inverting amplifiers 69 may introduce a scaling factor $K_Y$ and the buffer amplifiers 71 may introduce a scaling factor $K_X$, so that $$X=K_X\,\delta(t) \qquad (6)$$

$$Y=K_Y\,F(t) \qquad (7)$$

The computer will solve for the Fourier transform $F(t)$, which is $$F(t)=\frac{K_X}{K_Y}\frac{F_Y}{F_X} \qquad (8)$$

The state variable generator 72 is designed so that the plurality of state variables on channels or circuits 74 can be used to fulfill the conditions of Equations 2. The state variable generator 73 is identical in mathematical operations to the generator 72, so that the plurality of state variables on the channels 76, if designated $Y_n$, can be used to fulfill the conditions of Equations 3. The computer 77 contains the computations of Equations 1, 2 and 3. The computer 77, therefore, operates in a regressive or iterative manner to minimize $e$ in Equation 1, resulting in a set of coefficients $a_k$ and $b_k$ satisfying the Equation 4.

In Laplace transform terminology, the condition which is satisfied is $$\sum_{n=1}^{k}(a_nT^ns^nLX+b_nT^ns^nLY)=0 \qquad (9)$$

The apparent transfer function from X to Y is $$\frac{LY}{LX}=-\frac{\sum_{n=0}^{k}a_nT^ns^n}{\sum_{n=0}^{k}b_nT^ns^n} \qquad (10)$$

The $a_n$ coefficients which are displayed by the display means 78 are the coefficients in the numerator polynomial in powers of $s$T. The $b_n$ coefficients which are displayed by the display means 78 are the coefficients in the denominator polynomial in powers of $sT$. The Laplace transform of the repetitive time function $F(t)$ is, therefore $$LF(t)=-\frac{K_X}{K_Y}\frac{\sum_{n=0}^{k}a_nT^ns^n}{\sum_{n=0}^{k}b_nT^ns^n} \qquad (11)$$

It should be noted that in the machine shown in FIG. 3 that the length of the repetitive time function which is recorded may be insufficient for the machine to reach its final steady state values for the coefficients which are read out. For this reason, the storage device 66 should include means for reading out the information carried therein a number of times, i.e., the time event signal and the corresponding time function should be played repeatedly until the identification machine has reached its steady state identification.

One example of the use of the apparatus shown in FIG. 3 is analyzing the average of the recorded cortical potentials in a cat's brain due to exciting the olfactory nerve. By way of example, the excitation may have been repeated fifty times and the recorded potentials from the cat's brain recorded fifty times. The average of these fifty recordings produces the one time function marked repetitive time function on the first information channel 67 in FIG. 3. The synchronized time event signal is the instant of excitation of the olfactory nerve on the same time scale as the average time function. This would appear on the second information channel 68. The differential equation which is delivered by the computer 77 is the Fourier transform of the cortical response function.

Figure 4:
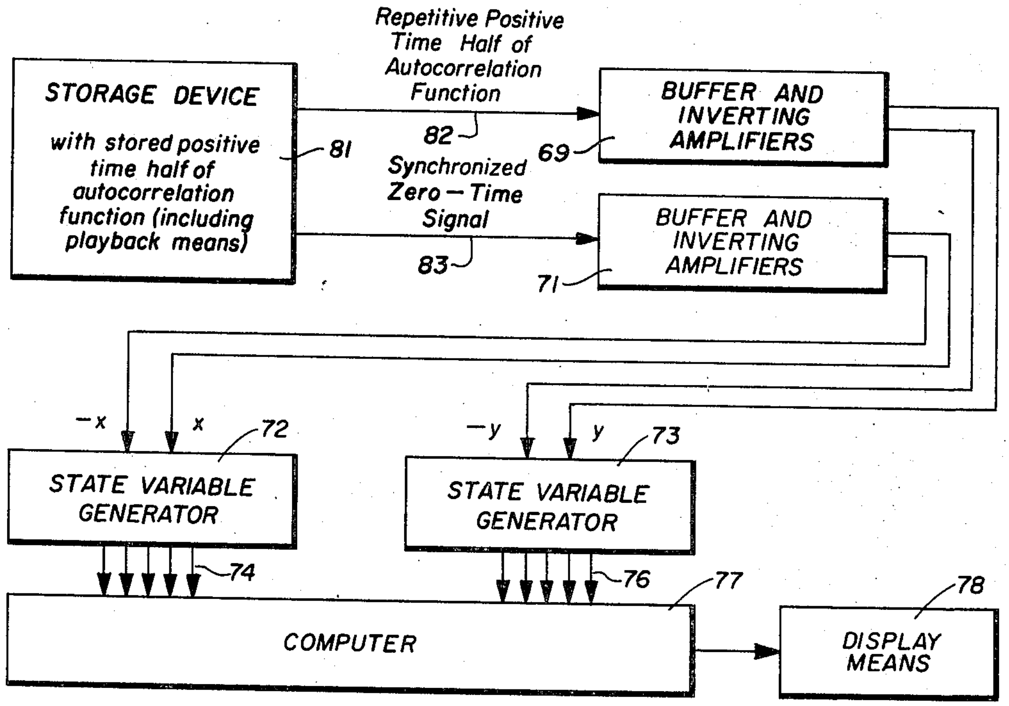
FIG. 4 is a block diagram of an identification machine and apparatus similar to that shown in FIG. 3 with the exception that the storage device has recorded in it a stored positive time function which is one-half of an autocorrelation function of a random signal.

In FIG. 4, there is shown a block diagram of an identification machine, apparatus or system similar to that shown in FIG. 3 with the exception that a storage device 81 has been provided which has means for storing the positive time half of a given autocorrelation function. As the storage device 66, the storage device 81 has means for single and repetitive non-destructive readout of the information stored in the storage device in the form of playback means so that on channel 83, there appears a timing signal of an impulse, pulse or step form which is used to define an instant of zero time. During playback, channel 82 carries the stored signal varying in time whose amplitude is proportional to the magnitude of the stored autocorrelation function, which magnitude occurs at an instant in real time following the zero time impulse on circuit 83 proportional to the value of $\tau$ in the time coordinate of the autocorrelation function. On circuit 83 there, therefore, appears an impulse or time marker at the beginning of each playback interval or readout sequence. The machine or apparatus can be operated for one complete positive-time half of an autocorrelation function only, or it can be arranged to automatically repeat at either random intervals or at periodic intervals of time.

Channels 82 and 83 are connected to buffer and inverting amplifiers 69 and 71 in the same manner that channels 67 and 68 are connected in FIG. 3. Similarly, the outputs of the amplifiers 69 and 71 are connected to state variable generators 72 and 73. The outputs of the state variable generators are supplied to the computer 77 and the output of the computer 77 is supplied to the display means 78. As in previous embodiments, the computer 77 calculates the appropriate weightings necessary to minimize the sum of the weighted state variables. The weightings obtained are the coefficients in the Fourier transform of the stored signal.

To facilitate the explanation of the operation of the machine or apparatus shown in FIG. 4, let the signal stored in the storage device 81 be called $W(\tau)$. $\tau$ is the value of the independent time coordinate, and W is the amplitude of an impulse response or autocorrelation function, which is a dependent variable which is a function of $\tau$. The storage device 81 is capable of readout or playback in real time $t$, in which the stored data may be either greatly speeded up (as when reading out ocean wave data) or greatly slowed down (as when reading out radio or microwave spectra).

The relationship between real time $t$ and stored time $\tau$ can be expressed by a compression ratio factor given by $$r=\tau/t$$

The impulse timing signal that appears on the circuit 83 at the instant that readout of $W(\tau)$ starts shall be called the Dirac delta function $\delta(t)$. If desired, any other form of timing signal can be supplied on the circuit or channel 83 as, for example, timing signals such as $\int dt(\delta(t)-\delta(t-\theta))$ or $\int dt\delta(t)$. The stored signal that appears on circuit 82 during readout is $W(rt)$ which shall hereafter be called $W(t)$. The purpose of the buffer and inverting amplifiers 69 is to adjust the level of the signal and to provide a symmetrical push-pull output with the signal on one channel being the negative of the signal on the other output channel of the buffer and inverting amplifier 69. The positive signal is $K_1W(t)$. The negative signal is $-K_1W(t)$.

The purpose of the buffer and inverting amplifiers 71 is to provide the positive impulse called the Dirac delta function on one circuit and its negative on the other circuit. The positive signal is $-K_2\delta(t)$. The negative signal is $K_2\delta(t)$. Note that if the input on channel 83 is not $\delta(t)$, but the derived step $\int\delta(t)dt$, then the buffer and inverting amplifier 71 also takes the derivative of the input. If the input on channel 83 is not $\delta(t)$ but the derived pulse $\int dt(\delta(t)-\delta(t-\theta))$, then the buffer and inverting amplifier 71 takes the derivative of the input and clips for use only one polarity of the two impulses in the derivative, taking the first impulse only.

Figure 10:
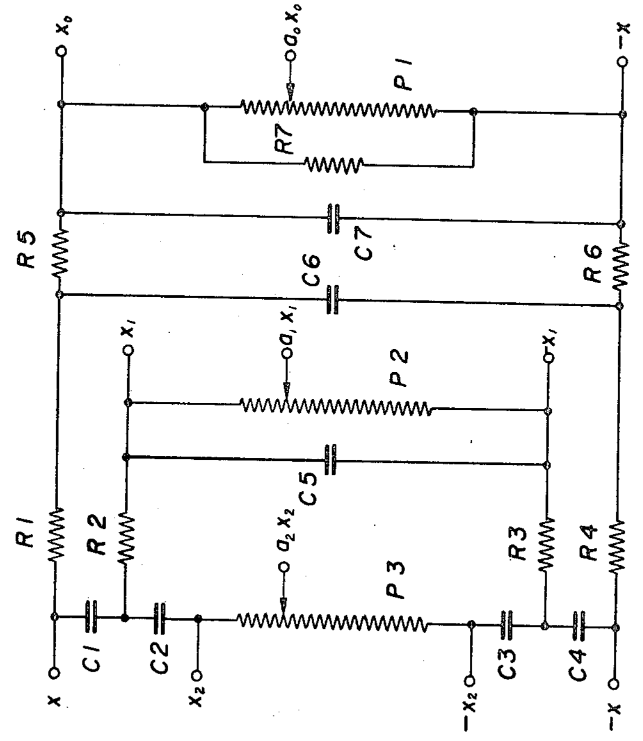

The state variable generator 72 can be constructed in the manner shown in FIG. 10, hereinafter described. The X and $-X$ signals from the buffer and inverting amplifier 71 are supplied to the terminals indicated in FIG. 10. The signal X is a negative impulse at the start of the computational time, whereas the signal $-x$ is the positive impulse at the start of the computational time. These pulses excite the circuitry shown in FIG. 10 and produce a transient pulse of two-time-constant wave shape between the $X_0$ and $-X_0$ terminals of the circuit shown in FIG. 10. The transient on the two terminals $X_0$ and $-X_0$ are two of the plurality of state variables produced on the circuits 74. A different transient pulse appears between the terminals $X_1$ and $-X_1$. The latter pulse appears to be the derivative of the two-time-constant pulse which appears between the $X_0$ and $-X_0$ terminals. This latter pulse has a finite first derivative with respect to time at zero time. The transients on terminals $X_1$ and $-X_1$ in FIG. 10 are two more of the plurality of state variables supplied on the circuits 74 and are designated as $X_1$ and $-X_1$, respectively. Still another transient pulse appears between the terminals $X_2$ and $-X_2$. This latter pulse appears to be the derivative of the pulse between the $X_1$ and $-X_1$ terminals in FIG. 10 and has a finite value at zero time. Its shape is an initial discontinuous rise, followed by the algebraic sum of two exponentially decreasing terms. The transients on terminals $X_2$ and $-X_2$ are two more of the plurality of state variables appearing on circuit 74 and can be appropriately designated as $X_2$ and $-X_2$, respectively.

Figure 11:
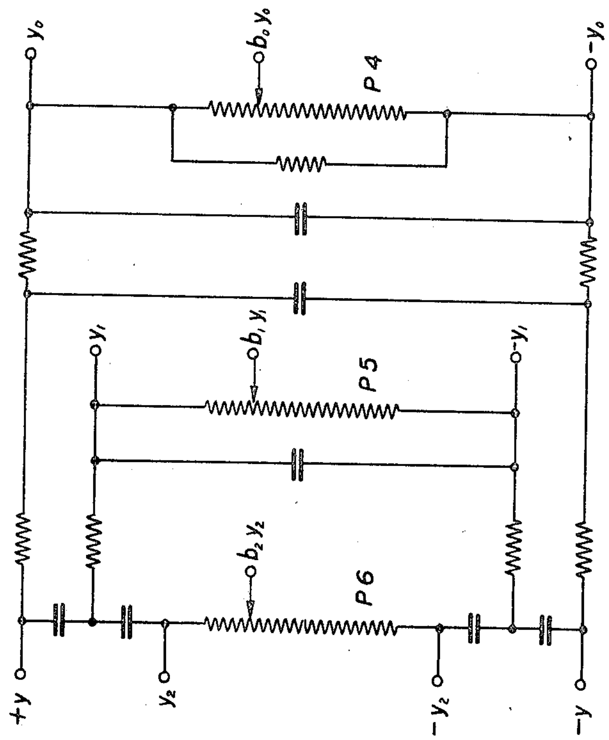
FIGS. 10 and 11 are circuits which receive excitation signals from FIG. 9 and generate three excitation state variables and multiplies each by its corresponding state variable coefficient.

The state variable generator 73 can be constructed in the manner shown in FIG. 11. The Y and $-Y$ outputs from the buffer and inverting amplifiers 69 are supplied to the Y and $-Y$ terminals shown in FIG. 11. The Y and $-Y$ signals exist after the $-X$ and X signals and the signals between the Y and $-Y$ terminals vary with time in accordance with the function $2K_1W(t)$. This function eventually dies down to zero before the end of the computational interval. This signal, which is varying in time, excites the circuit shown in FIG. 11. A transient response appears at the terminal $Y_0$, and this transient signal is one of the plurality of state variables on the circuit 76 in FIG. 4. An equal and opposite transient signal appears at the $-Y_0$ terminal in FIG. 11, which is another of the plurality of state variables on the circuits 76. A different transient appears on the $Y_1$ terminal, and an equal and opposite signal appears on the $-Y_1$ terminal, which transients can be designated as $Y_1$ and $-Y_1$, respectively. Still another different transient appears at the $Y_2$ terminals, and an equal and opposite signal appears on the $-Y_2$ terminal. This pair is another two of the plurality of state variables on the circuit 76 in FIG. 4.

The potentiometers P1–P6 in FIGS. 10 and 11 are preferably located within the computer 77. This computer 77 can also contain a circuitry of the type shown in FIG. 12 which, in conjunction with the six potentiometers identified above, minimizes the weighted sum of the state variables which appears on the $e$ bus in FIG. 12. The weightings $a_k$ and $b_k$ which become constant in the steady state are the desired computational coefficients.

Define the Laplace transform of the stored signal as $G(s)$.

$$LW(t)=G(s) \qquad (12)$$

Define the Fourier transform of the stored signal as $G(j\lambda)$.

$$FW(t)=\int_{-\infty}^{+\infty} e^{j\lambda t}W(t)dt=G(j\lambda) \qquad (13)$$

From the properties of the Fourier transform, a transform of a function reversed in time is equal to the complex conjugate of the transform of the function not reversed.

$$FW(-t)=G(-j\lambda) \qquad (14)$$

The stored signal is the positve time half of the autocorrelation function. The entire autocorrelation function is therefore $$\Psi(t)=W(t)+W(-t) \qquad (15)$$

or $$\Psi(\tau)=W(\tau)+W(-\tau) \qquad (16)$$

The Fourier transform of the autocorrelation function is the self-power spectrum, $\phi$.

$$\phi(\lambda^2)=F\Psi(t)=G(j\lambda)+G(-j\lambda) \qquad (17)$$

The form in which the machine should deliver the information necessary to substitute in the equation above for the self-power spectrum is a ratio of polynomials in lambda, for $G(j\lambda)$.

It will be shown that the machine does deliver the necessary information for the self-power spectrum in the following form:

$$G(j\lambda)=\frac{K_2(a_0+a_1j\lambda+a_2(j\lambda)^2+a_3(j\lambda)^3+\ldots)}{K_1(b_0+b_1j\lambda+b_2(j\lambda)^2+b_3(j\lambda)^3+\ldots)} \qquad (18)$$

$$G(j\lambda)=\frac{K_2}{K_1}\frac{\sum_{n=0}^{k} a_n(j\lambda)^n}{\sum_{n=0}^{k} b_n(j\lambda)^n} \qquad (19)$$

Amplifiers 69 and 71 deliver the signals $$X(t)=-K_2\delta(t) \qquad (20)$$

$$Y(t)=K_1W(t) \qquad (21)$$

The Laplace transforms of these signals are $$LX=X(s)=-K_2 \qquad (22)$$

$$LY=Y(s)=K_1G(s) \qquad (23)$$

Figures 12, 13:
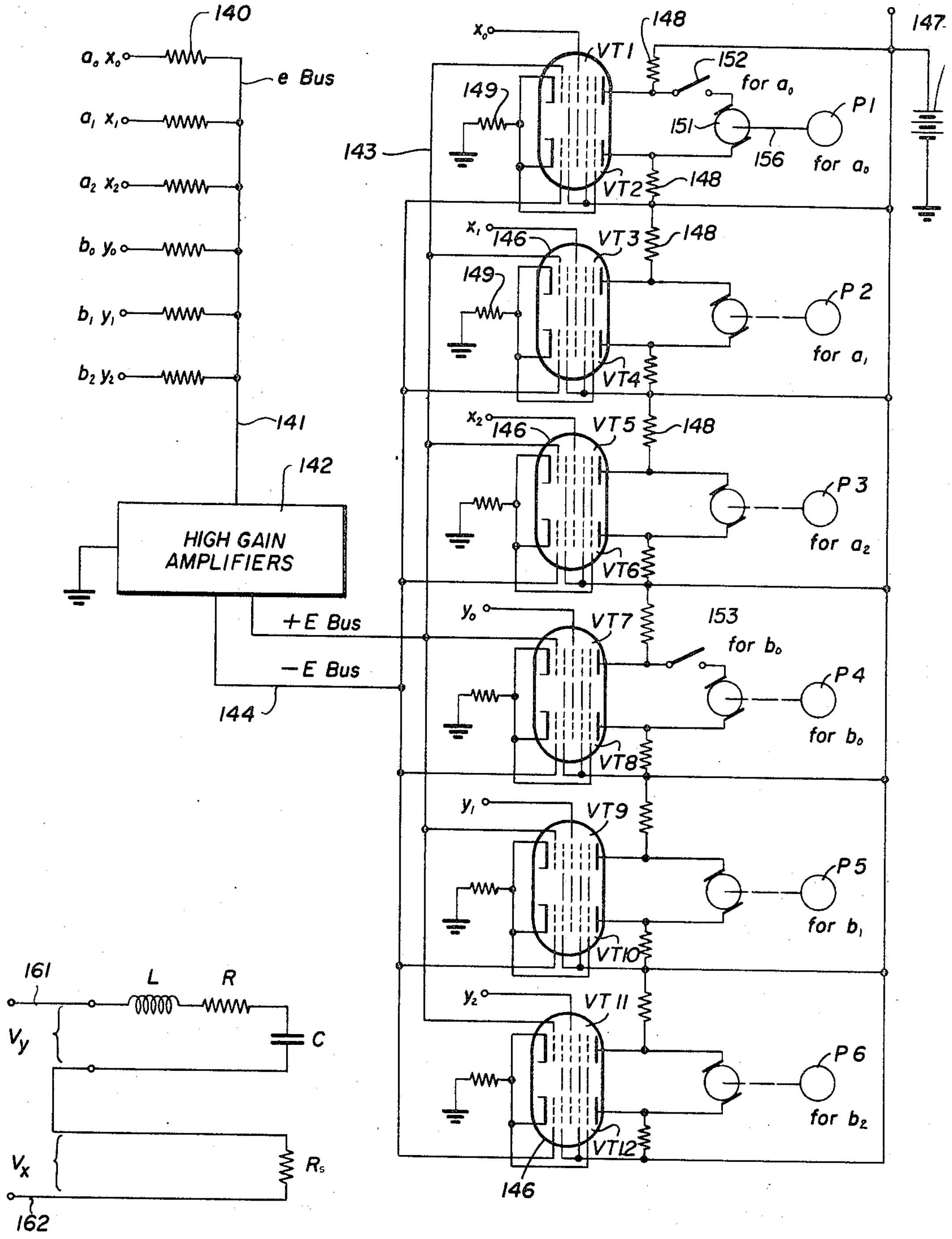
FIG. 12 is a circuit diagram of a computer, partially in block form, which adds weighted combinations of the state variables and minimizes the sum by changing the state variable coefficients.
FIG. 13 is a circuit diagram of a typical circuit which can be tested with my identification machine and apparatus as shown in FIGS. 9, 10, 11 and 12.

After the computer in FIG. 4 has been operating for a sufficient time so that the state variable weightings $a_n$ and $b_n$, being the potentiometer settings in FIGS. 11 and 10, have reached their steady-state values and are not changing, then the signal on the $e$ bus in FIG. 12 has been minimized and the following equation has been satisfied in a statistical sense.

$$a_0X_0+a_1X_1+a_2X_2+\ldots+b_0Y_0+b_1Y_1+b_2Y_2+\ldots=0 \qquad (24)$$

$$\sum_{n=0}^{k}(a_nX_n(t)+b_nY_n(t))=0 \qquad (25)$$

Because of the design and construction of the state variable decomposition networks in FIGS. 11 and 10, all of the $X_n$ state variables can be expressed in terms of $X_0(t)$, and all of the $Y_n$ state variables can be expressed in terms of $Y_0(t)$.

Therefore, an equation which is satisfied by the machine is $$\sum_{n=0}^{k}(a_np^nX_0(t)+b_np^nY_0(t))=0 \qquad (26)$$

where $$p^nZ(t)=d^nZ(t)/dt^n \qquad (27)$$

In the steady-state, the Laplace transform of this equation is $$\sum_{n=0}^{k}(a_ns^nX_0(s)+b_ns^nY_0(s))=0 \qquad (28)$$

Because of the identical construction of the networks in FIGS. 11 and 10, the poles of the transfer function from X to $X_0$ are equal to the poles of the transfer function from Y to $Y_0$.

In terms of the variables X and Y appearing on circuits identified as X and Y respectively, this transform equation becomes $$\sum_{n=0}^{k}\left(a_ns^n\frac{X(s)}{D(s)}+b_ns^n\frac{Y(s)}{D(s)}\right)=0 \qquad (29)$$

Multiplying through by $D(s)$, and substituting $-K_2$ for $X(s)$ and $K_1G$ for $Y(s)$, yields $$\sum_{n=0}^{k}(-K_2a_ns^n+K_1b_ns^nG(s))=0 \qquad (30)$$

Solving for G yields $$G(s)=\frac{K_2\sum_{n=0}^{k}a_ns^n}{K_1\sum_{n=0}^{k}b_ns^n} \qquad (31)$$

In terms of the Fourier transform, $$G(j\lambda)=\frac{K_2\sum_{n=0}^{k}a_n(j\lambda)^n}{K_1\sum_{n=0}^{k}b_n(j\lambda)^n} \qquad (32)$$

This is in the form desired. Therefore, the machine coefficients $a$ and $b$ can be used directly in the equation for the self power spectrum (17) and (19).

The equation for $G(s)$ has been normalized to machine time because the playback from the storage device 81 was in real time $t$ which was only proportional to the data time scale $\tau$. To convert the machine time transform into the transform that would have been obtained using the data time scale $\tau$, the old variable $s$ must be multiplied by the compression ratio $r$ to obtain the new variable $s$.

$$G(s)_{(\text{transform with respect to } \tau)}=G(rs)_{(\text{tranform with respect to } t)} \qquad (33)$$

$$\tau=rt \qquad (34)$$

$$G(j\lambda)_{\tau\text{ scale}}=G(jr\lambda)_{t\text{ scale}} \qquad (35)$$

$$\phi(\lambda^2)_{\tau\text{ scale}}=\phi(r^2\lambda^2)_{t\text{ scale}} \qquad (36)$$

It should be pointed out that the storage device 81 can take the form of a digital storage device with quantized amplitude and discrete storage elements such as a ferrite core storage matrix or an electrostatic storage tube. Machine time in such a case would be a sequence of computational intervals, each interval involving an interrogation of the memory for one number. The state variable generator is a plurality of accumulators, one for each state variable, with a different machine program for each accumulator, each of said programs being a weighted algebraic sum of both a plurality of past numbers for the variable X or Y, and a weighted algebraic sum of a plurality of the past values of the number stored in the accumulator.

The computer 77 calculates the weightings necessary so that the error sum of the weighted state variables from the previously defined accumulators continuously remain less than an arbitrarily small number.

The error sum obtained is multiplied by a constant and when multiplied by each of the state variables forms a plurality of contributions to a plurality of accumulators. Each of the accumulators contains as a number one of the coefficients $a$ or $b$, each of the coefficients being the weighting used to multiply by the corresponding state variables to produce each of the weighted state variables whose sum is the error sum.

The storage device 81 can also take the form of a mechanical device as, for example, a sequence of adjustable pegs in holes around the circumference of a rotating disc. In such a case, the playback pickup could be in the form of a feeler contacting each peg in sequence and generating an air pressure proportional to the peg position. In such an embodiment, the state variable generators could be an interconnected system of pneumatic capacities and capillaries. The summing network 88 in FIGS. 6 and 8, 140 in FIG. 12, 174 in FIG. 17, and 238 in FIG. 21 would be an assembly of capillaries and a force balance pneumatic amplifier similar in principle to those now commercially available. The integration operations performed by the computer 77 can be performed by dynamic pneumatic components such as a reset controller which performs the function of integration. The multiplications or weightings may be performed by a variable-fulcrum lever arm.

In general, the computer 77 can be of any suitable type which can perform the necessary operations of generation of state variables, weightings, multiplications and integrations.

From the foregoing, it can be seen that the identification machine as shown in FIG. 4 has for its objective the determination of the analytical equation for the Fourier transform of the positive time half only of the autocorrelation function. The Fourier transform of the negative time half of the autocorrelation function is a complex conjugate of the Fourier transform of the positive time half of this autocorrelation function. To obtain, therefore, the Fourier transform of the complete autocorrelation function, it is necessary to write down the transform as obtained from the readout of coefficients on the display means 78 after it has completed its operation. In addition, the complex conjugate of this transform is also determined and written down and the two are added together.

The complete autocorrelation function is not used in FIG. 4 because it would require twice the order of capability of the machine. In other words, it would require a machine with the capability of solving an equation of twice as great an order and would yield no additional information because the resulting transform when obtained would be a function of $\lambda^2$ rather than a function of $\lambda$ and half of the coefficients in the resulting machine would read zero.

One example of the use of the identification machine as shown in FIG. 4 would be to connect a recorder to the output valve in the controller for a chemical process and record the fluctuations of a valve over a long period of time, and from these fluctuations calculate the corresponding time function of the disturbances in the chemical process. From this recording of the disturbances in the chemical process, the autocorrelation function can be calculated as a product of the disturbance at any instant of time times the disturbance at a time spaced $\tau$ from the first chosen time and this product would be integrated over the entire length of the recorded trace. All of the products obtained for all of the possible values of $\tau$ would then be recorded on a second magnetic tape as a function of $\tau$ and real time, and this second tape would be the output to the identification machine shown in FIG. 4. The useful information obtained would be a spectrum of the process disturbances, and from this spectrum of process disturbances, and automatic control engineer can adjust the bandwidth and speed of response of the control process to minimize the effect of such disturbances.

Figure 5:
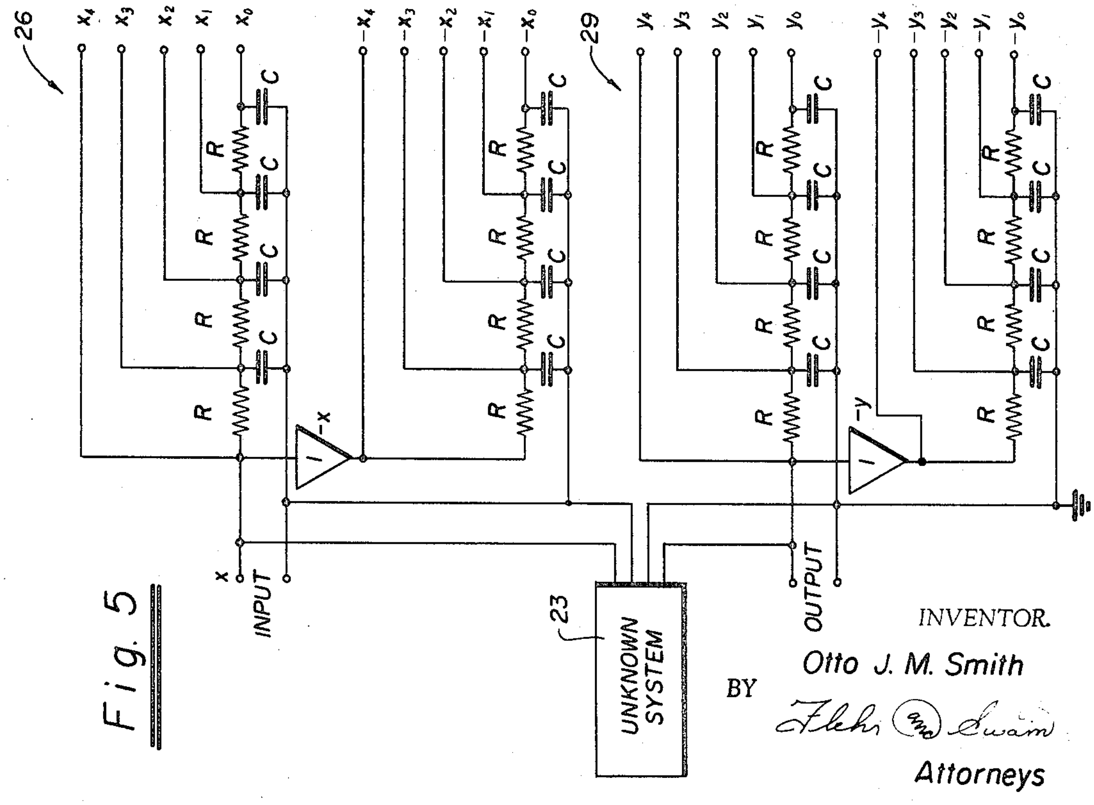
FIG. 5 shows a circuit diagram for typical state variable generators.

In FIG. 5, there is shown circuitry for typical state variable generators 26 and 29. The input to the unknown system or process 23 is designated by X and the output from the unknown system is designated by Y. As shown in FIG. 5, the input signal X is decomposed into the derived state variables designated by $X_0$, $X_1$, $X_2$, $X_3$ and $X_4$ through an RC network, and similarly the negatives of these same state variables are derived through the use of an inverting amplifier indicated by $-X$ through a similar RC network as shown in FIG. 5. Similarly, the output signal Y is decomposed into derived state variables designated $Y_0$, $Y_1$, $Y_2$, $Y_3$ and $Y_4$, through an RC network, and the negatives of these same signals are derived by the use of an inverting amplifier $-Y$ and through a similar RC network as shown in FIG. 5.

Figure 6:
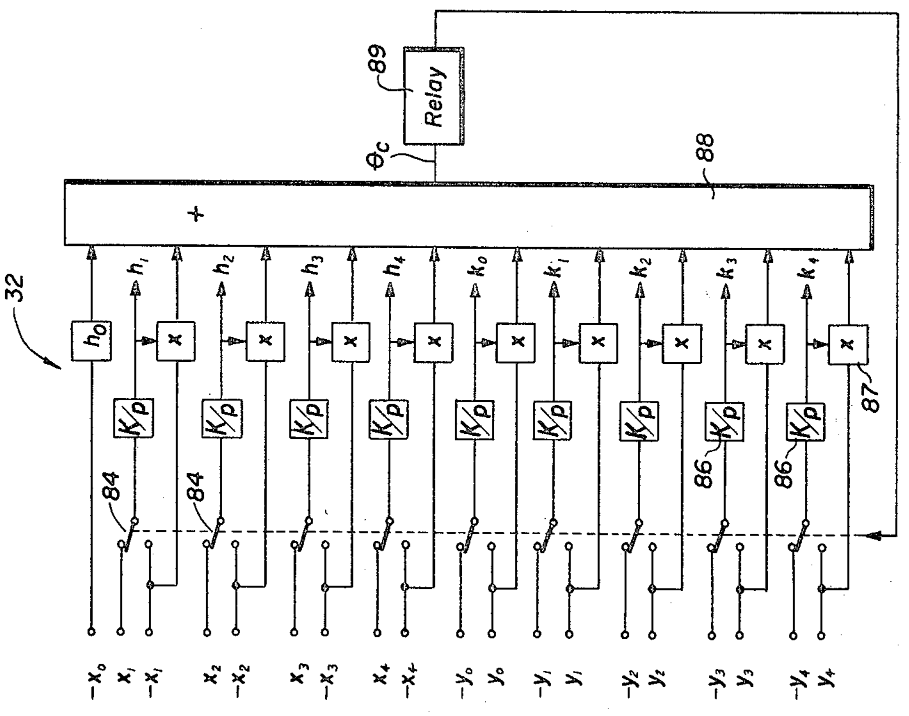
FIG. 6 is a circuit diagram, partially in block form, of a computer for use in my identification machine.

FIG. 6 is a circuit diagram, partially in block form, of the computer 32 which receives the plurality of state variables generated by the circuitry as shown in FIG. 5. The state variables are connected to the terminals indicated in FIG. 6. These state variables are supplied to upper and lower contacts, to a movable contact of ganged reversing switches 84, and to integrators 86 which are identified as $K/p$ which perform integrations with respect to time. The outputs of the integrators are supplied to multipliers 87 which are indicated by $x$ and the outputs from the multipliers are added in a summing device 88 indicated by +. The output of the summing device 88 is indicated as $\theta_c$ and is supplied to a relay 89. When $\theta_c$ is a positive, the relay 89 is operated so that the movable contacts of the reversing switches 84 engage the upper contacts, and conversely when $\theta_c$ is negative, the movable contacts engage the lower contacts.

Operation of the computer shown in FIG. 6 as a part of the identification machine may be briefly described as follows. Let $h_i$ and $k_i$ be the machine outputs. The machine forms the trial integro-differential equation:

$$\sum_{i=0}^{n}(h_iX_i-k_iY_i)=-\theta_c \qquad (37)$$

The purpose of the identification machine is to find the unknown differential equation representing the true relationship between the state variables, which is $$\sum_{i=0}^{n}(h_iX_i-k_iY_i)=0 \qquad (38)$$

The machine will have found the correct values for $h_i$ and $k_i$ which relates the state variables of the unknown system in the manner shown by Equation 38, when it has been running long enough, so that the value $\theta_c$ from Equation 37, or the value of the input to the relay shown in FIG. 6, is zero continuously in time. Any error in a coefficient $h_i$ or $k_i$ will cause the variable $\theta_c$ to deviate from zero during transients and during the progress of random variations of the state variables.

In FIG. 6, each coefficient will converge to its correct value because of the following mechanism: Assume that all of the coefficients are correct except $h_1$; assume further that $X_1$ is positive and that $-X_1$ is negative; then the output of the multiplier connected to $h_1$ will be too negative if $h_1$ is too positive or will be too position if $h_1$ is too negative. This output will contribute an error component to $\theta_c$ such that the relay will move to the top contact if $h_1$ is too negative and the relay will move to the bottom contact if $h_1$ is too positive. With the relay on the top contact the integral connected to the state variable $X_1$ will integrate a positive number and will therefore increase the variable $h_1$ bringing it from its too negative value towards its correct value. In a similar manner when the relay is on its bottom contact, the input to the integrator for $h_1$ will integrate a negative number and drive $h_1$ from its too positive value again towards its correct value. This negative feedback iterative convergence of the assumed value of $h_1$ in the machine towards the correct value as determined by the relationship between the state variables $X_i$ and $Y_i$ will always have the correct direction of change for either polarity of $X_1$.

In a similar manner, each $h_i$ and $k_i$ in FIG. 6 will converge towards its correct value independently of the polarity of the associated state variable. The rate of convergence of each coefficient is proportional to the magnitude of the associated state variable. For example, if state variable $Y_2$ should be always very small, then the rate of convergence of $k_2$ will always be small. Therefore, those coefficients that are most important in the integro-differential equation will assume their correct values most rapidly, and those coefficients that are least important will take the longest time before their values become significant. When the identification machine is first turned on, it calculates a first order linear approximation to the unknown process, and then gradually improves upon this by calculating a second order approximation and then a third order approximation and continuously expands the complexity of the model used to represent the unknown process. The accuracy is proportional to the running time. If all of the state variables are stationary random variables, and the engineer does not known how much data is necessary in order to obtain a valid model of the unknown process, then the identification machine can be operated in real time until the rates of change of the identified parameters are negligible in the judgment of the engineer. There is no need to record the input and output signals from the unknown process.

Note that one parameter, $h_0$, has been chosen arbitrarily in FIG. 6. This sets the scale factor for the other parameters. For example, if the unknown process has a DC gain of 100, then $k_0$ will equal 0.01 for the usual designation of state variables. If the unknown process has an integral, then $k_0$ will equal 0 in FIG. 6.

The computer shown in FIG. 6 will work satisfactorily for a wide variety of selections of state variables. A convenient selection of state variables is shown in FIG. 5. In this case, the input to the unknown system is the variable X. The state variable $X_0$ is choen as the random variable X filtered with a four-time-constant low-pass filter. This provides a desirable smoothing of the fluctuations, particularly for those coefficients calculating the low pass characteristics of the unknown system. The state variable $X_1$ is related to the input X by the same four-time-constant filtering network, but in addition, there is one zero factor in the numerator of the transfer function from X to $X_1$, $X_2$ as second order numerator term and the same four-time-constant filtering poles. $X_3$ has a third order numerator term. All of the resistors have the same value R, and all of the capacitors have the same value C. The transfer functions relating this particular selection of state variables to the random input X are $$p^n=d^n/dt^n \quad (39)$$

$$T=RC \quad (40)$$

$$D=1+10pT+15(pT)^2+7(pT)^3+(pT)^4 \quad (41)$$

$$X_0=X/D \quad (42)$$

$$X_1=(1+pT)X/D \quad (43)$$

$$X_2=(1+3pT+(pT)^2)X/D \quad (44)$$

$$X_3=(1+6pT+5(pT)^2+(pT)^3)X/D \quad (45)$$

$$X_4=X \quad (46)$$

In a similar manner $Y_i$ state variables are related to the random output Y by the following equations $$Y_0=Y/D \quad (47)$$

$$Y_1=(1+pT)Y/D \quad (48)$$

$$Y_2=(1+3pT+(pT)^2)Y/D \quad (49)$$

$$Y_3=(1+6pT+5(pT)^2+(pT)^3)Y/D \quad (50)$$

$$Y_4=Y \quad (51)$$

The identification machine solves for the values of $h_i$ and $k_i$ in Equation 38. If Equations 42–51 inclusive are substituted into Equation 38, one has the following $$\begin{aligned}&h_0X/D+h_1(1+pT)X/D+h_2(1+3pT+(pT)^2)X/D\\&+h_3(1+6pT)+5(pT)^2+(pT)^3)X/D+h_4X-k_0Y/D\\&-k_1(1+pT)Y/D-k_2(1+3pT+(pT)^2)Y/D\\&-k_3(1+6pT+5(pT)^2+pT)^3)Y/D-k_4Y=0\end{aligned} \quad (52)$$

Multiplying through by the denominator polynomial D yields $$\begin{aligned}&(h_0+h_1+h_2+h_3+h_4)X+(h_1+3h_2+6h_3+10h_4)TpX\\&+(h_2+5h_3+15h_4)T^2p^2X+(h_3+7h_4)T^3p^3X+T^4p^4X\\&-(k_0+k_1+k_2+k_3+k_4)Y-(k_1+3k_2+6k_3+10k_4)TpY\\&-(k_2+5k_3+15k_4)T^2p^2Y-(k_3+7k_4)T^3p^3Y\\&-k_4T^4p^4Y=0\end{aligned} \quad (53)$$

The usual method of writing the differential equations for the unknown system in FIG. 5 in terms of the random input X and the random output Y would be $$\sum_{i=0}^{n}(a_ip^iX-b_ip^iY)=0 \quad (54)$$

This is a shorthand method of writing $$\begin{aligned}&a_0X+a_1pX+a_2p^2X+a_3p^3X+a_4p^4X-b_0Y-b_1pY\\&-b_2p^2Y-b_3p^3Y-b_4p^4Y=0\end{aligned} \quad (55)$$

It can be seen from a comparison of Equation 53 and Equation 55, term by term, that the parameter transformation between the conventional differential equation nation and the transformed state variables, which are used in FIG. 5, is $$a_0=h_0+h_1+h_2+h_3+h_4 \quad (56)$$

$$a_1=(h_1+3h_2+6h_3+10h_4)T \quad (57)$$

$$a_2=(h_2+5h_3+15h_4)T^2 \quad (58)$$

$$a_3=(h_3+7h_4)T^3 \quad (59)$$

$$a_4=h_4T^4 \quad (60)$$

$$b_0=k_0+k_1+k_2+k_3+k_4 \quad (61)$$

$$b_1=(k_1+3k_2+6k_3+10k_4)T \quad (62)$$

$$b_2=(k_2+5k_3+15k_4)T^2 \quad (63)$$

$$b_3=(k_3+7k_4)T^3 \quad (64)$$

$$b_4=k_4T^4 \quad (65)$$

From the foregoing, it can be seen that the identification machine, apparatus or system identifies an integro-differential equation. Since the identification machine is connected to the input and the output of the unknown system, it observes these signals as they vary with time. There is no need to perturb the input when the unknown system is operating in its usual manner, and there exists commands and other variations in the input signal.

The differential equation is formed as an integro-differential operation on the input variable plus a different integro-differential operation on the output variable summing to zero. The identifier starts with assumed integro-differential parameters or coefficients and forms the function which should equal zero. Errors are represented by deviations from zero, and these are used to slowly correct each of the parameters in the assumed integro-differential operations.

The convergence rate of the machine is adjustable and can be chosen in accordance with the spectra of the input and output signals. For a variable-parameter system, if the parameter variation is slow, the identification machine will track the parameter variations and will deliver the value of the parameter as a function of time. For a variable parameter system where the parameter variation is quite rapid or where the parameter is a function of one of the signals in a non-linear manner, then the identification machine delivers a statistical best estimate of the linearized parameter, smoothing out the variations.

Figure 7:
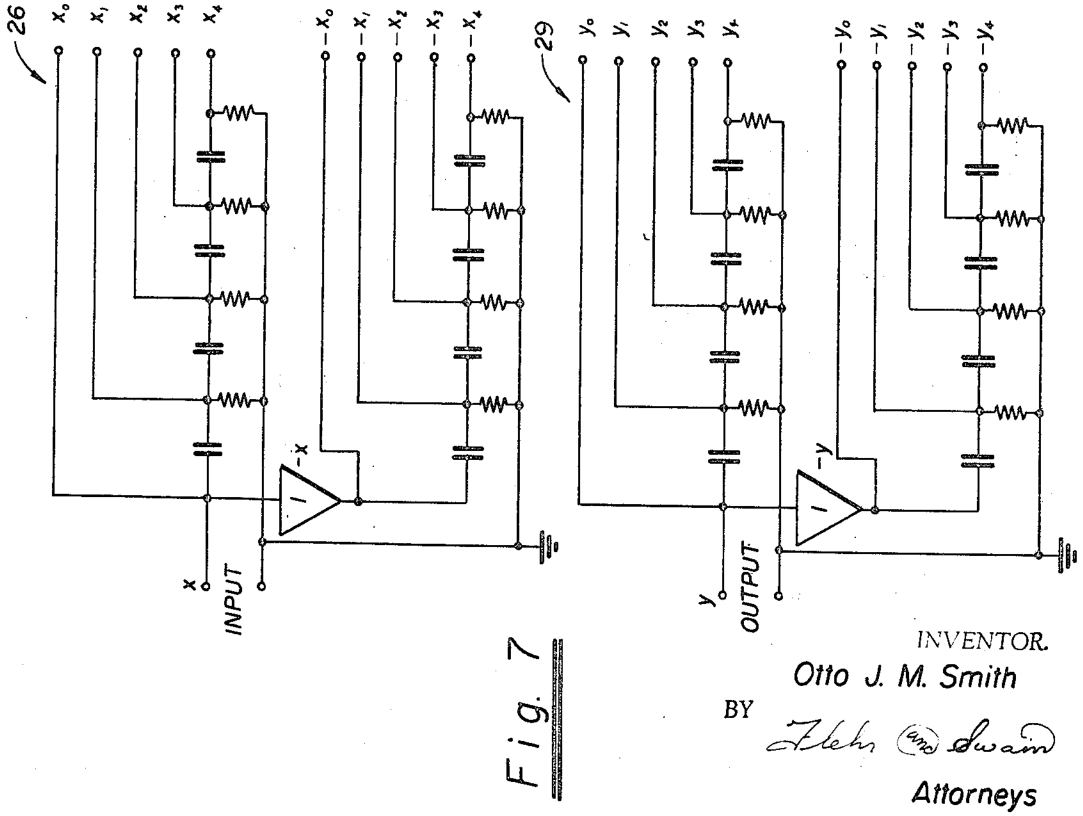
FIG. 7 is a circuit diagram showing typical state variable networks for generating state variables.

In FIG. 7, there is shown another type of circuitry for generating state variable in which the state variables are closely related to the derivatives of the input and output of the unknown system. By comparison of FIGS. 5 and 7 with FIGS. 2, 16, 19 and 22, it can be seen that the embodiments in FIGS. 5 and 7 are similar to those shown in FIGS. 2, 16, 19 and 22 with the exception that in FIGS. 5 and 7 the differentiations are performed by bilateral loaded networks rather than by isolated differentiators as in FIGS. 2, 16, 19 and 22. The four energy storage networks shown in FIG. 7 will have denominators of their transfer functions of fourth order. The state variable $X_4$ is, therefore, the fourth derivative of the random variable X, but with an additional filtering produced by four poles. This additional filtering is not undesirable. The state variable $X_1$ has a composite transference with a derivative filtered by three zeros and four poles. The equation for all of the state variables in FIG. 7 are given by $$D=1+7(pT)+(15(pT)^2+10(pT)^3+(pT)^4 \quad (66)$$

$$X_0=X \quad (67)$$

$$X_1=(pT+5(pT)^2+6(pT)^3+(pT)^4)X/D \quad (68)$$

$$X_2=((pT)^2+3(pT)^3+(pT)^4)X/D \quad (69)$$

$$X_3=((pT)^3+(pT)^4)X/D \quad (70)$$

$$X_4=(pT)^4X/D \quad (71)$$

$$Y_0=Y \quad (72)$$

$$Y_1=(pT+5(pT)^2+6(pT)^3+(pT)^4)Y/D \quad (73)$$

$$Y_2=((pT)^2+3(pT)^3+pT)^4)Y/D \quad (74)$$

$$Y_3=((pT)^3+(pT)^4)Y/D \quad (75)$$

$$Y_4=(pT)^4Y/D \quad (76)$$

These state variables are inserted into the integro-differential Equation 37 for the identification machine, and the entire equation operated on by the operator D from Equation 66. Then it can be seen that the parameter transformation for FIG. 7 is $$a_0=h_0 \quad (77)$$

$$a_1=(7h_0+h_1)T \quad (78)$$

$$a_2=(15h_0+5h_1+h_2)T^2 \quad (79)$$

$$a_3=(10h_0+6h_1+3h_3+h_3)T^3 \quad (80)$$

$$a_4=(h_0+h_1++h_2+h_3+h_4)T^4 \quad (81)$$

$$b_0=k_0 \quad (82)$$

$$b_1=(7k_0+k^1)T \quad (83)$$

$$b_2=(15k_0+5k_1+k_2)T^2 \quad (84)$$

$$b_3=(10k_0+6k_1+3k_2+k_3)T^3 \quad (85)$$

$$b_4=(k_0+k_1+k_2+k_3+k_4)T^4 \quad (86)$$

The parameters above are applicable for the differential equation in the form of Equation 54 or Equation 55.

Figure 8:
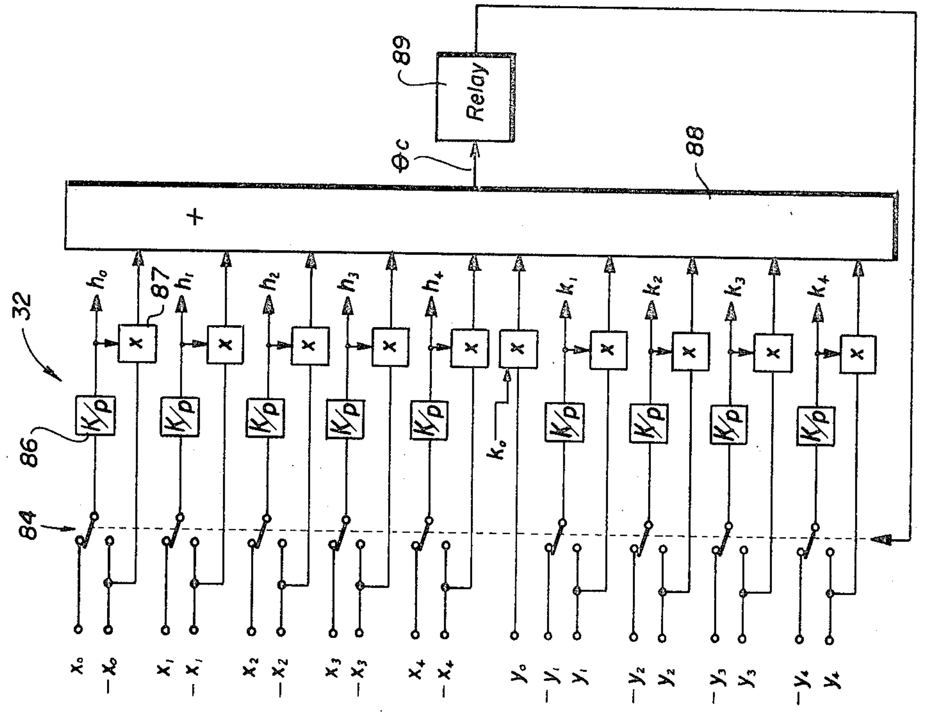
FIG. 8 is a circuit diagram, partially in block form, of a computer similar to that shown in FIG. 6.

It can be seen that the computer shown in FIG. 8 is identical to the one shown in FIG. 6 with the exception that the state variables are supplied to different terminals.

In general, it can be stated that the circuitry as shown in FIG. 6 is for a form of identification machine which is suitable when the unknown has integrals. On the other hand, the embodiment shown in FIG. 8 is suitable for an identification machine when the unknown is high-pass only.

Expressed in another way, if the output of the unknown process has zero mean, even though the input variable is non-zero mean, then the identification machine using circuitry of the type as shown in FIG. 6 will have difficulties. The ratio of $h_0/k_0$ should be zero. Since $h_0$ has been arbitrarily chosen, the machine tries to drive all the $k_i$'s to infinity. This is a non-convergent mode of operation. To avoid this difficulty, the coefficient $k_0$ should be chosen arbitrarily and the machine should solve for the coefficient $h_0$. The arrangement shown in FIG. 8 makes this possible. In this embodiment, the coefficients will be automatically determined satisfactorily for an unknown system which contains derivatives, but not integrals, in cascade with the information flow from X to Y.

Figure 9:
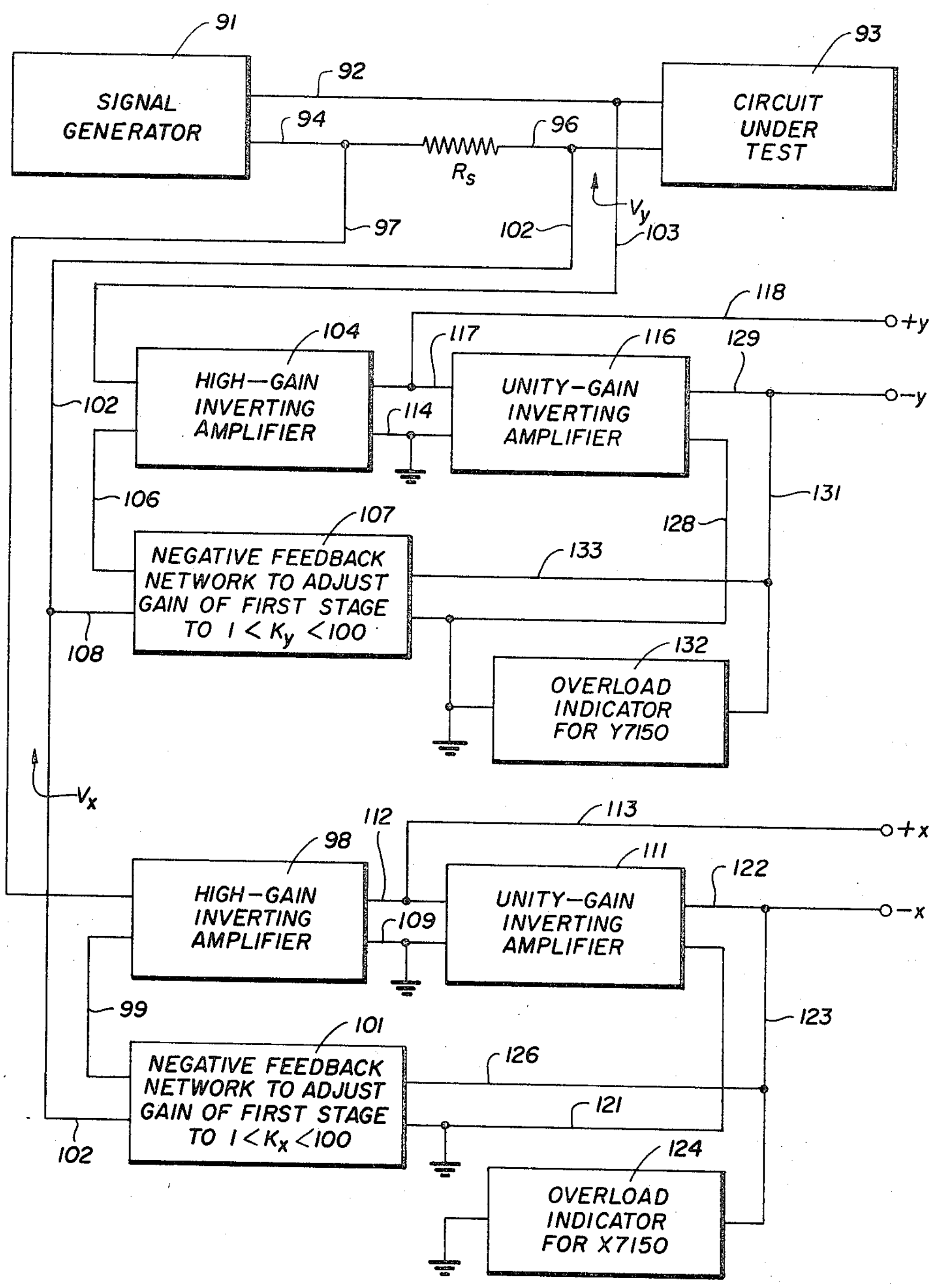
FIG. 9 is a block diagram of a portion of still another embodiment of my identification machine, apparatus or system with a two-terminal circuit under test.

In FIG. 9, there is shown in block form a portion of another embodiment of my identification machine, apparatus or system which is utilized for identifying a two-terminal circuit under test by determing its input impedance and admittance as a function of frequency. When the X and Y terminals in FIG. 9 are connected to the appropriate terminals in FIGS. 10 and 11, and the terminals in FIGS. 10 and 11 are connected to the appropriate terminals in FIG. 12, there is provided a complete identification machine, apparatus or system which is one embodiment of my invention.

As shown in FIG. 9, a signal generator 91 is provided of a suitable type such as one which generates signals from 0.01 cycles per second to 50 kc. which supplies the same over a conductor 92 to the input terminal of the circuit under test 93 and through a conductor 94, a resistor $R_s$ and a conductor 96 to the other input terminal of the circuit under test 93. A conductor 97 connects the conductor 94 to one terminal of a high gain inverting amplifier 98. The other input terminal of the amplifier 98 is connected by a conductor 99 to one output terminal of a negative feedback network 101. The other output terminal of the negative feedback network 101 is connected by a conductor 102 to conductor 96. A conductor 103 connects the conductor 92 to one terminal of a high gain inverting amplifier 104. The other input terminal of the amplifier 104 is connected by conductor 106 to one output terminal of the negative feedback network 107. The other output terminal of the negative feedback network 107 is connected by a conductor 108 to the conductor 102.

The amplifier 98 is connected by a grounded conductor 109 to one input terminal of a unity gain inverting amplifier 111 and the useful output potential from the amplifier 98 appears on conductor 112 which is connected to the input terminal of the unity gain inverting amplifier. The conductor 112 is connected to the +X terminal by a conductor 113. Similarly, the output of the amplifier 104 is connected by grounded conductor 114 to one input terminal of a unity gain inverting amplifier 116. The useful output from the amplifier 104 appears on conductor 117 which is connected to the input terminal of the unity gain inverting amplifier 116. The conductor 117 is also connected to the +Y terminal by a conductor 118. The unity gain inverting amplifier 111 has one output connected by a grounded conductor 121 to the negative feedback network 101. The useful output from amplifier 111 appears on conductor 122 and is connected to the −X terminal. The conductor 122 is connected by a conductor 123 to an overload indicator 124. The conductor 123 is also connected to the input of the negative feedback network by conductor 126. Similarly, one of the output terminals of the unity gain inverting amplifier 116 is connected by a grounded conductor 128 to the negative feedback network 107. The useful output from the amplifier 116 is applied to a conductor 129 which is connected to the −Y terminal. The conductor 129 is connected by a conductor 131 to an overload indicator 132. The conductor 131 is also connected to the input of the negative feedback network 107 by a conductor 133.

Operation of the circuitry shown in FIG. 9 may now be briefly described as follows. The signal generator 91 can be a flat white random Gaussian noise generator with a signal spectrum between 0.01 cycles per second and 50 kc. per second. Current from the signal generator flows through conductors 92, 94, the resistor $R_s$ and the conductor 96 to the circuit under test 93 to excite the same. The voltage drop in the resistor $R_s$ is a measure of the excitation. The input voltage $V_x$ to the circuit under test 93 appears between conductors 97 and 102 and is amplified by the amplifier 98. The negative feedback 101 accurately controls the gain of the amplifier 98. The output from this amplifier 98 is called the excitation signal X.

The voltage drop between the conductors 102 and 103 is a response to portions of the excitation and is a function of the impedance of the circuit under test. This voltage drop $V_y$ is amplified by the amplifier 104. The output from the amplifier 104 is called the response signal Y.

In setting up the trial differential equation, there are some situations that require the negative of the excitation signal and the response signal. The negative excitation signal, called −X, is produced by the inverting amplifier 111 and appears at the −X terminal. Similarly, the negative of response signal −Y is produced by the inverting amplifier 116 and appears at the −Y terminal.

In order to adjust signals X and Y to the largest suitable values, overload indicators 124 and 132 of a suitable type such as neon overload indicators are provided. The adjustments of the values are accomplished by varying the attenuation ratios in the feedback networks 101 and 107.

As explained previously, the signal generator 91 can be a multi-purpose generator which contains a squarewave generator of adjustable frequency, repetitive impulse generator of adjustable repetition rate, a triangle wave generator of adjustable frequency, and a sweeping oscillator which automatically varies its frequency in accordance with a predetermined schedule. The circuit under test 93 may be tested with any one of the above outputs of the multi-purpose generator. Alternatively, if desired, the signal from the generator can contain only one of the various forms of excitation described above.

The voltage across the circuit under test may be called the excitation signal and the voltage proportional to the current in the circuit under test may be called the response. The signal generaor 91 may have either a high output impedance corresponding to a current generator or a low output impedance corresponding to a voltage generator. The terminology chosen is merely illustrative and is not intended to restrict either the form or the means of obtaining the excitation and response signals.

FIG. 10 is a network to derive state variables and weighted state variables from the excitation signal X in FIG. 1. As can be seen from FIG. 10, it contains potentiometers P1, P2 and P3 and a number of resistors and capacitors. The voltages created on the terminals in the network in FIG. 10 are designated as shown. The proportional setting of the wiper arm of the potentiometer P1 is called the parameter or coefficient $a_0$. When the wiper arm is electrically the same as the $X_0$ terminal, $a_0$ is unity. When the wiper arm is electrically the same as the $-X_0$ terminal, $a_0$ is −1. When the arm is in its mind position, $a_0$ is zero. The voltage picked off by the wiper arm of the potentiometer P1 is a product of the state variable $X_0$ appearing on the $X_0$ terminal and the coefficient $a_0$. The proportional setting of the wiper arm of the potentiometer P2 is the parameter or coefficient $a_1$. The voltage picked up by the wiper of the potentiometer P2 is the product $a_1X_1$. The proportional setting of the wiper arm of the potentiometer P3 is the parameter coefficient $a_2$. The voltage picked off by the wiper of the potentiometer $P_3$ is product $a_2X_2$.

The circuitry shown in FIG. 10 discloses a new, unique and improved circuitry for obtaining state variables. Heretofore, the time derivative of a function has been obtained with an operational amplifier and an RC circuit, connected as a high-pass filter. This has had the disadvantage that the amplifier is a dynamic device whose characteristics change. The RC circuit passes high frequencies, and accentuates the noise components of a signal whose derivative is being taken. There is always an upper limiting frequency above which the circuit does not calculate a true derivative, but is a flat unity gain network. In the past, the time integral of a function has been obtained with an operational amplifier and an RC circuit, connected as a low pass filter. This has had the disadvantage that the amplifier is a dynamic device whose gain changes with time. The circuit has a lower limiting frequency below which it does not calculate a pure integral, but is a flat unity gain network. A perfect differentiator had to have infinite gain at infinite frequency. A perfect integrator had to have infinite gain at zero frequency.

The circuitry in FIG. 10 makes possible an improved method for obtaining derived state variables $X_0$, $X_1$ and $X_2$ related to the input variable X. The state variable $X_2$ is the exact time derivative of the state variable $X_1$. The state variable $X_1$ is the exact time derivative of the state variable $X_0$. The upper limiting frequency is not a function of the circuit in FIG. 10, but is a function of the inductance of the resistors and the conductors to the capacitors. The lower limiting frequency is a function of the leakage and the soaking effect of the capacitors. The useful frequency band of the circuit shown in FIG. 10 is many decades wider than that of conventional RC differentiators. Since it is a passive circuit, its stability is superior to that of amplifiers. The state variable $X_0$ is related to the signal X by attenuation and phase lag, and there is no requirement that the gain exceed unity. The transmission from X to $X_0$ is a low pass transmission.

The state variable $X_1$ is related to the signal X by attenuation and phase shift, and there is no requirement that the gain exceed unity. The transmission from X to $X_1$ is a band-pass transmission. The state variable $X_2$ is related to the signal X by attenuation and phase lead. There is no requirement that the gain exceed unity. The transmission from X to $X_2$ is a high-pass transmission.

The circuitry shown in FIG. 10 can also be interpreted in terms of integration. The state variable $X_1$ is the exact time integral of the state variable $X_2$. The state variable $X_0$ is the exact time integral of the state variable $X_1$. The state variable $X_0$ is the exact time double integral of the state variable $X_2$.

The components in FIG. 10 have the following unique relationship to each other:

Capacitors C1–C5 have a value of C, whereas capacitors C6 and C7 have a value of 4C.

The resistors have the following values:

| Resistors: | |
|---|---|
| R1 | 0.3303R |
| R2 | 0.5R |
| R3 | 0.5R |
| R4 | 0.3303R |
| R5 | 0.0472R |
| R6 | 0.0472R |
| R7 | 3.075R |
| P1, P2, P3 | 1.000R |

A typical value of R is 20,000 ohms. A typical maximum value for C is 5 microfarads. C should be adjustable in decade or binary values for changing the range of the time scale or frequency band in the impedance function for the circuit under test in FIG. 9.

Other unique advantages of the circuitry shown in FIG. 10 can be seen from examination of the table above. The resistances of the loading potentiometers are all alike. The values of the capacitors are related one to the other by integers which simplifies the decade switching.

The circuitry shown in FIG. 10 can be used with impulse excitation, square wave excitation, triangular wave excitation, random excitation or frequency sweeping sinusoidal excitation.

As pointed out above, FIG. 11 is a circuit identical to that of FIG. 10 but driven by the signal Y to produce state variable $Y_0$, $Y_1$ and $Y_2$. The products of the state variable and the coefficient are produced at the wiper arms of the potentiometers P4, P5 and P6 as indicated.

The potentiometers P1–P6 shown in FIGS. 10 and 11 are preferably of a helipot type which have dials that can be calibrated to read directly the parameters $a_2$, $a_1$, $a_0$, $b_2$, $b_1$ and $b_0$, respectively. The potentiometers also may have shaft extensions to which can be connected electro-mechanical transducers which can be used to provide torque to turn the shafts to adjust the various parameters automatically.

In FIG. 12, there is shown a computer which is utilized for minimizing the error function of a weighted state variable sum and is connected to the networks shown in FIGS. 10 and 11 so that the terminals identified in the same manner are connected to each other. The products $a_0X_0$, $a_1X_1$, etc., are each connected through resistors 140 connected to a low level error bus 141 identified as "*e* bus." The resistors 140 form an adder network and have equal ohmic values so that the voltage on the low level error bus 141 is proportional to the sum of the signals to which the resistors are connected. The low level "*e* bus" is connected to the input of a high gain amplifier 142 which has input overload protection so that the input signal to the high gain amplifier 142 consists of the voltage between the low level error bus 141 and ground. Preferably, the ground terminal in FIG. 12 connected to the high gain amplifier 142 should have the same potential as the center tap between X and −X in FIG. 10 which is the same potential as the center tap between Y and −Y in FIG. 11 which is the same potential as the ground conductors 109 and 114 and ground conductors 121 and 128, shown in FIG. 9.

The output of the amplifiers 142 is a pair of pushpull voltages with opposite polarities with respect to ground. These two output voltages appear on the E bus 143 and the −E bus 144. The +E bus 143 and the −E bus 144 are connected to a bank of twelve vacuum tubes VT1–VT12 with two vacuum tubes included in each envelope 146. Each of the tubes consists of a cathode, a plate and five grids as shown. The plate of each of the tubes is supplied with a suitable voltage such as 300 volts from a power supply 147 through a load resistor 148. The cathodes of the tubes are interconnected and are connected through a resistor 149 to ground. The first grids of the tubes VT1, VT3, VT5, VT7, VT9 and VT11 are all connected to the +E bus 143, whereas the first grids of the tubes VT2, VT4, VT6, VT8, VT10 and VT12 are all connected to the −E bus 144. The third grid of the tubes VT1, VT3, VT5, VT7, VT9 and VT11 are connected to terminals which are identified as $X_0$, $X_1$, $X_2$, $Y_0$, $Y_1$ and $Y_2$, respectively. The third grids of tubes VT1 and VT2 are interconnected. The third grids of tubes VT3 and VT4 are interconnected. The third grids of tubes VT5 and VT6 are interconnected. The third grids of tubes VT7 and VT8 are interconnected. The third grids of tubes VT9 and VT10 are interconnected. The third grids of tubes VT11 and VT12 are interconnected. The fifth grids of all of the tubes are connected to the interconnected cathodes within each envelope 146. The second and fourth grids of all of the tubes are interconnected and are connected to the plate voltage supply 147. Six DC motors 151 which are provided with permanent magnet fields are associated with the tubes and have their armatures connected between the plates of the tubes. Thus, one of the DC motors 151 has its armature connected between the plates of the tubes VT1 and VT2. The other motors 151 are connected in a similar manner to the other tubes. A normally open disabling switch 152 is provided in the circuit connecting the armature to the plate of the tube VT1. The switch 152, for reasons hereinafter explained, can be called a disabling switch for $a_0$. Another normally open switch 153 is provided in the circuitry connecting the armature of a motor 151 to the plate of the tube VT7. The switch, as hereinafter explained, can be termed disabling switch for $b_0$. The motors 151 are provided with shafts 156 which are mechanically connected to the wiper arms of helipot potentiometers P1–P6 which are also shown in FIG. 10 and 11. The circuit shown in FIG. 10 generates the state variables X, $X_1$ and $X_2$ which are impressed across the potentiometers P1, P2, P3, P4, P5 and P6 are connected to the DC motors 151 so that voltage difference is impressed across the armatures of these motors and will cause them to turn at velocities proportional to the respective armature voltages, rotating the respective shafts and changing the positions of the wiper arms of the potentiometers P1, P2 and P3, respectively. Each voltage $\alpha_0X_0$, $\alpha_1X_1$ and $\alpha_2X_2$ in FIG. 10 is, therefore, responsive to the time integral of the respective armature voltage of the motor through a shaft. The respective potentiometer is mechanically connected to the shaft, and its wiper arm is positioned as the shaft is rotated.

The circuit shown in FIG. 11 generates the state variables $Y_0$, $Y_1$ and $Y_2$ which are impressed across the potentiometers P4, P5 and P6, respectively. The voltage differences impressed across the armatures of the motors will cause them to turn in velocity proportional to the respective armature voltages, rotating the respective shafts, and changing the position of the wiper arms of the potentiometers. Each voltage $b_0$, $Y_0$, $b_1Y_1$, $b_2Y_2$ in FIG. 11 is, therefore, responsive to the time integral of the respective armature voltage of the motor through whose shaft the respective potentiometer is mechanically connected.

The purpose of the high gain amplifiers 142, the vacuum tubes VT1–VT12 and the motors 151 is to cause the motor shafts 156 to turn thereby varying the values of the potentiometer settings until the magnitude of the low level error bus voltage is minimized. This condition is achieved through the following sequence: Assume that all of the coefficients have their correct, final steady state values except $a_2$. Let the error in $a_2$ be called $\alpha_2$, equal to the actual value less the correct value. The *e* bus 141 will then have a non-zero voltage proportional to the error in $a_2$ times $X_2$, which is $\alpha_2X_2$. This voltage will be amplified by the value K by the amplifiers 142 and a much larger value will appear on the E bus 143 with an equal voltage of opposite polarity on the −E bus 144. In the tube VT5, the +E voltage is multiplied by the $X_2$ state variable so that the current in this tube has a component proportional to $K\alpha_2(X_2)^2$. In the tube VT6, the −E voltage is multiplied by the $X_2$ state variable, so that the current in this tube has a component proportional to $-K\alpha_2(X_2)^2$. If $a_2$ is too positive and too great, then the current in tube VT5 will be too large and the current in the tube VT6 will be too small. The potential of the plate of the tube VT5 will be too low, and the potential of the plate of the tube VT6 will be too high. The DC motor 151 will, therefore, have a potential impressed across it whose polarity is determined by the polarity of $\alpha_2$, the error in the coefficient $a_2$. The shaft 156 will, therefore, turn at a velocity proportional to $\alpha_2$ times $(X_2)^2$ and in a direction dependent upon the polarity of the error in $a_2$. The mechanical connection will be chosen so that the direction of turning allows reduction in error in $a_2$ and always reduction in the magnitude of $\alpha_2$. This is a negative parametric feedback loop.

In a similar manner, an error in the coefficient $a_1$ will contribute a component of voltage to the *e* bus 141 proportional to the error times $X_1$, and this amplified component is separated out of the +E and −E signals by the tubes VT3 and VT4, which cause the shaft 156 to turn with a velocity proportional to the magnitude of the error in $a_1$ times the average $(X_1)^2$ and in a direction to reduce the magnitude of the error in $a_1$.

Likewise, tubes VT1 and VT2 will select out of the error a component due to the error in $a_0$, will turn the shaft 156 until the component disappears. The other tubes will select out of the error, components due to the errors in the associated coefficients of the differential equation.

When all the coefficients have the correct values necessary to keep the low level $e$ bus 141 at zero voltage, then the potentials on the +E and −E buses will also be zero. The currents in tubes VT5 and VT6 will, therefore, be equal; there will be no voltage on the DC motor 151; and the shaft 156 will be stationary. For this same condition, the current in tube VT1 will equal the current in VT2, etc.

The calibrations on the helipot potentiometers P1, P2, P3, P4, P5 and P6 read the impedance function of the two-terminal circuit 93 as shown in FIG. 9. FIG. 9 shows the interconnection between the circuit under test 93, the signal generator 91 and how these are connected to the state variable generators and the computers as shown in FIGS. 10, 11 and 12. The voltage between the two terminals of the circuit under test 93 is measured by a high gain inverting amplifier 104 which has approximately 500 ohm output impedance and which generates the signal +Y. A unity gain inverting amplifier with identical output impedance generates a −Y from the signal +Y. To control the level of the signal Y with respect to the voltage across the circuit under test, a negative feedback resistive network 107 provides feedback ratios of 1:0.01 so that the gain can be controlled within the range of $1<K_y<100$. For proper operation, the voltage Y should be in the order of 50–150 volts. The gain $K_y$ should, therefore, be increased until the overload indicator 132 shows that the voltage Y is of the order of 150 volts.

The current flowing into the circuit under test 93 is measured by the resistor $R_s$ whose voltage drop is the input to a second high gain inverting amplifier 104, which also has a 500 ohm output impedance. The output of the second amplifier 98 is the voltage X. The unity gain inverting amplifier with a 500 ohm output impedance generates a voltage −X from the voltage +X. A negative feedback network is provided so that a proportion of −X between 1 and 0.01 can be subtracted from the input to the high gain inverting amplifier, so that the ratio of X to the voltage drop in $R_s$ can vary between $1<K_X<100$. A neon overload indicator 124 on −X permits the operator to increase the gain $K_X$ or the resistance $R_s$ or both until the indicator shows that the voltage −X is of the order of 150 volts.

It is not necessary that the gains $K_X$ and $K_Y$ be accurately calibrated, but it is necessary that the ratio of these gains be accurate. The machine will read an imperance function which is proportional to $Y/X$. The actual impedance of a circuit under test is equal to this machine impedance function times a calibration constant which is $K_XR_s/K_Y$. This calibration constant can be read directly on the face of the identifier by ganging together mechanically the shafts which control the gains $K_X$, $K_Y$, and the precision resistor $R_s$. $R_s$ should be variable from 100 ohms to 1 megohm.

The signal generator 91 should have a bandwidth sufficient to encompass the characteristic frequency of the circuit under test. For automatic control devices, the frequency band should include .001 cycle per second through 50 cycles per second. For audio frequency measurements, the generator should have components varying from 10 cycles per second through 50 kilo-cycles per second. A generator with adequate voltage in the audio-frequency range will have exceptionally low voltage in the subaudio or automatic control range. The generator may either be provided with a frequency range switch which changes the frequency range and automatically increases the internal gain, or else the identifier may have adequate input amplification.

From the signals X and Y are derived state variables which are used in the analysis of the relationship between X and Y. The state variables are obtained from the networks shown in FIGS. 10 and 11.

The voltage $X_0$ in FIG. 10 is given by $$\frac{X_0}{X}=\frac{1}{2+6(pT)+(pt)^2} \qquad (87)$$

where $p$ stands for the time derivative operation, $d/dt$, $$pX_0=dX_0/dt \qquad (88)$$

$$T=RC \qquad (89)$$

and the capacitors and resistors have the relative values previously tabulated.

The input voltage X is related to the state variable $X_0$ by $$X=(2+6Tp+T^2p^2)X_0 \qquad (90)$$

The voltage $X_1$ in FIG. 2 is given by $$X_1=\frac{(pT)X}{2+6(pT)+(pT)^2} \qquad (91)$$

The voltage $X_2$ in FIG. 2 is given by $$X_2=\frac{(pT)^2X}{2+6(pT)+(pT)^2} \qquad (92)$$

The three state variables are, therefore, related to each other as follows:

$$X_1=dX_0/dt \qquad (93)$$

$$X_2=dX_1/dt=d^2X_0/dt^2 \qquad (94)$$

Note that the state variable $X_1$ is related to the state variable $X_0$ by being the derivative of the state variable $X_0$. This is not an approximate derivative of the state variable $X_0$, but is an exact derivative for all of the frequency components in $X_0$. These networks are particularly chosen to have this unique relationship so that the output of one is exactly the derivative of the output of the other. It is necessary that the poles of these two networks, therefore, produce identical filtering actions. This can be seen by examination of the previous equations. This unique relationship has been achieved in a passive, attenuative network with resistive loading. The voltage $X_0$ is obtained as a push-pull voltage across a 20,000 ohm potentiometer P1 whose output can be adjusted anywhere from $+X_0$ to $-X_0$. The setting of the potentiometer P1 is the coefficient $a_0$ and the output of the potentiometer P1 is a voltage $a_0X_0$. In the network in FIG. 10, R is chosen as 20,000 ohms. The parameter $T=RC$ appears in the filtering equation. T is a variable which is set by the operator of the machine, and should be so chosen that the coefficients in the differential equation for the network have reasonably large on-scale values. Or stated another way, the coefficient $\omega T$ should be near unity for the middle frequency for which the impedance function is desired. The scale of T is changed by ganging all of the capacitors together and changing them simultaneously in half decade steps. The values of C can be: 10 microfarads, 5 microfarads, 1 microfarad, 0.5 microfarad, 0.1 microfarad, 0.05 microfarad, 0.01 microfarad, 0.005 microfarad, 0.001 microfarad, and 0.0005 microfarad. These correspond to T values of 200 milliseconds, 100 milliseconds, 20 milliseconds, 1 millisecond, 2 milliseconds, 200 microseconds, 100 microseconds, 20 microseconds, and 10 microseconds.

The potentiometer P2 between terminals $X_1$ and $-X_1$ was designed to have the identical output load impedance as the potentiometer P3 between terminals $X_0$ and $-X_0$, so that a second 20,000 ohm helipot could be placed across the $X_1$ output for the purpose of representing coefficient $a_1$ to be multiplied by the state variable $X_1$. This coefficient is obtained by the position of the shaft of the potentiometer P2 and will be one of the unknowns which is solved for by the identification computer.

The network was designed so that it could be loaded with a 20,000 ohm potentiometer P1 between terminals $+X_2$ and $-X_2$. The setting of the potentiometer shaft is the coefficent $a_2$ and the output voltage of the potentiometer is the voltage $a_2X_2$.

Since the network in FIG. 11 is identical to the network in FIG. 10, the analogous relations for the Y variables are $$Y_0=\frac{Y}{2+6(pT)+(pT)^2} \quad (95)$$

$$Y=(2+6Tp+T^2p^2)Y_0 \quad (96)$$

$$Y_1=\frac{(pT)Y}{2+6(pT)+(pT)^2} \quad (97)$$

$$Y_2=\frac{(pT)^2Y}{2+6(pT)+(pT)^2} \quad (98)$$

$$Y_1=dY_0/dt \quad (99)$$

$$Y_2=dY_1/dt=d^2Y_0/dt^2 \quad (100)$$

FIG. 11 is a network identical to that shown in FIG. 10. It calculates the state variables $Y_0$, $Y_1$ and $Y_2$ from the input voltage Y.

With these state variables the differential equation $$a_0X_0+a_1X_1+a_2X_2+b_0Y_0+b_1Y_1+b_2Y_2=e \quad (101a)$$

can be formed. FIG. 12 shows the resistive network 140 which is used as an adder to form the above equation. The input to the high gain amplifier 142 is proportional to the low level error signal *e* in Equation 101*a*.

What is desired to identify the circuit under test is the differential equation obtained by setting $$e=0 \quad (101b)$$

The control system shown in FIG. 12 does this. When the control system has completed its operation, and the settings on all of the helical potentiometers are their final steady state correct values, then the differential equation which has been formulated is $$\frac{[a_0+a_1(pT)+a_2(pT)^2]X+[b_0+b_1(pT)+b_2(pT)^2]}{2+6(pT)+(pT)^2}Y=0 \quad (102a)$$

This equation is satisfied by the same coefficients $$[a_0+a_1(pT)+a_2(pT)^2]X+[b_0+b_1(pT)+b_2(pT)^2]Y=0 \quad (102b)$$

The differential Equation 101*b* formed by zero equal to the sum of the products of the coefficients times the state variables can be written $$\sum_{n=0}^{n=2}(a_nX_n+b_nY_n)=0 \quad (101c)$$

The coefficients that satisfy this equation are identically the same as the coefficients that satisfy the classical differential equation relating the variables X and Y by virtue of the dynamics of the circuit under test. For $\tau=t/T$, and $p=d/dt$, the classical equation is $$a_0X+a_1\frac{dX}{d\tau}+a_2\frac{d^2X}{d\tau^2}+b_0Y+b_1\frac{dY}{d\tau}+b_2\frac{d^2Y}{d\tau^2}=0 \quad (103a)$$

$$a_0X+a_1TpX+a_2T^2p^2X+b_0Y+b_1TpY+b_2T^2p^2Y=0 \quad (103b)$$

$$\sum_{n=0}^{n=2}a_n(Tp)^nX+b_n(Tp)^nY=0 \quad (103c)$$

Since the classical Equation 103*b* for the test circuit is identical to the weighted state variable Equation 102*b* for the identification machine, the coefficients derived by the machine are the correct coefficients for the impedance function. The impedance function as obtained internally in the machine is therefore $$\frac{Y}{X}=-\frac{a_0+a_1(pT)+a_2(pT)^2}{b_0+b_1(pT)+b_2(pT)^2} \quad (104)$$

The impedance function of unknown two-terminal network 93 in FIG. 9 is given by $$Z=\left(\frac{K_XR_s}{K_y}\right)\left(\frac{a_0+a_1(pT)+a_2(pT)^2}{b_0+b_1(pT)+b_2(pT)^2}\right) \quad (105)$$

Note that the impedance in Equation 105 is positive although *Y/X* is negative. This change of sign is due to the fact that the current in $R_s$ in phase with Y produces a negative X.

Any one of the coefficients, $a_0$, $a_1$, $a_2$, $b_0$, $b_1$ or $b_2$, may be chosen arbitrarily by the operator of the machine. To do this conveniently, in FIG. 12 there is shown a disabling switch 152 on the D-C motor 151 which drives the shaft 156 to the potentiometer P1 for $a_0$. If this switch 152 is opened, then the coefficient $a_0$ may be set arbitrarily by the operator. When testing impedance or transfer functions which do not have pure derivative action, a typical setting for $a_0$ is unity. When testing impedance or transfer functions which do have a pure derivative action, then it is more desirable to permit $a_0$ to be found by the converging action of the machine, and to select the coefficient $b_0$ and set it equal to unity. For this purpose, a disabling switch 153 has been shown in FIG. 12 in series with the D-C motor 151 which drives the shaft 156 of the potentiometer P4 for $b_0$.

The action of the circuits in FIG. 12 can be described as follows: The input to the high gain amplifier 142, when the machine is first energized, may be a value of *e* of 100 volts on the bus 141. Consequently, the high gain amplifier 142 is saturated and operates like a relay. The output voltage on the E-bus 143 will change infrequently between its maximum positive and negative values. As the machine drives the potentiometers towards their correct settings, the voltage on the *e*-bus 141 drops to millivolts. For high accuracy then, it is desirable to amplify this small error signal and amplification of the high gain amplifier 142 is at least 40 db and preferably 60 db. The error signal now appears on the E-bus 143 as a proportional rather than a clipped signal. This error signal is mixed or cross-correlated with the state variable $X_0$ in the first pair of multigrid converter tubes VT1, VT2. The net result is that the voltage impressed across the D-C motor 151 which is connected between the two plates of the push-pull pair of converter tubes has two components. One of these components is proportional to the product of $X_0$ and E. This component has an average or mean value which will turn the D-C motor slowly in the direction to correct an error in the coefficient $a_0$.

Typical multigrid converter tubes which may be used for VT1 and VT2 are the 6SB7–Y and the 5915.

Other means for multiplying the voltage on the E–bus 119 by the state variable $X_0$ on terminal 94 may be used to obtain a signal to drive the D-C motor 151. One method is to produce the equation $$\text{Voltage}=X_0\frac{E}{|E|}$$

which is the state variable voltage between terminals $X_0$ and $-X_0$ in FIG. 10 impressed directly on the D-C motor 151 but with a polarity which reverses as the error voltage on 143 reverses. The error voltage, therefore, operates a switching gate in a polarity sensitive rectifier or phase sensitive demodulator. It is also possible to drive the D-C motor by the direct multiplication from a four quadrant multiplier. In this case, $$\text{Motor voltage}=X_0E \quad (106)$$

FIG. 13 illustrates the type of circuit that might be present in the circuit under test 93 in FIG. 9. Terminals 161 and 162 are input terminals to the circuit under test 93 and are connected to the conductors 92 and 96 from the signal generator 91. As shown, the circuit under test includes an inductor L, a resistance R and a capacitance C, all connected in series. By way of example, the inductor L can have a value of 0.1 $j\omega$ ohms, resistor R can have a resistance of 10 ohms, and the capacitor C can have a capacitive reactance of $10^7/j\omega$ ohms. The sum of these three impedances L, R and C is called the test impedance or the unknown impedance $Z_c$ which is to be measured by the automatic identification machine hereinbefore described in conjunction with FIGS. 9, 10, 11 and 12. The voltage drop across the inductor L, the resistor R and the capacitance C is called the voltage $V_Y$. A resistance $R_s$ is also connected in series with the inductor L, the resistance R and the capacitor C so that the entire assembly is connected across the input terminals 161 and 162. The resistance $R_s$ can have any suitable value as, for example, 1000 ohms. In practice, the resistor $R_s$ can be in the form of an adjustable decade box with values for $R_s$ from 10 ohms to 10 megohms being readily available. The voltage drop across the resistor $R_s$ is called the voltage $V_X$.

Some typical values of voltages throughout the system can be obtained by considering this example of a series circuit consisting of a 100 millihenry choke L, a 10 ohm resistor R, and a 0.1 microfarad capacitor C, all connected in series as the unknown circuit as shown in FIG. 5. The values of $K_X$ and $K_Y$ are chosen to obtain sufficient voltages for X and Y.

Consider the random signal generator 91 as delivering a voltage having the following characteristics:

TABLE I

| Band | Mid frequency | Voltage, v. |
|---|---|---|
| 5 kc.-50 kc. | 20 kc. | 30 |
| 500-5000 c.p.s. | 2 kc. | 10 |
| 50-500 c.p.s. | 200 c.p.s. | 3 |
| 5-50 c.p.s. | 20 c.p.s. | 1 |

The test impedance or unknown network being tested has the following characteristics:

TABLE II

| | $Z_c$ | $V_Y$, v. | $V_X$, v. |
|---|---|---|---|
| 20 kc. | 10+j12,000 | 30 | 2.5 |
| 2 kc. | 10+j400 | 3.7 | 9.2 |
| 200 c.p.s. | 10−j7,880 | 3 | 0.38 |
| 20 c.p. | 10−j80,000 | 1 | 0.012 |

If $K_X$ is set to 5 and $K_Y$ is set to 5, to produce large input voltages, and if T is set to $10^{-4}$, then the analyzer produces approximately the following voltages:

TABLE III

| Mid frequency of band, $f$ | X | Y | $X_0$ | $X_1$ | $X_2$ | $Y_0$ | $Y_1$ | $Y_2$ |
|---|---|---|---|---|---|---|---|---|
| 20 kc. | 12.5 | 150 | 0.075 | 0.9 | 10.8 | 0.9 | 10.8 | 129.6 |
| 2 kc. | 92 | 18.5 | 4.6 | 5.52 | 6.6 | 1.85 | 2.22 | 2.65 |
| 200 c.p.s. | 1.9 | 15 | 0.38 | 0.045 | 0.005 | 3.0 | 0.36 | 0.04 |
| 20 c.p.s. | 0.06 | 5 | 0.01 | 0 | 0 | 1.0 | 0.012 | 0 |
| Composite | 47.7 | 152 | 4.6 | 5.7 | 62.8 | 3.77 | 11.03 | 129.6 |

If $a_0$ is set to 1.0, then the identifier will read $$K=1000$$
$$a_0=1.0$$
$$a_1=0.01$$
$$a_2=1.0$$
$$b_0=0$$
$$b_1=1.0$$
$$b_2=0 \quad (107)$$

Inside of the identifier are the voltages $$a_0X_0=4.65 \text{ v.}$$
$$a_1X_1=0.057 \text{ v.}$$
$$a_2X_2=12.8 \text{ v.}$$
$$b_0Y_0=0$$
$$b_1Y_1=11.0 \text{ v.}$$
$$b_2Y_2=0 \quad (108)$$

The coefficient $a_1$, which is related to the damping, is the significant term of least accuracy. The high gain error amplifier 142 in FIG. 12 is designed to respond to a voltage on the $e$ bus 141 of less than 0.05 volt and the D-C motor 151 for the $a_1$ potentiometer P1 produces a torque sufficient to exceed static friction and turn the shaft 156 for an $e$ voltage less than this amount.

Frof the machine readings can be calculated the following network coefficients:

$$Z(p)=10^3\left(\frac{1+10^{-2}(p10^{-\cdot})+1(p10^{-4})^2}{0+1(p10^{-4})}\right) \quad (109)$$

$$Z(j\omega)=10^7\frac{1+j\omega10^{-6}+(j\omega)^2 10^{-8}}{j\omega} \quad (110)$$

$$\omega_0=\frac{1}{T}\sqrt{\frac{a_0}{a_2}} \quad (111)$$

$$\sigma=-a_1/2a_2T \quad (112)$$

$$Q=(\sqrt{a_0a_2})/a_1 \quad (113)$$

$$\omega_0=10^{-4} \quad (114)$$

$$s_0=-\left(\frac{10^{-2}}{2}\pm j\right)10^{-4} \quad (115)$$

$$\varphi=0.005 \quad (116)$$

$$Q=\frac{1}{2\varphi}=100 \quad (117)$$

Figure 14:
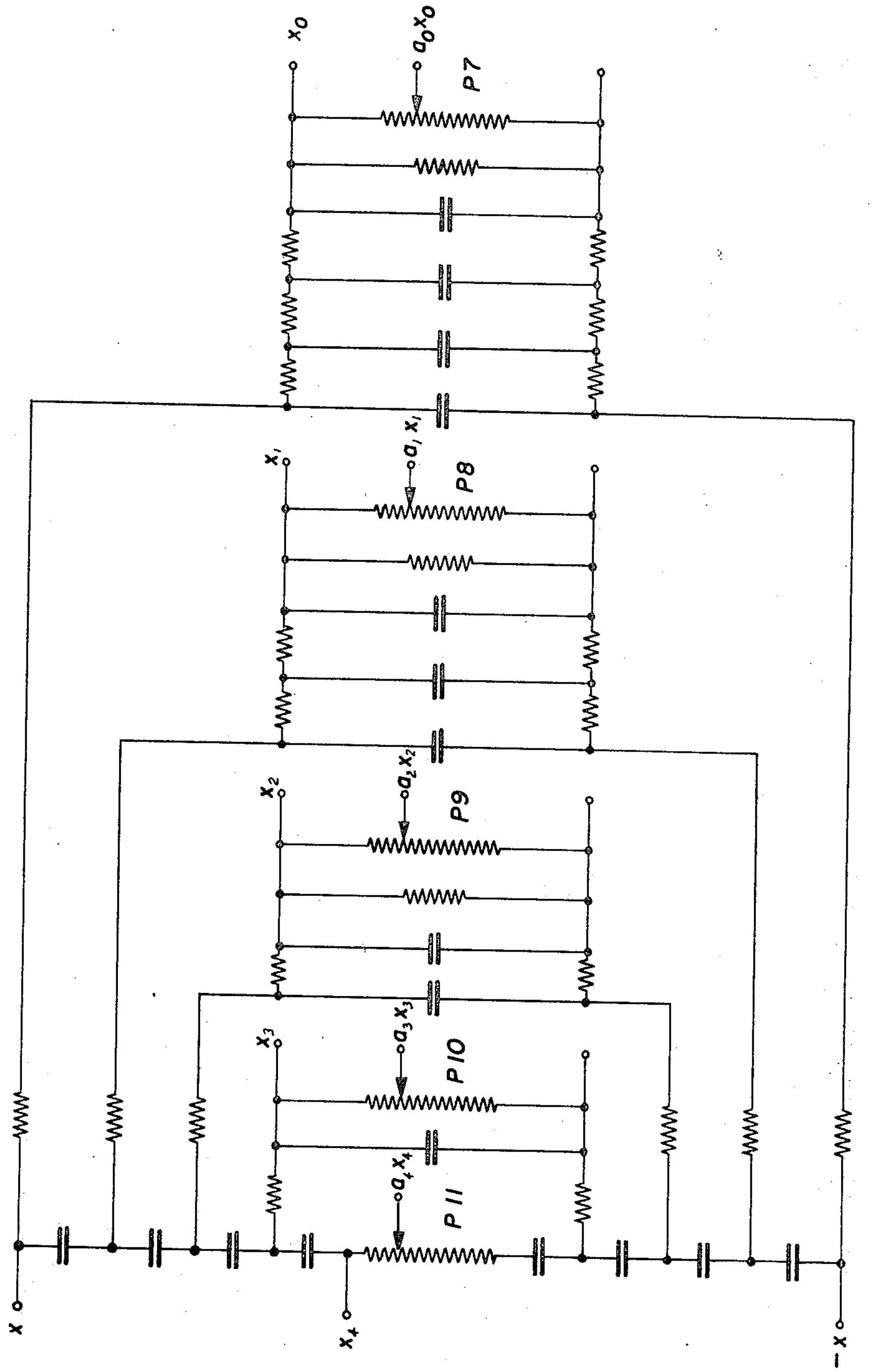
FIG. 14 is a circuit diagram which will be required in place of the circuit diagram shown in FIG. 10 when the identification machine is designed for a fourth order polynomial operation on X or for test circuits requiring the fourth derivative of X to represent the differential equation or impedance function.

FIG. 14 shows a network required in place of the network shown in FIG. 10 in the identification machine shown in FIGS. 9, 10, 11 and 12 in case the identification machine is designed for a fourth order polynomial operation on X, or for test circuits requiring the fourth derivative of X to represent the differential equation or impedance function. In the network shown in FIG. 14, the X and −X terminals are connected to the corresponding terminals in FIG. 9. The network shown in FIG. 14 consists of a plurality of capacitors and resistors arranged as shown. Also included are potentiometers P7, P8, P9, P10 and P11, of which the wipers are designated with an $a_0X_0$, $a_1X_1$, $a_2X_2$, $a_3X_3$, and $a_4X_4$. The potential on the wiper of the potentiometer with respect to ground represents the corresponding weighted state variable. The plurality of additional terminals are provided which are identified as $X_0$, $X_1$, $X_2$, $X_3$ and $X_4$. The potentials on these terminals with respect to ground represent the corresponding state variable.

It should be pointed out to maintain the symmetry of the voltages with respect to ground in FIG. 14, the components must be symmetrical with respect to the input terminals X and −X. For this reason, the corresponding components have values which are equal to each other in the network. The values of the resistors and capacitors in FIG. 14 are chosen so that $$X_4=TpX_3 \quad (118)$$
$$X_3=TpX_2 \quad (119)$$
$$X_2=TpX_1 \quad (120)$$
$$X_1=TpX_0 \quad (121)$$

In addition to replacing the network of FIG. 10 with the network shown in FIG. 14, it is necessary to replace the network shown in FIG. 11 with a network which is identical in parameter values with those shown in FIG. 14, This new circuit, which can be called the Y states variable generator, has input terminals Y and −Y which are connected to the corresponding terminals in FIG. 9. The network generates the state variables $Y_0$, $Y_1$, $Y_2$, $Y_3$ and $Y_4$ and the weighted state variables $b_0Y_0$, $b_1Y_1$, $b_2Y_2$, $b_3Y_3$ and $b_4Y_4$, respectively.

The adder network shown in FIG. 12 including the resistors 140 must be expanded by providing four more adder input terminals, each with resistance between the input terminal and the *e* bus 141 equal to the other equal adder input resistances. These four additional input terminals are connected to receive the four additional weighted state variables $a_3X_3$, $a_4X_4$, $b_3X_3$ and $b_4X_4$. Corresponding to these four additional inputs, there must be eight additonal multi-grid vacuum tubes driving four additional DC motors connected to the four additional potentiometers whose shaft settings are proportional to $a_3$, $a_4$, $b_3$ and $b_4$.

This complete augmented machine will solve the state variable equation whose coefficients are equal to those in the differential equation of the unknown test circuit.

$$\sum_{n=0}^{n=4}(a_nX_n+b_nY_n)=0 \qquad (122)$$

$$\sum_{n=0}^{n=4}(a_n(Tp)^nX+b_n(Tp)^nY)=0 \qquad (123)$$

The network shown in FIG. 10 is a new, unique and useful generator of multiple output voltages that have a prescribed relationship one to the other. This desirable relationship is achieved by the unique topological arrangement of the components of the network. The network shown in FIG. 14 is also a new, unique and useful generator of multiple output voltages that have a prescribed relationship one to the other. This desirable relationship is achieved by the unique topological arrangement of the components of the network.

Figure 15:
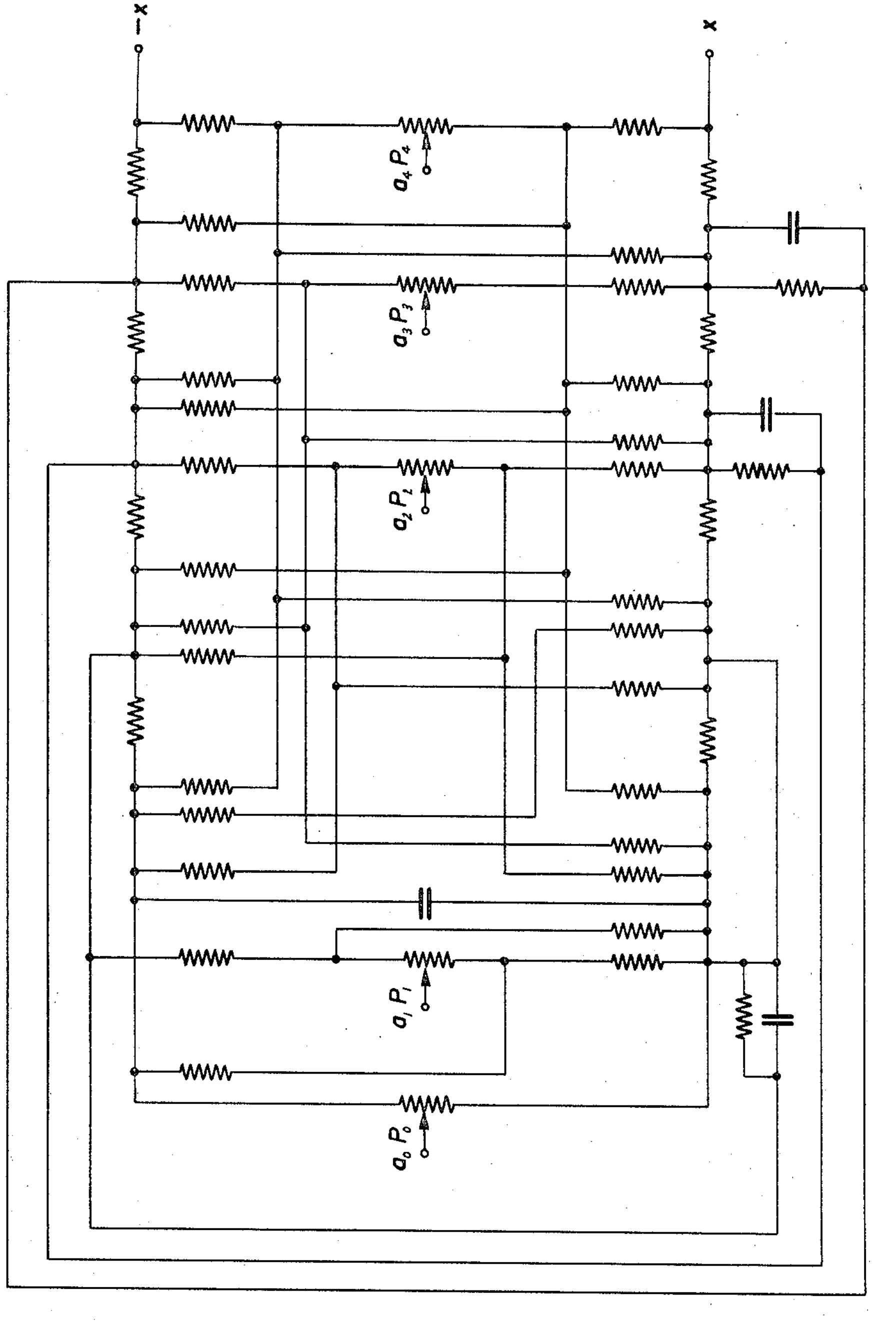
FIG. 15 is a network for generating state variables by weighted additions.

There are other networks which may be used for the purpose of generating state variables from an input signal, with the provision that the state variables appear in conjunction with a variable parameter in such a manner that the weighted state variables with controllable weightings can also be generated by the network. FIG. 15 is an example of a state variable generating network receiving the input signals +X and −X and generating the state variables $P_0$, $P_1$, $P_2$, $P_3$ and $P_4$, and also generating the weighted state variables $a_0P_0$, $a_1P_1$, $a_2P_2$, $a_3P_3$ and $a_4P_4$. Through proper selection of component values, the following conditions can be fulfilled:

$$P_4=TpP_3 \qquad (124)$$
$$P_3=TpP_2 \qquad (125)$$
$$P_2=TpP_1 \qquad (126)$$
$$P_1=TpP_0 \qquad (127)$$

The network in FIG. 15 has the advantage that the number of decade capacitors required is fewer than for the network in FIG. 14. In FIG. 15, the state variables are formed by weighted additions. The derived state variables P are related to each other by $P_n=(Tp)n-mP_m$.

Figure 16:
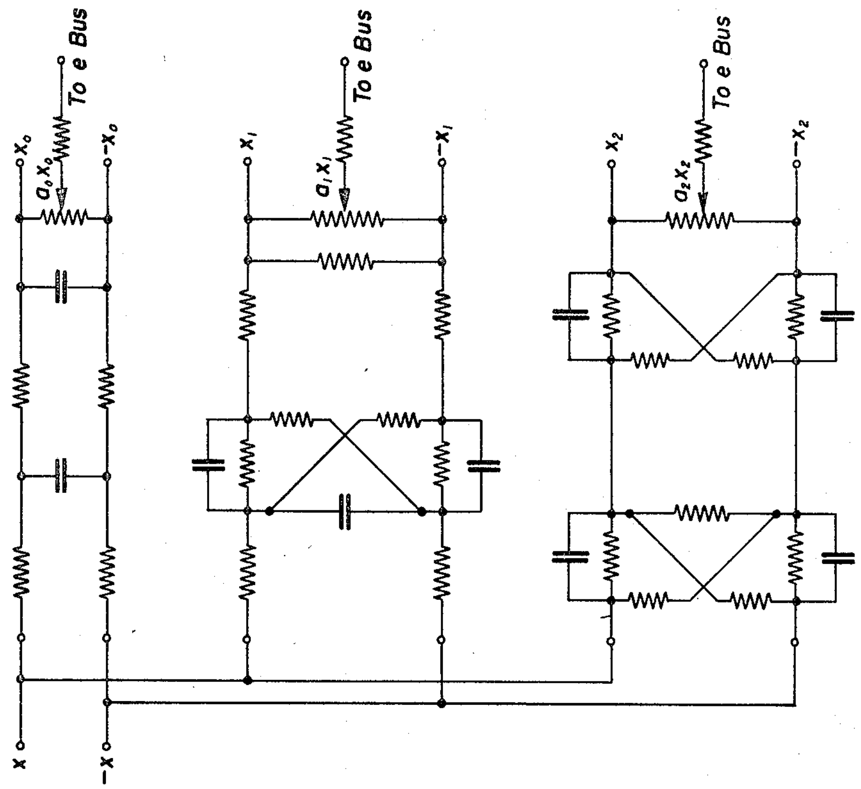
FIG. 16 is a network for generating state variables which can be used in place of the network shown in FIG. 10.

In FIG. 16, there is shown another network whose derived state variables fulfill the condition $$X_1=TpX_0 \qquad (128)$$
$$X_2=TpX_1 \qquad (129)$$

This network in FIG. 16 may be used in place of the network shown in FIG. 10 for the identification machine consisting of FIGS. 9, 12 and 16, and another network identical to that in FIG. 16 is also used instead of the network in FIG. 11.

If the identification machine and apparatus is connected to two signals in a unilateral feedback system, it will not, in general, read either the forward or the feedback transference. What it reads is a function of the location of the commands or random load disturbances that enter the system. Consider the case where there exists only one adder in the entire unilateral feedback loop and to which can enter a signal as a function of time. In a servomechanism, said signal can be a command signal, but if there is command signal, there can be no load disturbances. Or, if the command is zero, the signal can be random load forces which are added. In a process regulator, the disturbances may be added in the process. Consider the identification machine connected to points A and B within the feedback loop. If the adder into which the single permitted signal enters is in the branch from A to B going in the direction of unilateral information and power flow, then the identification machine reads the transference of the unilateral branch from B to A.

To summarize certain portions of the foregoing, the output signal from an unknown process is related to the input signal to the process by the transfer function of the process. In addition, the output signal may contain components due to noise generated within the process, and other components due to additional process input signals of different types. In a multivariable system, there is a different transfer function for the relationship between each input and each output. Selecting a particular input and a particular output, the transference is the equation for the portion of the output which correlates with the input, as a function of the input and the dynamic mechanism of the unknown process. If this function is written as a differential equation, then the transference is the ratio of the correlative output to the input expressed as a ratio of polynomials in the differential operator. If the transference is a frequency response, then it is the ratio of the correlative output to the input expressed as a complex phasor. If the transference is a Laplace transform, then it is the ratio of the Laplace transform of the correlative output divided by the Laplace transform of the input expressed as a function of the Laplace variable *s*.

As pointed out previously, the purpose of my identification machine is to calculate the differential equation coefficients in numerical form. The identification machine uses two inputs: one proportional to the input to the unknown process, and the other proportional to the output from the unknown process. For the purposes of explanation, the following notation will be used.

Let $$p^n=d^n/dt^n \qquad (130a)$$

X is the process input and Y is the correlative component of the process output. The dynamics of the unknown system is defined by the differential equation $$B(p)Y=A(p)X \qquad (130b)$$

where $$A(p)=\sum_{n=0}^{g}a_np^n \qquad (130c)$$

and $$B(p)=\sum_{n=0}^{h}b_np^n \qquad (130d)$$

Written in transference form, the differential equation becomes $$Y=\frac{A(p)}{B(p)}X \qquad (130e)$$

Th order of the numerator of this transference is *g*, and the order of the denominator is *h*. In general, $$g<h \qquad (130f)$$

but this is not a restriction on the operation of the machine.

There are $g+h+2$ coefficients in the polynomials in Equations 130*c* and 130*d*, but there are only $g+h+1$ independent variables. For this reason, one of the coefficients may be arbitrarily selected. If the unknown does not contain a cascade integration, $b_0$ may be arbitrarily set at unity. If the unknown does not contain a cascade differentiation, $a_0$ may be arbitrarily set at unity. Both $a_0$ and $b_0$ may not be chosen arbitrarily.

Figures 17, 18:
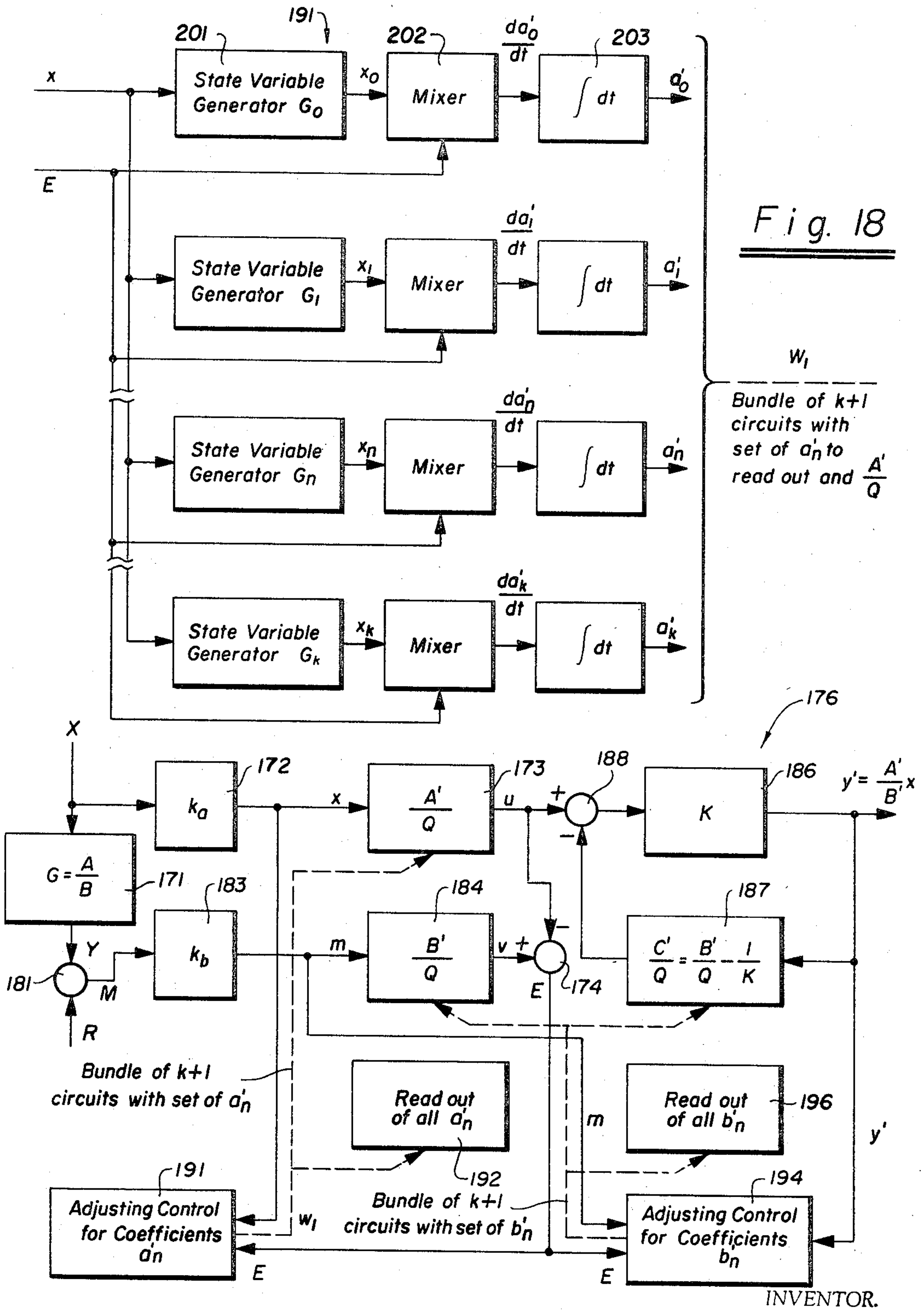
FIG. 17 is a block diagram of an identification machine which can be utilized for measuring the transference of an unknown process in a feedback loop with both command fluctuations and random load disturbances.
FIG. 18 is a block diagram of an adjusting control 191 for the coefficients $a'_n$ as shown in FIG. 17.

In FIG. 17, there is shown a block diagram of an identification machine which can be utilized for measuring the transference of an unknown process in a feedback loop with both command fluctuations and random load disturbances. This diagram includes an unknown process 171 which is marked $G=A/B$. The input to the unknown process 171 is identified as X and the output from the unknown process is identified as Y. The signal X, in addition to entering the unknown process 171, enters a transducer 172 which has a transfer coefficient of $k_a$, and which produces a signal $x$. The signal $x$ passes through the adjustable transfer function 173 which has a transfer function of $A'/Q$, and represents a typical state variable network and has an output of $u$. This output is supplied both to the error calculator or error substractor 174 and to a feedback model 176.

$$u=k_a\frac{A'}{Q}X \tag{130g}$$

The correlative output of the differential equation part of the unknown process is the signal Y from the unknown process 171 which cannot be measured directly because there is added to it in the adder 181 noise and other random fluctuations represented by the signal R such that the output of the process which is observable is the signal M.

$$M=Y+R \tag{131}$$

The signal M is measured by a transducer 183 which has a transfer coefficient of $k_b$ to produce the signal $m$. The purpose of the transducers 172 and 183 is to convert the signals that appear in the unknown process into a form usable by the identification machine. In general, the signals X and M will be either voltages as a function of time, or recordings on a magnetic tape, or a sequence of punched cards for use with digital card processing equipment.

The second transducer 183 senses the output M of the unknown process to produce the signal $m$ which is the input to the adjustable transference 184 which has the transfer function of $B'/Q$ and whose output is $v$. The error subtractor or error calculator 174 takes the difference between the $v$ and $u$ $$v=k_b\frac{B'}{Q}M \tag{132}$$

$$E=v-u \tag{133}$$

The high gain amplifier 186 with a gain of K generates the output signal $y'$ which enters the feedback block 187 whose transference is $$\frac{C'}{Q}=\frac{B'}{Q}-\frac{1}{K} \tag{134}$$

The output of this feedback transference block is subtracted from $u$ in the subtractor 188 to produce the input to the high gain amplifier whose gain is K. This feedback loop generates a closed loop transfer function equal to $Q/B'$.

$$y'=\frac{Q}{B'}u \tag{135}$$

In FIG. 17, means 191 is provided for adjusting the coefficients of the numerator term in the transference $A'/Q$. This means is called adjusting control for the coefficients $a'_n$. This adjusting control receives both function $x$ and the error signal E and performs a decomposition of both these signals and mixing of the decomposed components to produce a plurality of output signals which are the coefficients $a'_n$. The dotted line represents a cable W1 which contains a bundle of $k+1$ separate circuits which carry $k+1$ different signals for $a'_n$ which are transmitted to the readout 192 and to the transference $A'/Q$ and used to adjust the numerator polynomial in this transference.

The adjusting control for the coefficients $b'_n$ in FIG. 17 receives as inputs the error signal E, the output of the feedback model $y'$, and the output of the transducer $k_b$ which is $m$. This adjusting control 194 produces a decomposition of each of the three inputs and mixes the decomposed components in such a manner as to produce a plurality of coefficients $b'_n$. The cable identified as W2 in FIG. 17 contains a bundle of $k+1$ separate circuits and which carry $k+1$ different signals equal to the coefficients $b'_n$ to the readout 196 and also to the $B'/Q$ and the $C'/Q$ where these are used to adjust the numerator polynomial in the transference $B'/Q$ and the numerator polynomial in the transference $C'/Q$.

The numerator polynomial A' in the model $A'/Q$ is related to the set of $a'_n$ coefficients by $$A'=\sum_{n=0}^{k}a'_n p^n \tag{136}$$

The numerator polynomial B' has the form $$B'=\sum_{n=0}^{k}b'_n p^n \tag{137}$$

The machine in FIG. 17 operates in a statistical manner with the coefficients in the models A', B' and C' changing until the error signal E becomes a statistical signal correlating only with R and not with X or Y.

$$E\rightarrow k_b\frac{B'}{Q}R \tag{138}$$

Substituting Equations 130, 131, 132 and 133 into the steady state final condition 138, $$k_b\frac{B'}{Q}(Y+R)-k_a\frac{A'}{Q}X=k_b\frac{B'}{Q}R \tag{139}$$

$$k_bB'Y=k_aA'X \tag{140}$$

$$\frac{Y}{X}=\frac{k_a}{k_b}\frac{A'}{B'} \tag{141}$$

Define a gain calibration term for the input transducers of $$K_i=k_a/k_b \tag{142}$$

From Equation 130*e*

$$G=\frac{A}{B}=\frac{Y}{X}=K_i\frac{A'}{B'} \tag{143}$$

The readouts of all of the $a'_n$ and the $b'_n$, therefore, constitute a complete linear identification of the unknown process. There are $2k+2$ total parameters in the $a'_n$ and $b'_n$. These represent only $2k+1$ independent parameters, however, since a constant can be factored out of both the numerator and the denominator polynomials in $A'/B'$. Any one of these coefficient parameters may, therefore, be set arbitrarily before or during the operation of the machine. One manner of operation is to set $b'_0$ equal to unity unless the unknown process contains a pure integration, in which case, the coefficient of $b'_1$ will try to go to infinity. To handle this contingency, $a'_0$ may be set equal to unity. $k$ in Equations 136 and 137 is the maximum order of the numerator polynomial or the denominator polynomial that can be solved for by the machine, and this number is limited by the machine design. It is preferable to have $k$ equal to or larger than $h$, otherwise, the machine will be solving for a low order approximation to a high order system. In all of the equations above, a primed coefficient parameter or primed signal or primed function refers to a best statistical estimate determined by the machine, for the corresponding unprimed coefficient parameter, signal, or function, which appears in the transference of the unknown process.

The operator Q is defined by $$Q=\sum_{n=0}^{k}q_n p^n \tag{144}$$

Note that A', B' and Q are all of the same order, $k$. Note also that the same function Q appears in all three linear models, $A'/Q$, $B'/Q$ and $C'/Q$. It is essential that the denominators of each of these models be identical in order for the error function to be conveniently decomposed into its components which correlate with independent state variables, and in order for Equations 141 and 143 to be independent of the function Q. Since each of the three models has the same order numerator as denominator, each of the three models is physically realizable, and can be constructed if need be with passive linear networks.

The model $$\frac{C'}{Q'}=\frac{B'}{Q}-\frac{1}{K}$$

is constructed as $$\frac{C'}{Q}=\frac{B'-Q/K}{Q} \qquad (145)$$

In order to adjust the numerator coefficients of this model in feedback, one can solve for the composite numerator coefficients in Equation 145 which results in $$C'=\sum_{n=0}^{k} c'_n p^n=\sum_{n=0}^{k}\left(b'_n=\frac{1}{k}q_n\right)p^n \qquad (146)$$

and $$c'_n=b'_n-\frac{1}{K}q_n \qquad (147)$$

Therefore, this model in feedback uses numerator coefficients $c'_n$ which are equal to the coefficients received from the cable $w_2$ in each case reduced by a preselected number equal to $q_n/K$.

In FIG. 18, there is shown an adjusting control for the coefficients $a'_n$ in FIG. 17. This adjusting control receives as inputs the signal $x$ and the error signal E. A plurality of state variable generators 201 are identified as $G_0, G_1 \ldots G_n \ldots G_k$, each receiving the signal $x$ as an input and each delivering respectively the state variables $x_0, x_1 \ldots x_k$. Each state variable generator is a passive network designed to deliver the signal $$x_n=G_n x=\frac{p^n}{Q}x \qquad (148)$$

The adjusting control 191 also includes a plurality of mixers 202 which can be called down converters, demodulators, cross-modulators, signal decomposers, or direction-cosine generators. Each demodulates the composite signal E using the carrier $x_n$ to select out a particular portion of E and determines the sign of this portion, with respect to $x_n$. Each cross correlates the signal E and the signal $x_n$ to produce a non-zero mean output proportional to the amount of signal E which correlates with $x_n$.

In general, the mixer 202 receiving E and $x_n$ should deliver zero-mean output if E does not contain significant components proportional to the $x_n$, or if $$a'_n=a_n \qquad (149)$$

A preferred form for each mixer 202 in FIG. 18 is a reversing polarity gate or reversing switch or controlled polarity unity gain amplifier which delivers $x_n$ times the sign of E.

$$\text{Mixer output}=x_n E/|E| \qquad (150)$$

An alternative form for each mixer 202 in FIG. 18 is a multiplier producing $$\text{Mixer output}=x_n E \qquad (151)$$

The mixer output contains a non-zero mean component proportional to $(a_n-a'_n)x^2_n$.

The output of each mixer is integrated in an integrator 203 to produce a coefficient parameter. These are conventional multivariable integral feedback systems which will converge to satisfy Equation 149.

$$\text{Mixer output}=da'_n/dt=k_1(a_n-a'_n)x^2_n \qquad (152)$$

The signal $x_0$ is mixed in a non-linear manner with the signal E in the first mixer in FIG. 18 to produce an output equal to the derivative of $a_0$ with respect to $t$, which is integrated in the first integrator to produce the signal $a'_0$. The signal $x_1$ is mixed in a non-linear manner with the signal E in the second mixer in FIG. 2 to produce a signal equal to $da'_1/dt$ which is integrated in integrator 203 to produce the signal $a'_1$.

In a similar manner, the output of each state variable generator is mixed with the error signal E and integrated in an integrator to produce the corresponding coefficient for that state variable.

The set of all the outputs of the integrators in FIG. 18 is called the bundle of $k+1$ signals which is fed to $A'/Q$ and to the readout. The physical circuits that carry these signals is called the cable $w_1$.

Figures 19, 20:
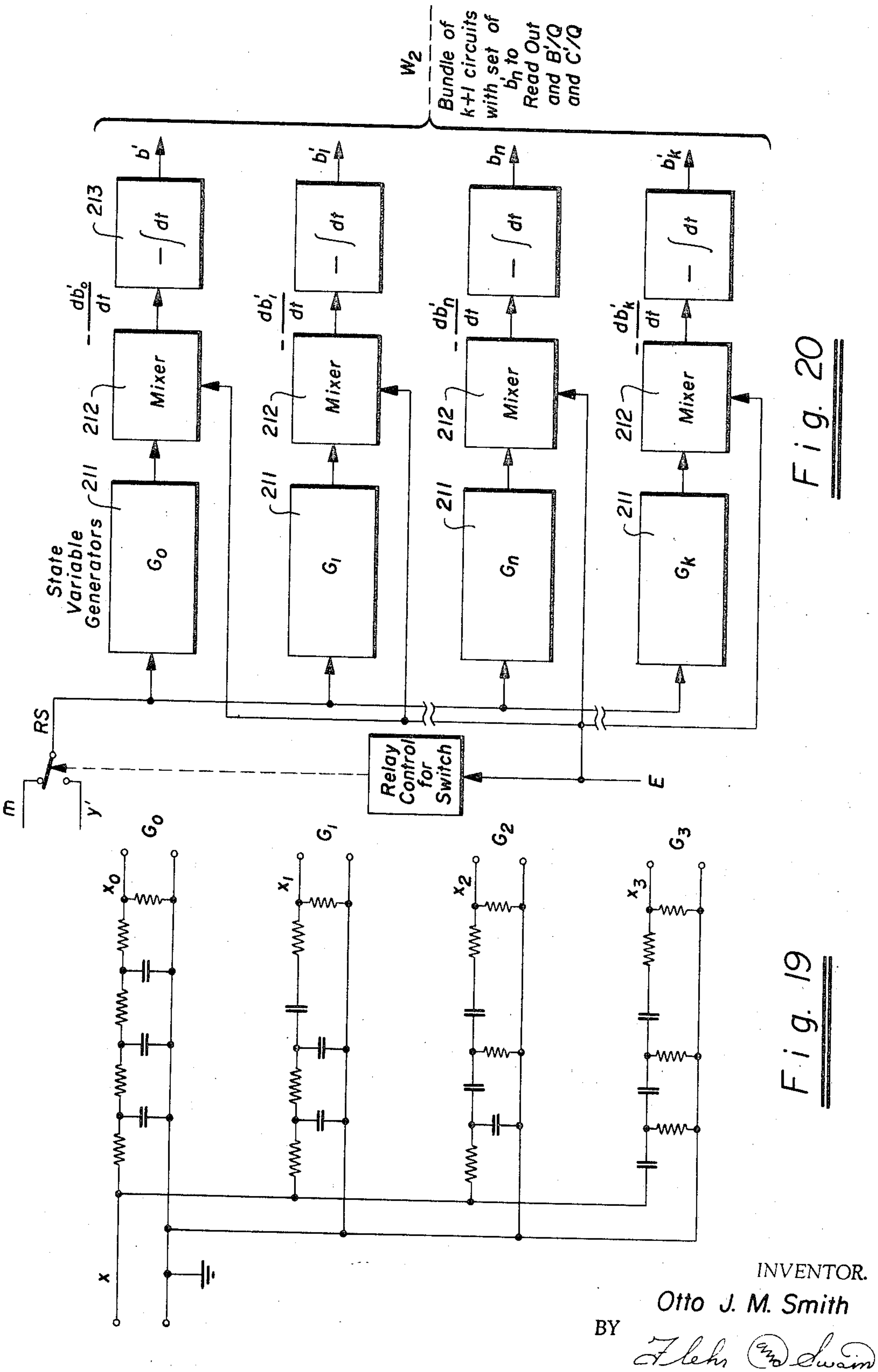
FIG. 19 is a circuit diagram of a state variable generator for use in the block diagram shown in FIG. 18.
FIG. 20 is a block diagram of the adjusting control 194 as shown in FIG. 17.

An example of the form of the state variable generators for FIG. 18 which satisfy Equation 150 are shown in FIG. 19 for the case when $k$ is three. The uppermost ladder network 206 is the state variable generator $G_0$ which produces the signal $x_0$. The second ladder network 207 is the state variable generator $G_1$, the third ladder network 208 is the state variable generator $G_2$, and the bottom ladder network 209 is the state variable generator $G_3$. The values of the components in these ladder networks can be selected by conventional network techniques to fulfill the conditions imposed by Equation 148. The basic feature of these ladder networks is that the poles of each ladder network are identical to the poles of each other ladder network. The zeros of each ladder network lie either at the origin of the Laplace frequency plane or at infinity. The first ladder network has no zero at the origin. The second ladder network for $G_1$ has only one zero at the origin. The third ladder network has two zeros at the origin, and the fourth ladder network has three zeros at the origin.

FIG. 20 shows the detailed internal construction of the box 194 in FIG. 17 denoted by "Adjusting Control for Coefficients $b'_n$." FIG. 20 contains a set of state variable generators 211 identified as $G_0, G_1 \ldots G_n \ldots G_k$. These are constructed identical to the state variable generators 191 shown in FIG. 18 and can be made utilizing the circuits shown in FIG. 19. The output of each state variable generator 211 goes to a corresponding mixer 212 which produces a non-linear combination of the said output with the error signal E. The output of each mixer goes to a corresponding integrator 213 with the output of the integrator denoted by one of the coefficients $b'_0, b'_1 \ldots b'_n \ldots b'_k$. The set of signals representing these coefficients is called a bundle of $k+1$ signals which goes to the models in FIG. 1 denoted by $B'/Q$ and $C'/Q$, and also to the readout. The collection of the circuits transmitting these signals is called the cable $w_2$.

The adjusting control shown in FIG. 20 receives both the signal $m$ and the signal $y'$. The relay switch RS can select one or the other of these two signals to be used as the input to each of the state variable generators. When the machine is first energized, the relay switch is transmitting the signal $m$ to the state variable generators.

The relay control for the switch RS in FIG. 20 can be made responsive to the rate of convergence of the parameter values toward the correct values. When the average of $E^2$ has a rapid rate of change, the machine is not near its steady state identification, but when the rate of change of average $E^2$ with respect to time diminishes below a preset preselected value, the relay control causes the relay switch RS to disconnect the signal $m$ and to replace it by the signal $y'$ which now becomes the input to the state variable generators.

When the machine is operated with the signal $m$ only being used as the input to the state variable generators 211, the machine will calculate a set of values for $b'_0, b'_1 \ldots b'_k$ which are constant, and to which the machine operation will always converge, but which values are less than the proper coefficients representing the unknown process. This is because both $m$ and $E$ contain random components due to R and $k_b B'/QR$ respectively which do not correlate with $x$ or $y$ but which do correlate with each other. These random components cause the mixers 212 in FIG. 20 to deliver non-zero mean positive-average signals to the integrators 213 even when every $b'_n$ equals $b_n$. For this reason, the convergent condition using the signal $m$ only is $$|b'_n|<|b_n| \quad (153)$$

The operation with RS connected to pass the signal $m$ is considered as a first step or a first approximation in determining the coefficients $b'_n$. The second step or the final determination of these coefficients is obtained by using $y'$ instead of $m$ for the state variable generators. During this second operation, the coefficients $b'_n$ will converge to the correct values representing the unknown process. The error signal E contains random noise of $k_bB'R/Q$ which does not correlate with X, and the signal $y'$ does not contain any of this random noise and therefore none of the mixers will have a component of non-zero-mean output due to the random noise in E. But during the preliminary step, when the signal $m$ is being used, there is a component in the signal $m$ of random noise which does correlate with the same component in E, and each mixer 212 responds to these two components in its two inputs, to produce a non-zero mean output which is a function of the level of this random noise. The reason that the signal $m$ is used to begin the operation of the machine identifier is that the machine operation is more predictably convergent toward a good first approximation for the coefficients $b'_n$ using the signal $m$, than when using the signal $y'$ which is influenced significantly by the initial settings in the feedback model $C'/Q$ in FIG. 17.

The relay control for the switch RS in FIG. 20 can be made responsive to the running time of the identification machine, so that the switch from $m$ to $y'$ occurs at a predetermined running time, rather than as a function of the rate of change of the average value of $E^2$.

The relay control for the switch RS can be made responsive to the average magnitude of E. It would continue to pass $m$ as long as the average of the error E has a magnitude greater than some predetermined or preselected value. When the magnitude of the error E is less than this predetermined or preselected value, the relay control would cause the signal $m$ to be disconnected and to be replaced by the signal $y'$ which now becomes the input to the state variable generators.

When the signal $y'$ is the input to the state variable generators in FIG. 20, the mixer outputs each have non-zero-mean averages proportional to $-k_1(b_n-b'_n)(y'_n)^2$. Using negative gain coefficients on each integrator makes each feedback loop satisfy $$db'_n/dt=k_1(b_n-b'_n)(y'_n)^2 \quad (154)$$

Each loop therefore converges to satisfy $$b'_n=b_n \quad (155)$$

When the rate of change of E with respect to time in FIG. 20 diminishes below a preselected predetermined value, then it is known that the machine has approached close to its final convergent settings, and it is proper for the switch RS to change the input from $m$ to $y'$.

It can be seen, therefore, that FIG. 17 is an identification machine for an unknown process which will deliver the coefficients of the differential equation of the unknown process. These coefficients reach their steady-state values and are no longer changing when the inputs to each of the integrators in FIGS. 18 and 20 are zero-mean statistical signals. This means that the steady-state operating condition has been reached when the pair of inputs to each mixer contain no cross correlative components. This condition occurs when the error signal E is essentially equal only to the random noise R after having passed through the intervening transferences.

$$E\rightarrow k_b\frac{B'}{Q}R \quad (156)$$

There cannot exist in the error signal E any component which is proportional to any one of the state variables $x_0$, $x_1 \ldots x_k$, $y_0$, $y_1 \ldots y_k$. If none of these components exist in E, then $A'/B'$ represents the differential equation portion of the unknown process as shown by Equation 143.

The state variable generators $G_n$ in FIG. 18 are also needed to generate the state variables used in the model $A'/Q$. This is shown by Equation 136. The state variable generators $G_n$ shown in FIG. 20 are also needed to generate the state variables used in the model $B'/Q$.

Figure 21:
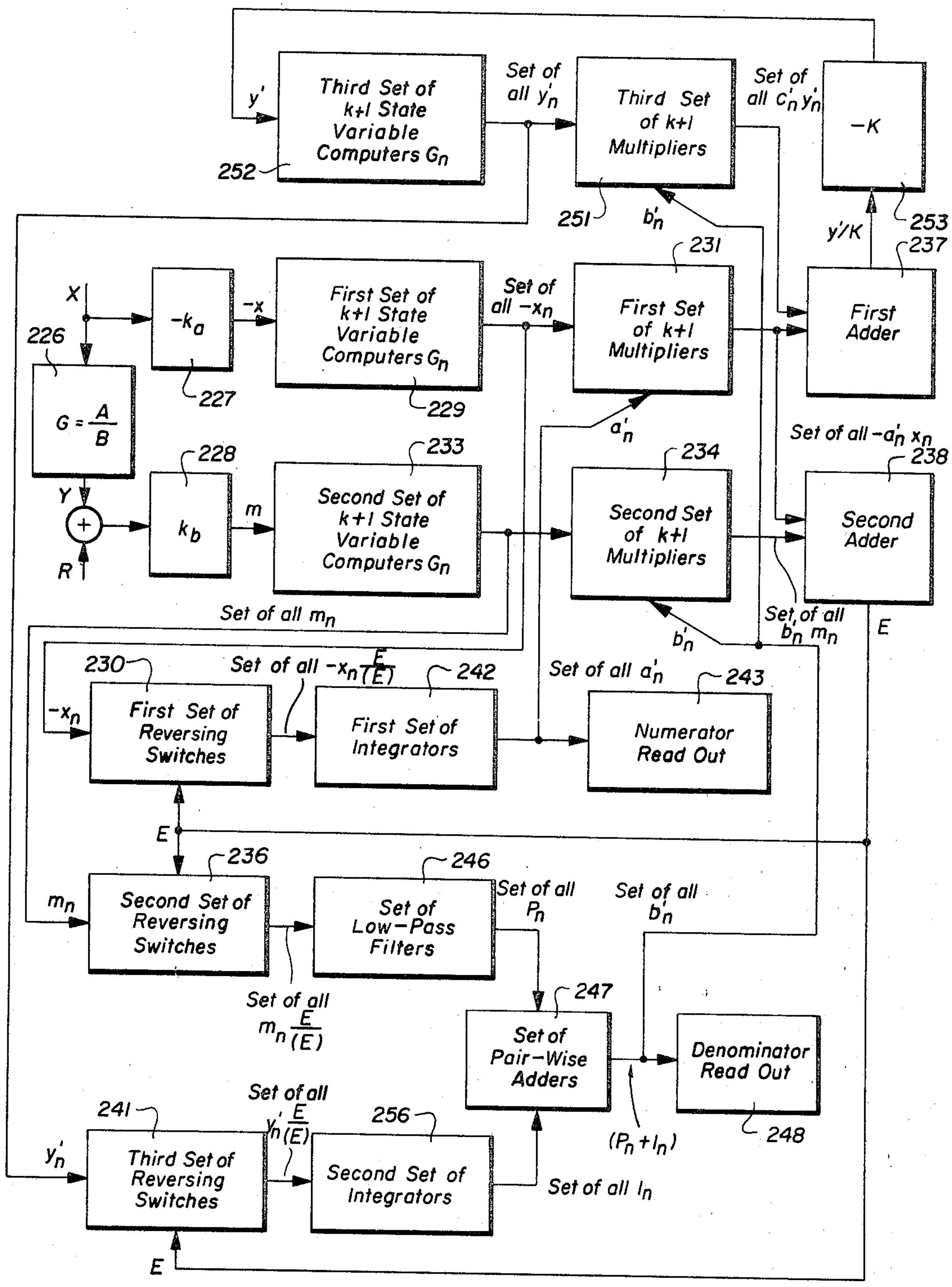
FIG. 21 is a block diagram of an identification machine, apparatus or system which minimizes the duplication of components.

An identification machine which minimizes the duplication of components is shown in FIG. 21. The unknown process 226 has an input $x$ supplied to it which is measured by the first transducer 227 with a gain coefficient $-k_a$. The output Y of the unknown process is measured by the second transducer 228 with a gain coefficient of $k_b$ to produce the signal $m$. The output of the first transducer 227 is a signal $-x$ which is the input to the set of $k+1$ state variable computers 229 whose output is the bundle which carries the set of signals of all $-x_n$. This bundle provides the input to a first set of $k+1$ multipliers 231 and also the input to a first set of reversing switches 232.

The signal $m$ is the input to a second set of $k+1$ state variable computers 233 whose outputs are the bundle which carries the set of signals of all $m_n$. This bundle is the input to a second set of $k+1$ multipliers 234 and to a second set of reversing switches 236. The first set of $k+1$ multipliers 231 receives an additional input, which is the bundle carrying the set of all $a'_n$. These multipliers take the products of the inputs in a pair-wise fashion to produce as outputs the bundle which carries the set of all the products $-a'_nx_n$. This latter bundle is the input to both a first adder 237 and a second adder 238.

The second set of $k+1$ multipliers 234 receives an additional input which is the bundle carrying the set of all $b'_n$. These multipliers produce the products of the inputs in a pair-wise fashion such that the outputs are the bundle carrying the set of all $b'_nm_n$. This bundle is an additional input to the second adder 238. The adder 238 produces the summation of all of its input signals and delivers a single composite output called the error signal E $$E=\sum_{n=0}^{k}(b'_nm_n-a'_nx_n) \quad (157)$$

The error signal E is used as a controlling input to the first, second and third sets of reversing switches 232, 236 and 241 respectively. The output of the first set of reversing switches 232 is, therefore, the bundle carrying all of the signals $-x_nE/|E|$. This bundle is the input to the first set of integrators 242 whose outputs are the bundle of circuits carrying the set of signals $a'_n$, which set is displayed in the numerator readout 243 and which set is also provided by the bundle of all $a'_n$ which was one of the inputs to the first set of $k+1$ multipliers 231. The integrators 242, therefore, solve the following equation.

$$da'_n/dt=-x_nE/|E| \quad (158)$$

In the steady state, each derivative is equal to 0.

$$x_nE/|E|=0 \quad (159)$$

This product, which reaches 0 in the steady state, has in general a non-zero-mean proportional to the difference between $a_n$ and $a'_n$. In the steady state, this component is $$k_1(a_n-a'_n)(x_n)^2=0 \quad (160)$$

and therefore $$a'_n=a_n \quad (161)$$

The second set of reversing switches 236 in FIG. 21 produces the set of all $m_nE/|E|$. This set of signals is passed through a set of low-pass filters 246 to produce the running average of each of these signals. Each of these running averages can be called a pump-priming term or a preliminary estimate.

$$P_n=\text{approximate integration of } m_nE/|E| \quad (162)$$

Each of these pump-priming terms is an input to the set of pair-wise adders 247 which delivers an output bundle containing the set of all the coefficients $b'_n$ to the denominator readout 248. At the beginning of the computation, the pump-priming terms are the only significant inputs to the set of pair-wise adders 247, and therefore the parameter coefficients at the beginning of the computational interval are approximately equal to $$b'_n = P_n = (\text{approximate integration of } m_n E/|E| < b_n \quad (163)$$

The feedback loop models the denominator of the transference of the unknown process. It also generates a statistical estimate of $y$ without the noise R.

$$y = k_a Y = k_a \frac{A}{B} X \quad (164)$$

The third set of $k+1$ multipliers 251 receives for its first set of inputs the set of all the coefficients $y'_n$ from the output of the third set of $k+1$ state variable computers 252. The set of computers 252 receives the signal $y'$ from the amplifier 253 which has a gain of $-K$. The amplifier 253 is supplied with a signal of $y'/K$ from the adder 237. The set of multipliers 251 receives for its second set of inputs the set of all $b'_n$ from the bundle that was the output from the set of pair-wise adders 247. This third set of $k+1$ multipliers 251 produces the set of pair-wise products from its two different bundles of inputs, such that its output is the bundle that carries the set of signals $c'_n y'_n$.

$$y'_n = G_n y' = \frac{p^n}{Q} y' \quad (165)$$

$$c'_n y'_n = \left(b'_n - \frac{q_n}{K}\right) y'_n = b'_n \frac{p^n}{Q} y' - \frac{q_n}{K} \frac{p^n}{Q} y' \quad (166)$$

Equations 164 and 166 define the operation of the feedback loop in FIG. 21 whose input to output transference is equal to $Q/B'$.

$$y' = -K \sum_{n=0}^{k} (c'_n y'_n - a'_n x_n) = \frac{Q}{B'} \frac{A'}{Q} x = k_a \frac{A'}{B'} X = \left(K_i \frac{A'B}{B'A}\right) y \quad (167)$$

where $$K_i = k_a / k_b \quad (168)$$

The third set of reversing switches 241 receives the bundle of signals for all $y'_n$ and in addition the control from the error signal E, and delivers the set of all the products $y'_n E/|E|$. The second set of integrators 256 receives this set of input signals and delivers the integrals with respect to time of each. The outputs of the second set of integrators 256 is therefore $$I_n = \text{outputs of 2nd set of integrators} = \int_0^t dt y'_n \frac{E}{|E|} \quad (169)$$

These outputs are the second set of inputs to the set of pair-wise adders 247.

The outputs of the set of pair-wise adders are the set of parameter coefficients $b'_n$. Considering both mechanism that contribute to the inputs to the pair-wise adders 247, it is seen that $$b'_n = P_n + I_n \quad (170)$$

The priming term $P_n$ starts out like an integration of $m_n E/|E|$, but since this approximate integration is produced by a low-pass filter, eventually the pump-priming term becomes equal to the average of $m_n E/|E|$. Therefore the parameter coefficient equals $$b_n' = \text{average of } m_n \frac{E}{|E|} + \int_0^t dt y'_n \frac{E}{|E|} \quad (171)$$

$b'_n$ reaches it final value when there is no additional contribution from the integration, and this occurs when the product $y'_n E/|E|$ has a zero-mean. The steady state is therefore given by $$y'_n E/|E| = \text{zero mean} \quad (172)$$

Substituting the component in E that correlates with $y'_n$, one has on the average that $$k_1 (b_n - b'_n)(y_n y'_n) = \text{zero mean} \quad (173)$$

This equation is satisfied by $$b'_n = b_n \quad (174)$$

which is the convergent steady-state condition that the identification machine arrives at.

Figure 22:
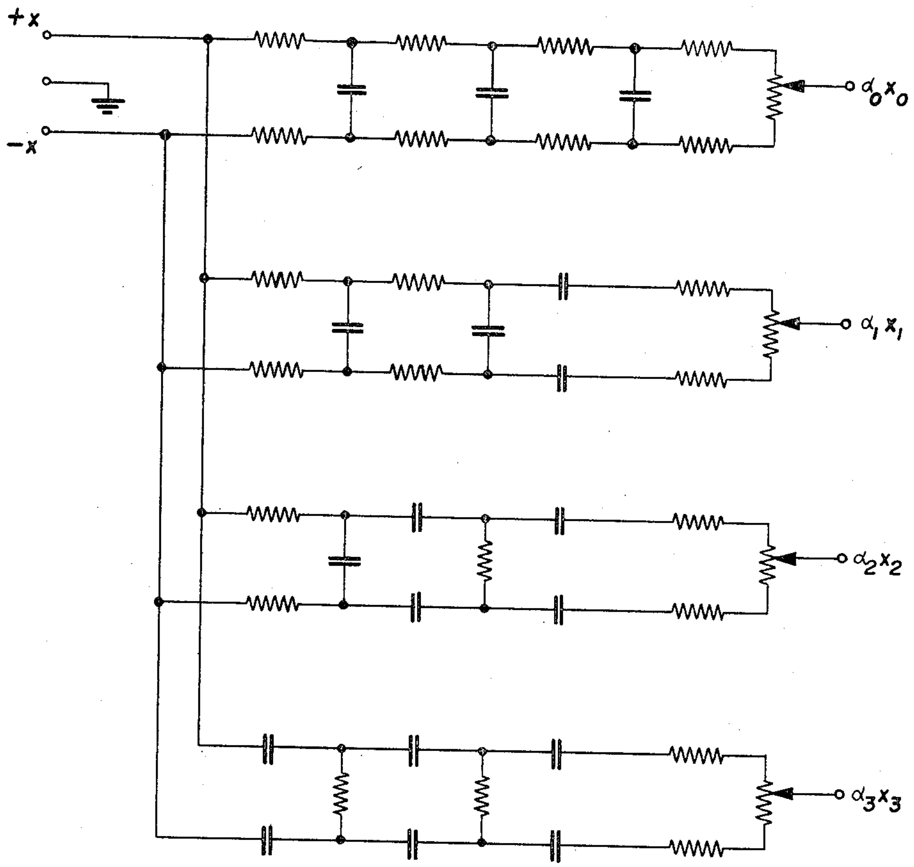
FIG. 22 is a network consisting of a combination of state variable computers and coefficient multipliers.

All of the components in FIGS. 17 and 21 are of a type well known to engineers skilled in the art, with the possible exception of the sets of state variable computers. The latter can be constructed as disclosed in FIG. 19. FIG 22 shows a combination of state variable computers and coefficient multipliers. A preferred form for the integrators to be used in conjunction with state variable computers like those shown in FIGS. 19 and 22 is a small direct current motor whose direction of rotation is proportional to the polarity of the input electrical signal, and whose shaft is connected to a rotary potentiometer, so that the position of the wiper arm on the potentiometer is linearly proportional to the angle of the motor shaft as in the embodiment shown in FIG. 12. The angular position of the wiper arm of the potentiometer is the preferred form of parameter read-out for FIGS. 21 and 22. The preferred form of each multiplier to be used in FIGS. 21 and 22 is to connect the non-movable terminals of each potentiometer across the output terminals of one of the state variable computers in FIG. 19 and 22 such that the potential between the wiper arm and a grounded terminal is proportional to the product of the state variable times the corresponding parameter coefficient.

An alternative form for FIG. 21 is to use for both the first transducer and the second transducer analog to digital converters which deliver a binary coded signal for each of the signals minus $x$ and $m$. In this embodiment, the state variable computers are binary-coded digital operations on the sequence of numbers representing the variables minus $x$, $m$ and $y'$. The binary operations to be performed to generate the sequence of state variables are related to the calculation of a first difference, a second difference, etc. The function Q is representative of the delay between the beginning of the computation for an $n$th difference and the end of the same computation. This delay should be the same for the calculation of each state variable in each state variable computer.

In this embodiment in which the signals are binary coded, it is conventional to call the signals sampled-data because they are not continuous as a function of time. In Laplace transform notation for a sampled-data, the symbol $z^{-1}$ is used to denote a unit increment of time delay.

$$z^{-1} = e^{-s} = \int_0^\infty s t \delta(t-1) dt \quad (175)$$

Using this sampled data notation, the state variable computer for $k$ equal to 3 would have the following transfer functions to its several outputs.

$$G_3(z) = (1-z^{-1})^3 = 1 - 3z^{-1} + 3z^{-2} - z^{-3} \quad (176)$$

$$G_2(z) = \tfrac{1}{2}(1+z^{-1})(1-z^{-1})^2 = \tfrac{1}{2}(1 - z^{-1} - z^{-2} + z^{-3}) \quad (177)$$

$$G_1(z) = z^{-1}(1-z^{-1}) = z^{-1} - z^{-2} \quad (178)$$

$$G_0(z) = \tfrac{1}{2}(z^{-1} + z^{-2}) \quad (179)$$

The foregoing four equations define the structure of the first set, second set, and third set of state variable computers given in FIG. 21. To illustrate their meaning, consider the third set of state variable computers receiving the signal $y'$. Equation 179 states that $y'_0$ is equal to one-half of $y'$ delayed by one computational interval plus one-half of $y'$ delayed by two computational intervals.

Equation 178 states that $y'_1$ is equal to the difference between $y'$ delayed by one interval and $y'$ delayed by two intervals of time. Equation 177 states that $y'_2$ is equal to one-half of the combination of $y'$ minus $y'$ delayed by one unit of time minus $y'$ delayed by two units of time plus $y'$ delayed by three units of time. These relationships which generate the set of all $y'_n$ in FIG. 21 are summarized in Equations 180, 181, 182 and 183 for the special case when $k$ is 3.

$$y'_0=\tfrac{1}{2}(z^{-1}+z^{-2})y' \quad (180)$$
$$y'_1=(z^{-1}-z^{-2})y' \quad (181)$$
$$y'_2=\tfrac{1}{2}(1-z^{-1}-z^{-2}+z^{-3})y' \quad (182)$$
$$y'_3=(1-3z^{-1}+3z^{-2}-z^{-3})y' \quad (183)$$

For this sampled data system, the integrators shown in FIG. 21 are accumulators whose read-out is equal to the summation of all of the signals which have been read in. For example, the output $a'_0$ of the first set of integrators is equal to summation of all of the minus $x_0E/|E|$. Expressed in sampled-data notation this is $$a'_0(t)=a'_0=\sum -x_0\frac{E}{|E|} \quad (184)$$

and $$a'_0(z)=\frac{1}{1-z^{-1}}\left(-x_0\frac{E}{|E|}\right) \quad (185)$$

In a similar manner $$a'_n(z)=\frac{1}{1-z^{-1}}\left(-x_n\frac{E}{|E|}\right) \quad (186)$$

and $$I_n=\frac{1}{1-z^{-1}}\left(y'_n\frac{E}{|E|}\right) \quad (187)$$

Both the numerator read-out and the denominator read-out in FIG. 21 consist of the values stored in the sets of $k+1$ accumultors for each.

The set of low pass filters to generate $P_n$ in FIG. 21 are accumulators that "forget." In $z$-form operational notation, these filters produce outputs of $$P_n=\left(\frac{1}{1-0.9z^{-1}}\right)\left(m_n\frac{E}{|E|}\right) \quad (188)$$

The coefficient 0.9 in the equation above can be chosen arbitrarily to determine the rate of forgetting. In this case, the accumulator forgets in approximately ten computational intervals; if the coefficient where chosen to be 0.99, the accumulator would forget with a time constant of 100 computational intervals; if the coefficient is chosen to be 0.5, the accumulator forgets half of its present value during each computational interval.

An identification machine, apparatus or system based on the principles set forth above can also be used with a sampled data system to obtain the $z$-transform of an unknown operation. For example, an unknown system may have the transfer function from $x$ to $y$ described by a ratio of polynomials in the frequency variable $$z=e^{+sT} \quad (189)$$

The most convenient state variables to use in such a case are the successive values of X and Y delayed by 1, 2, 3, etc., units of the sample time T. The identification machine, therefore, includes provision for successive delays of the input and output signals of the unknown system and the multiplication of these delayed signals by the transfer function parameters $a_h$ and $b_h$, in such a manner that these paramenters slowly converge to the values specified by the unknown system.

It is apparent from the foregoing that I have provided a new and improved identification machine, apparatus and system and method for testing or identifying an unknown process. For the identification machine to operate properly, the unknown process must be disturbed with a signal which is more complicated than the process. That is, the disturbance signal must contain simultaneously a variety of frequencies. As explained above, this can be obtained by using the transients that occur due to turning on and off a disturbance signal. For example, a step function can serve as a very satisfactory disturbance to introduce into an unknown process. A sine wave which is turned on and off contains an adequate supply of frequencies for the satisfactory performance of an identification machine. A repeated squarewave or a repeated triangle wave are satisfactory input signals to the process. Other satisfactory input disturbances are a frequency modulated sinewave or a swept sinewave. One of the most desirable disturbances is a random signal which looks like white Gaussian noise. If the unknown process itself during normal operation appears to have an input signal containing many frequency components or containing filters of random noise, then it is possible to monitor this input signal, and no additional disturbance need be introduced into the process. Thus, under certain conditions, there is no need to disturb the process by test or signals other than the random fluctuations which are normally present in the unknown process.

With the use of my indentification machine, apparatus and system, the length of time required to identify the unknown process is reduced to a minimum. This is true because there is no need to measure the frequency response of the process for all possible frequencies, but instead, only the most important coefficients in the integro-differential equation are solved for. The time required to identify the process is also reduced to a minimum because there is no necessity to record the input and output of the process for a very long time and apply statistical computation to this recording since the identification machine operates on line in real time and can be turned off as soon as the fluctations in the identified parameters are less than a predetermined value. The time required for identification of the unknown process is also reduced to a minimum because there is no need to factor a Bode diagram into its poles and zeroes. Also, there is no need to calculate the auto-correlation of the input and the cross-correlation between the input and the output, nor to calculate the Fourier transforms of these in order to obtain the system transference.

The equation obtained by the identification machine, apparatus or system is exactly correct and does not have any errors in any of the coefficients, if the appropriate formula of disturbance function is present, if the machine operation time is long enough, and if the correct method of compensating for additive noise on the output signal or the effect of additional not-monitored input signals is employed.

Although the equation displayed by the identification machine may be exactly correct, it may not be in its simplest form. For example, a ratio of polynomials might have a simplest form consisting of a quadratic divided by a cubic polynomial. If one were to multiply the numerator and the denominator of this representation by the same factor, then the transfer function would still be correct, but it would appear to be a cubic divided by a fourth power polynomial. When the roots of each are solved for, it becomes apparent that there is a common root in both the numerator and the denominator. Generally, it is desirable to arrange the identification machine so that all common roots are removed. This means that the maximum number of coefficients in the identification machine must read zero or an insignificant number. It can be seen that if the identification machine has finished changing the values of its coefficient parameters, one can test for a representation of minimum complexity, by arbitrarily reducing the coefficient of the highest order derivatives in the numerator and in the denominator of the operational form of the differential equation transference to zero and holding it at zero until the machine has reached its new steady state approximation. By then releasing the hold in the two selected coefficients, if the machine remains in its previous state without change, it will have been demonstrated that the last readings of the machine are a correct and less complex representation of the transference and that the next to the last reading contained common factors which had been removed by this process of clamping the coefficient of the highest order derivative term.

Another method of accomplishing the equivalent of this sequential experimental clamping and releasing action is to order the integration rates in the calculations of the coefficients. The coefficients of the low order terms will be calculated by high gain integrators and the coefficients of the high order terms will be calculated by low gain integrators. Yet another method of accomplishing the same result is to use imperfect integrations in the highest order terms, i.e., replace the integrators with time constants such that if the machine is turned off, the coefficient values will drift back to zero and when the machine is operating, the coefficient values will be slightly in error because of this drifting action of these imperfect memory integrators. The time constants would have the smallest values for the coefficients associated with the highest order derivative and the time constants would have the largest values for the coefficients associated with a middle order derivative. The coefficients associated with the lowest order derivative would have perfect integrators calculating them.

It is also apparent from the foregoing that I have provided an identification machine, apparatus and system in which a high frequency model of the unknown system can be obtained directly from the identification machine by connecting the output of each integrator to a potentiometer setting in the model structure. By such means, models operating with time scales of 100 and 1000 times that of the unknown process can be used in iterative calculators for optimum bang-bang controls and in hill-climbing optimization techniques for minimizing cost functions or maxmizing value functions.

It is also apparent from the foregoing that the identification machine, process and system can also be used for tracking variable parameter systems and continuously delivering the variations in the coefficients of the integro-differential equation. For example, such an identification machine might be useful to track the resonant frequency and damping in the pitch axis of a high performance airplane as a function of changes in altitude, mach number and pitch angle.

I claim:

1. In a machine for the identification of the relationship between two signals, means for generating a plurality of first derived state variable signals linearly derived from the first of said two signals, means for generating a plurality of second derived state variable signals linearly derived from the second of said two signals, means for generating signals representing a set of coefficients with one coefficient for each of the said first and second derived state variable signals, multiplying means for generating the products of each of the said signals representing coefficients times a corresponding derived signal, means for adding together said products to produce an error function, means for multiplying said error function times each of several derived state variable signals to produce a set of second product signals, and means for changing several of the said signals representing coefficients responsive to said second product signals of the corresponding derived signals and said error function until said error function is substantially equal to zero, said last named means providing an input to said means for generating signals representing a set of coefficients.

2. In a machine for the identification of the relationship between two signals, passive dynamic network means for generating a plurality of first derived signals linearly derived from the first of the two signals, passive dynamic network means for generating a plurality of second derived signals linearly derived from the second of said two signals, means for generating a plurality of signals to be used as weighting factors, means for multiplying each of said first and second derived signals with a corresponding signal to be used as a weighting factor to produce a plurality of product signals, means for adding the product signals to produce a sum signal, means for generating a correction signal proportional to the product of a derived signal and said sum signal, and means for adding the correction signal to at least one signal to be used as a weighting factor to minimize said product, said last named means providing a feedback input to the aforesaid means for generating a plurality of signals to be used as weighting factors to cause said sum signal to be substantially equal to a predetermined value.

3. In a machine for obtaining signals representing the coefficients in the differential equation relating a first signal and a second signal, means for generating a plurality of first state variable signals derived from said first signal by linear passive dynamic operations, means for generating a plurality of second state variable signals derived from said second signal by linear passive dynamic operations, means for generating a plurality of signals representing coefficients, means for multiplying each of the state variable signals times a signal representing a coefficient to provide a plurality of product signals, means for adding together a plurality of said product signals to produce a sum signal, means for generating a correction signal containing a component responsive to both a state variable signal and to said sum signal and means for adding said correction signal to at least one of said signals representing a coefficient in such a polarity that the sum signal is substantially minimized, said last named means supplying a feedback signal to said means for generating a plurality of signals representing coefficients of a polarity to minimize said correction signal.

4. A machine as in claim 2 incorporating means for generating a response signal by adding the combinations of each of said first derived signals with a corresponding signal to be used as a weighting factor, means for generating a plurality of third derived signals linearly derived from said response signal, means for generating a second correction signal which is a nonlinear combination of said sum signal and one of said third derived signals, and means for adding the second correction signal to one of said signals to be used as a weighting factor.

5. A machine as in claim 2 incorporating means for storing the said two signals and means for repetitively playing back the said two signals.

6. A machine as in claim 5 wherein the first of said two signals is a repetitive time function and wherein the second of said two signals is a synchronized time event signal synchronized to said time function.

7. A machine as in claim 5 wherein the first of said two signals is a repetitive positive time half of an auto-correlation function and wherein the second of said two signals is a synchronized zero time signal synchronized to said first of said two signals.

8. A machine as in claim 2 wherein the first of said two signals is a repetitive time function and wherein the second of said two signals is a synchronized time event.

9. A machine as in claim 6 wherein said first of the two signals is a repetitive positive time half of an auto-correlation function and the second of the two signals is a synchronized zero time event.

10. In a machine for obtaining signals representing the coefficients in the differential equation relating a first signal and a second signal, means for generating a plurality of first state variable signals derived from the first signal by a linear dynamic operation, means for generating a plurality of second state variable signals derived from said second signal by a linear dynamic operation, means for producing a signal representing a coefficient for each of the first and second state variable signals, means for multiplying each first state variable signal with a corresponding signal representing a first coefficient to form a plurality of first weighted signals, means for adding together the first weighted signals to produce a first response signal, means for multiplying each second state variable signal with a corresponding signal representing a second coefficient to form a plurality of second weighted signals, means for adding together the second weighted signals to produce a second response signal, means for forming a third response signal equal to the sum of the first response signal and the second response signal, means for generating a plurality of third state variable signals derived from said first response signal, means for combining said third response signal with one of the third state variable signals to produce an actuating signal, means adding said actuating signal to that one signal representing a second coefficient corresponding to the said one of the third state variable signals, said last named means providing negative adaptive feedback to said means for producing a coefficient, and continuing this procedure with each of the third state variable signals and the corresponding signal representing a second coefficient associated therewith until each said actuating signal is substantially minimized.

11. A machine as in claim 10 wherein the differential equation represents an unknown process and the first signal represents and is responsive to the output from the unknown process.

12. A machine as in claim 10 incorporating means for storing the first and second signals, the first signal being a synchronized time event and the second signal being a repetitive time function.

13. A machine as in claim 10 incorporating means for storing the first and second signals, the first signal being a synchronized zero time signal and the second signal being a repetitive positive time half of an auto-correlation function.

14. A machine for calculating a power density spectrum as a ratio of polynomials in powers of the frequency variable from the auto-correlation function, comprising means producing signals representing a vector of numerator polynomial coefficients, means producing signals representing a vector of denominator polynomial coefficients, means to generate a predetermined auto-correlation function, a first set of networks, an identical second set of networks, means for generating an impulse function, means for supplying the impulse function to the first set of networks, means for supplying the predetermined auto-correlation function to the identical second set of networks, means responsive to the products of the signals representing the vector of numerator coefficients times respective outputs of the first set of networks and generating a first inner-product signal, second means responsive to the products of the signals representing the vector of denominator coefficients times respective outputs of the second set of networks and generating a second inner-product signal, error means responsive to both the said first inner-product signal and said second inner-product signal generating an error signal, first negative feedback corrective means responsive to the error signal to change said signals representing a vector of numerator coefficients, and second negative feedback corrective means responsive to the error signal to change said signals representing a vector of denominator coefficients.

15. In a machine for measuring the relationship between first and second signals, means for producing a set of signals denoted adjustable weightings, means for storing the first and second signals in a storage device, means for playing back the first and second signals in time synchronization, means for producing a first set of derived state variable signals from said first signal, means for producing a second set of derived state variable signals from said second signal, means for producing a sum signal which is a weighted sum of each signal of said first and second sets of derived state variable signals times a corresponding one of the set of said signals denoted adjustable weightings, means for multiplying said sum signal by one of said derived state variable signals to produce a product signal, and means responsive to said product signal to change the value of one of the signals denoted adjustable weightings and therefore the weighting of one of said state variable signals in said weighted sum to minimize said product signal.

16. A machine as in claim 15 incorporating means for displaying the weighting in the said weighted sum.

17. In a machine for measuring the impedance of a two-terminal device, means for producing a set of adjustable excitation variable factor signals, means for producing a set of adjustable response variable factor signals, means for generating an excitation signal, means for applying said excitation signal to the two-terminal device to provide a response signal, means for sensing the response signal, means for producing a set of derived excitation variable signals from said excitation signal, means for producing a set of derived response signals from said response signal of the two-terminal device responding to the excitation signal, means for multiplying each adjustable excitation variable factor signal times its respective derived excitation variable signal to produce excitation product signals, second means for multiplying each adjustable response variable factor signal times its respective derived response signal to produce response product signals, means for adding together the excitation product signals and the response product signals with appropriate signs to form an error signal, combining means for combining a non-linear measure of said error signal with one of said derived signals to produce a combination signal, means responsive to said combination signal from said combining means for changing the one adjustable variable factor signal associated with said one of said derived signals until said combination signal is minimized and means connected to one of said means for producing a set of adjustable variable factor signals for displaying the value of said one adjustable variable factor signal associated with said one of the derived signals.

18. A machine as in claim 17 in which the error signal is combined with several of said derived excitation variable signals and several of said derived response signals and in which the resulting combination signals are used to change the factors associated therewith until the error signal is minimized.

19. In a machine for measuring the impedance of a two-terminal device, means producing an excitation signal, means producing a set of adjustable excitation variable factor signals, means producing a set of adjustable response variable factor signals, means for supplying the excitation signal to the two-terminal device to cause the two-terminal device to produce a response signal, means for producing a set of derived excitation state signals from said excitation signal, means for producing a set of derived response state signals from said response signal, means for changing a plurality of factor signals of the set of excitation variable factor signals, means for changing a plurality of factor signals of the set of response variable factor signals, means for producing a first sum signal by adding multiplications of each excitation variable factor signal times its respective derived excitation state signal, means for producing a second sum signal by adding multiplications of each response variable factor signal times its respective derived response state signal, means for adding with appropriate algebraic sign said first sum signal and said second sum signal to form an error signal, combining means for combining said error signal with several of said derived excitation state signals and said derived response state signals and means responsive to said combining means utilizing the combinations produced therein to provide a plurality of feedback inputs to the said means for changing the set of excitation variable factor signals and to the said means for changing the set of response variable factor signals and to change said factor signals until said feedback inputs are minimized.

20. In a machine for measuring the transfer function of a process which has an input signal and an output signal, means for producing signals representing a set of adjustable numerator coefficients for a differential equation representing the transfer function, means producing signals representing a set of adjustable denominator coefficients for the same differential equation, means for producing a plurality of excitation state variable signals derived from said input signal, means for producing a plurality of response state variable signals derived from said output signal, means for multiplying each signal representing a numerator coefficient with a corresponding excitation state variable signal to produce a plurality of first product signals, means for multiplying each signal representing a denominator coefficient with a corresponding response state variable signal to provide a plurality of second product signals, means for adding said product signals to generate an error signal, combining means for combining said error signal with an excitation state variable signal to provide a feedback signal, feedback means for changing one of the said signals representing an adjustable numerator coefficient corresponding to said one excitation state variable signal using said feedback signal, the polarity of the feedback signal being such as to produce a reduction in the magnitude of the error signal, combining means for combining said error signal with one of said response state variable signals to provide an additional feedback signal, and second feedback means using said additional feedback signals for changing one of the said signals representing an adjustable denominator coefficient corresponding to said one response state variable signal, the polarity of said additional feedback signal being such as to produce a reduction in the magnitude of said error signal.

21. A machine as in claim 20 incorporating means for displaying the value of each of said signals representing said sets of numerator and denominator coefficients.

22. A machine as in claim 20 including a model of the said process, means for exciting said model with said input signal, said model delivering a second output signal, means for producing a plurality of second response signals derived from said second output signal, combining means whereby the error signal is combined with several of the second response signals to produce a plurality of second additional feedback signals, and means responsive to said second additional feedback signals to change said signals representing adjustable denominator coefficients to minimize said second additional feedback signals.

23. In a machine for analyzing a recorded time response, means for converting a recorded function of time into a first signal, means for producing a time event signal synchronously related to said first signal, means for producing a plurality of excitation state signals from said time event signal, means for producing a plurality of response state signals from said first signal, means for generating a signal representing a numerator coefficient for each of the excitation state signals for the differential equation representing the recorded time response, means for generating a signal representing a denominator coefficient for each response state signal in the differential equation representing the recorded time response, means for multiplying each excitation state signal times its corresponding signal representing a numerator coefficient and each response state signal times its corresponding signal representing a denominator coefficient to provide a plurality of product signals, means for adding the product signals together to provide a control signal, means for producing feedback signals for a plurality of the signals representing numerator and denominator coefficients by combining the control signal with the corresponding excitation and response state signals, said means for generating a signal representing a numerator coefficient being responsive to the corresponding feedback signal, and said means for generating a signal representing a denominator coefficient being responsive to the corresponding feedback signal, and means for altering said signals representing coefficients by the said feedback signals until the signals representing the numerator and denominator coefficients are changed so that the magnitude of each feedback signal is minimized.

24. In a machine for obtaining the Fourier transform of an auto-correlation function, means for recording the positive time half of said auto-correlation function, means for playing back the recorded positive time half as a first signal, means for providing a time event signal synchronously related to said first signal, means for producing a plurality of first derived signals from a plurality of first linear dynamic operations on said first signal, means for producing a plurality of second derived signals from a plurality of second linear dynamic operations on said time event signal, means for producing a readout parameter signal for each of said first derived signals and for each of said second derived signals, means for multiplying each of said readout parameter signals with the corresponding first derived and second derived signals to produce a plurality of product signals, means for adding the product signals together to provide a sum signal, a plurality of means for combining the sum signal with the first and second derived signals to provide a plurality of feedback signals, said means for producing readout parameter signals being responsive to said feedback signals, and means utilizing the feedback signals to change the first and second readout parameter signals so that said feedback signals are minimized.

25. In a machine for iteratively solving a trial differential equation relating two variables as a function of time, means for generating signals representing the coefficients in said trial differential equation, means for generating a first derived time function from one of said two variables using some of the said signals representing coefficients in a portion of the said trial differential equation, means for generating a second derived time function from the other of said two variables using the remainder of the said signals representing coefficients in a second portion of the said trial differential equation, means for subtracting one derived time function from the other derived time function to generate an error signal, means for calculating a first correlation between said error signal and said first derived time function, means for calculating a second correlation between said error signal and said second derived time function, means for successively changing one of said signals representing coefficients in response to said first correlation, and means for successively changing another of said signals representing coefficients responsive to said second correlation, said last two named means being connected in negative feedback such that said two correlations are minimized.

26. In an identification machine for determining the relationship between first and second signals, means for generating a plurality of first derived signals linearly related to the first signal, means for generating a plurality of second derived signals linearly related to the second signal, means for providing a weighting factor signal for each of the first and second derived signals, means for multiplying each of the weighting factor signals times a corresponding derived signal to provide a plurality of product signals, means receiving and adding algebraically said product signals to generate a sum signal, means for generating several correction signals for several of the weighting factor signals by multiplying said sum signal by each of several of said derived signals, and means to apply each of said several correction signals respectively to the corresponding means for providing a weighting factor signal for changing each of the several weighting factor signals in accordance with the correction signal generated.

27. In an identification machine for determining the coefficients in a differential equation relating a first signal and a second signal, means for generating a plurality of state variable signals derived from said first signal, means for generating a plurality of second state variable signals derived from said second signal, means for generating a plurality of signals representing coefficients, a plurality of multipliers combining said signals representing coefficients with said first and second state variable signals to provide a plurality of product signals, means for adding algebraically said product signals to obtain a sum signal, means combining said sum signal with several of said first and second state variable signals to generate a plurality of feedback signals, and means using said feedback signals to change said signals representing coefficients.

28. An identification machine as in claim 27, incorporating means to amplify said sum signal before combining it with said state variable signals.

29. An identification machine as in claim 27, incorporating means for displaying the values of said signals representing coefficients which have been changed by said feedback signals.

30. In an identification machine for measuring the relationship between first and second variable signals, a storage device for storing the first and second variable signals, the storage device including means for playing back the first and second variable signals in time synchronization, means for producing a first set of derived state variable signals from said first variable signal, means for producing a second set of derived state variable signals from said second variable signal, means for producing a weighted sum of said first and second sets of state variable signals, means for combining said weighted sum with each of several of said derived state variable signals to produce product signals, and means using said product signals to change the weighting of said derived state variable signals in said weighted sum.

31. An identification machine as in claim 30 incorporating means for displaying the values of the weighting in said weighted sum which have been changed by said product signals.

32. In an identification machine for measuring the impedance of a two-terminal device, means for supplying an excitation signal to the two-terminal device so that the two-terminal device will produce a response signal, means for deriving a set of excitation variable signals from said excitation signal, means for deriving a set of excitation variable signals from said response signal, means for producing a set of excitation variable factors and a set of response variable factors, means for multiplying each excitation variable factor times its respective excitation variable signal, means for multiplying each response variable factor times its respective response variable signal, means for adding the products of the excitation variable multiplications and the products of the response variable multiplications to form an error signal which is an error measure, means for producing a non-linear combination of said error signal and each of several of said response variable signals and means utilizing said non-linear combinations for changing said factors until said error signal is minimized.

33. An identification machine as in claim 32 incorporating means for displaying the values of said excitation variable factors and the values of said response variable factors after said error measure has been minimized.

34. In an identification machine for measuring the transfer function of a process which has an input signal and an output signal, means producing a plurality of excitation variable signals derived from the input signal, means producing a plurality of response variable signals derived from the output signal, means producing a numerator coefficient signal for each of the excitation variable signals, means producing a denominator coefficient signal for each fo the response variable signals, means combining the numerator and denominator coefficient signals with the excitation variable signals and the response variable signals to provide a plurality of product signals, means adding the product signals to generate an error signal, means combining the error signal with each of several of the excitation variable signals and with each of several of the response variable signals to provide a feedback signal for each of several of the numerator and denominator coefficient signals, means for changing the numerator and denominator coefficient signals in accordance with the feedback signals, and means for indicating the value of each of said numerator and denominator coefficients.

35. In an identification machine for analyzing a recorded time response, means for recording a function of time, means converting the recorded function of time into a first signal, means providing a time event signal synchronously related to said first signal, means producing a plurality of excitation state variable signals from said time event signal, means producing a plurality of response state variable signals from said first signal, means producing a signal representing a numerator coefficient for each excitation variable signal and a signal representing a denominator coefficient for each response state variable signal, means combining the signals representing numerator coefficients and the signals representing denominator coefficients with the excitation state variable signals and response state variable signals to provide a plurality of product signals, means adding said product signals to provide a control signal, and means producing a plurality of feedback signals responsive to the control signal and to the state variable signals and polarized to change the signals representing the numerator and denominator coefficients to cause said control signal to approach a minimum value.

36. In an adaptive machine for adjusting a set of coefficients responsive to the characteristics of a dynamic process, means producing a plurality of signals representing adjustable first coefficients and a plurality of signals representing adjustable second coefficients, a first signal, means for generating a plurality of derived signals linearly derived from the said first signal, means for multiplying each of the said signals representing adjustable first coefficients times its corresponding derived signal to provide a plurality of product signals, means for receiving and adding said product signals to obtain a first repsonse signal, means for generating a plurality of second derived signals linearly derived from the said first response signal with one second derived signal for each signal representing an adjustable second coefficient, means for providing an excitation signal responsive to said first signal, means for exciting said dynamic process with said excitation signal such that said process delivers an output response, means for generating a plurality of third derived signals linearly derived from the said output response, means for multiplying each of said third derived signals times a corresponding signal representing an adjustable second coefficient to provide a plurality of third product signals, means for adding said third product signals to obtain a third response signal, means for generating a sum signal which is jointly responsive to said first response signal and to said third response signal, means combining said sum signal with several of said second derived signals to generate a plurality of feedback signals, and means using said feedback signals to change said signals representing said adjustable second coefficients to minimize said feedback signals.

37. An adaptive machine as in claim 36 wherein the said means for generating said plurality of second derived signals comprises multiplier means wherein several of the said second derived singals are multiplied by several of the said signals representing adjustable second coefficients to produce several second product signals, and incorporating adder means whereby several second product signals are algebraically added together with said first response signal to produce a first actuating signal, amplifier means amplifying said first actuating signal to produce a second actuating signal, and means for linearly generating the said plurality of second derived signals from the said second actuating signal.

38. An adaptive machine as in claim 36 wherein the said means for combining said sum signal with several of said second derived signals comprises means for separately multiplying said sum signal by each of said second derived signals, and wherein said means using said feedback signals comprises integrators to integrate each feedback signal, the outputs of each integrator being the said signals representing adjustable second coefficients.

39. In a method for the identification of the relationship between two signals, producing a set of adjustable signals representing coefficients, generating a plurality of first derived state variable signals linearly derived from the first of said two signals, generating a plurality of second derived state variable signals linearly derived from the second of the said two signals, each but one signal of said first derived state variable signals being a time integral of another signal of the first derived state variable signals and each but one signal of the second derived state variable signals being a time integral of another signal of the second derived state variable signals, a derived state variable signal for each coefficient, generating an error function by adding the products of each of said adjustable signals representing coefficients times a corresponding derived signal, generating correction signals as the products of the corresponding derived signals and said error function, and adding a function of each correction signal to the corresponding adjustable signal representing a coefficient until said error function is minimized.

40. In a method for the identification of the relationship between two signals, generating a plurality of adjustable signals used as weighting factors, utilizing passive dynamic networks to generate a plurality of first derived signals linearly derived from the first of the two signals, utilizing additional passive dynamic networks for generating a plurality of second derived signals linearly derived from the second of said two signals, multiplying each of said first and second derived signals with a corresponding adjustable signal used as a weighting factor to produce a plurality of product signals, algebraically adding the product signals to produce a sum signal, generating a correction signal to at least one adjustable signal used as a weighting factor to cause said sum signal to be reduced in magnitude, generating a response signal by adding together the products of each of said first derived signals times a corresponding adjustable signal used as a weighting factor, generating a plurality of third derived signals linearly derived from said response signal, generating a second correction signal responsive to a non-linear combination of said sum signal and one of said third derived signals, and adding the second correction signal to another one of said adjustable signals used as a weighting factor.

41. In a method for measuring the transfer function of a process which has an input signal and an output signal, starting with a set of predetermined adjustable signals representing numerator coefficients for the differential equation representing the transfer function, and a set of predetermined adjustable signals representing denominator coefficients for the differential equation representing the transfer function, simulating a model of said process, exciting said model with said input signal whereby said model delivers a second output signal, utilizing a portion of the simulated model for producing a plurality of excitation state variable signals derived from said input signal, and for multiplying each adjustable signal representing a numerator coefficient by the corresponding excitation state variable signal to produce a plurality of first product signals, producing a plurality of response state variable signals derived from said output signals, multiplying each adjustable signal representing a denominator coefficient by the corresponding response state variable signal to provide a plurality of second product signals, adding with appropriate sign said first and second product signals to generate an error signal, combining said error signal with one excitation state variable signal to provide a feedback signal, changing the adjustable signal representing the numerator coefficient corresponding to said one excitation state variable signal using the said feedback signal, the polarity of the change in the adjustable signal representing the numerator coefficient being such as to produce a reduction in the magnitude of the feedback signal, producing a plurality of second response signals derived from said second output signal, combining said error signal with one of said second response signals to provide an additional feedback signal, and using said additional feedback signal for changing the adjustable signal representing the denominator coefficient corresponding to said one second response signal, the polarity of said change in the adjustable signal representing the denominator coefficient being such as to produce a reduction in the magnitude of said additional feedback signal.

References Cited

UNITED STATES PATENTS

| | | | |
|---|---|---|---|
| 2,251,973 | 12/1941 | Beale et al. | 333—19 X |
| 2,448,564 | 9/1948 | Wilkerson | 333—19 X |
| 3,393,301 | 7/1968 | Valstar | 235—151.31 |
| 3,206,672 | 9/1965 | Gouriet et al. | 324—57 |
| 2,909,726 | 10/1959 | Kramer | 324—57 |
| 2,859,914 | 11/1958 | Blasingame | 235—180 |

OTHER REFERENCES

Wayne H. Chen—Linear Network Design Synthesis—McGraw-Hill Co.—page 138.

MALCOLM A. MORRISON, Primary Examiner

F. D. GRUBER, Assistant Examiner

U.S. Cl. X.R.

235—150.1, 150.53, 151.31, 183, 194; 324—77; 333—19